United States Patent
Denham et al.

(10) Patent No.: US 12,207,762 B2
(45) Date of Patent: Jan. 28, 2025

(54) DYNAMIC FLIP TOASTER

(71) Applicant: SharkNinja Operating LLC, Needham, MA (US)

(72) Inventors: Niall Christopher Denham, London (GB); Georgia Banton, Buckinghamshire (GB); Gregory Fish, Jamaica Plain, MA (US); Alex Gushulak, Cambridge, MA (US); Edward Brown, Leicestershire (GB); Ethan S. Kramer, Allston, MA (US); Roger Neil Jackson, Cornwall (GB); Andrew John Roy Tattersfield, London (GB)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 17/932,922

(22) Filed: Sep. 16, 2022

(65) Prior Publication Data
US 2023/0010279 A1    Jan. 12, 2023

Related U.S. Application Data

(63) Continuation of application No. 17/139,751, filed on Dec. 31, 2020, now Pat. No. 11,445,859.
(Continued)

(51) Int. Cl.
*A47J 37/08*    (2006.01)

(52) U.S. Cl.
CPC ....... *A47J 37/0857* (2013.01); *A47J 37/0807* (2013.01); *A47J 37/0871* (2013.01)

(58) Field of Classification Search
CPC . A47J 37/0871; A47J 37/0807; A47J 37/0857
(Continued)

(56) References Cited

U.S. PATENT DOCUMENTS

| 1,021,413 | A |   | 3/1912 | Koch |
| 1,440,643 | A | * | 1/1923 | Strite .................. A47J 37/0857 |
|           |   |   |        | 126/41 C |

(Continued)

FOREIGN PATENT DOCUMENTS

| CN | 1124097 C  | 10/2003 |
| CN | 2927930 Y  | 8/2007  |

(Continued)

OTHER PUBLICATIONS (Mar. 6, 2012) Crostino Twists Your Toast—Avoids Burnt Fingers, Available on: http://www.gadgetsandgizmos.org/crostino-twists-your-toast-avoids-burnt-fingers/.

(Continued)

*Primary Examiner* — Jimmy Chou
(74) *Attorney, Agent, or Firm* — Mintz, Levin, Cohn, Ferris, Glovsky and Popeo, P.C.

(57) ABSTRACT

A cooking system positionable on a support surface includes a housing having an internal cooking compartment and an opening formed in the housing for accessing said internal cooking compartment. At least one heating element is provided for heating said internal cooking compartment. The heating element is operable to heat the internal cooking compartment while the opening is at least partially exposed to an ambient environment to allow fluid transfer between the ambient environment and the internal cooking compartment. An output from said at least one heating element is variable across said internal cooking compartment during operation of the system.

18 Claims, 44 Drawing Sheets

Related U.S. Application Data

(60) Provisional application No. 63/083,308, filed on Sep. 25, 2020, provisional application No. 63/005,777, filed on Apr. 6, 2020, provisional application No. 63/005,774, filed on Apr. 6, 2020.

(58) Field of Classification Search
USPC .................................................. 99/385
See application file for complete search history.

(56) References Cited

U.S. PATENT DOCUMENTS

| | | | | |
|---|---|---|---|---|
| 1,440,786 A * | 1/1923 | Lyons | A47J 37/0857 | 34/201 |
| 1,473,213 A * | 11/1923 | De Matteis | A47J 37/0857 | 99/421 V |
| 1,477,343 A * | 12/1923 | Griffin | A47J 37/0857 | 99/386 |
| 1,524,532 A * | 1/1925 | Biebel | A47J 37/0857 | 99/386 |
| 1,530,387 A * | 3/1925 | Marra | A47J 37/0857 | 221/253 |
| 1,543,737 A * | 6/1925 | Thornton, Jr. | A47J 37/0857 | 99/387 |
| 1,555,336 A * | 9/1925 | Vaughan | A47J 37/0857 | 34/245 |
| 1,560,220 A * | 11/1925 | De Matteis | A47J 37/0857 | 99/386 |
| 1,587,023 A * | 6/1926 | Mottlau | A47J 37/0807 | 126/41 R |
| 1,612,809 A * | 1/1927 | Guissart | A47J 37/0857 | 99/396 |
| 1,667,988 A * | 5/1928 | Richardson | A47J 37/0857 | 126/41 R |
| 1,678,337 A * | 7/1928 | Halifax | A47J 37/0857 | 99/387 |
| 1,696,613 A * | 12/1928 | Shroyer | A47J 37/0857 | 198/523 |
| 1,726,757 A * | 9/1929 | Murphy | A47J 37/0635 | 99/390 |
| 1,769,893 A * | 7/1930 | Uhl | A47J 37/0828 | 99/335 |
| 1,772,171 A | 8/1930 | Wells | | |
| 1,797,628 A * | 3/1931 | Whiting, Jr. | A47J 37/0857 | 99/387 |
| 1,807,312 A * | 5/1931 | Henley, Jr. | A47J 37/0857 | 198/801 |
| 1,820,745 A * | 8/1931 | Kater | A47J 37/0857 | 74/435 |
| 1,862,733 A * | 6/1932 | Wright | A47J 37/0807 | 99/332 |
| 1,868,287 A * | 7/1932 | Haeringer | A47J 37/0857 | 126/41 A |
| 1,894,430 A * | 1/1933 | Starr | A47J 37/0857 | 310/34 |
| 1,912,353 A * | 5/1933 | Howe | A47J 37/08 | 99/332 |
| 1,944,473 A * | 1/1934 | Starr | A47J 37/0857 | 310/34 |
| 1,949,361 A * | 2/1934 | Starr | A47J 37/0857 | 99/388 |
| 1,954,895 A * | 4/1934 | Shenton | A47J 37/0857 | 99/332 |
| 1,955,867 A * | 4/1934 | Wilkie | A47J 37/0611 | 99/402 |
| 1,963,924 A * | 6/1934 | Smith | A47J 37/0857 | 236/1 R |
| 1,979,845 A * | 11/1934 | Schallis | A47J 37/0821 | 99/332 |
| 1,996,297 A * | 4/1935 | Langenfeld | H02G 11/003 | 126/41 R |
| 2,036,826 A * | 4/1936 | Peters | A47J 37/0857 | 198/783 |
| 2,074,569 A * | 3/1937 | Smith | A47J 37/0871 | 362/456 |
| 2,089,315 A * | 8/1937 | Wheeler | A47J 37/08 | 99/402 |
| 2,092,226 A * | 9/1937 | Simons, Jr. | A47J 37/0688 | 219/525 |
| 2,112,075 A * | 3/1938 | De Matteis | A47J 37/0857 | 198/774.3 |
| 2,112,076 A * | 3/1938 | De Matteis | A47J 37/0857 | 74/56 |
| 2,134,376 A * | 10/1938 | Rocic | A47J 37/06 | 126/41 R |
| 2,149,566 A * | 3/1939 | Anderson | A47J 37/0857 | 198/774.3 |
| 2,172,194 A * | 9/1939 | Ehrgott | A47J 37/0857 | 99/386 |
| 2,182,229 A * | 12/1939 | Hamel | A47J 37/0857 | 198/804 |
| 2,188,309 A * | 1/1940 | Pentecost | A47J 37/0857 | 198/774.3 |
| 2,195,637 A * | 4/1940 | Anderson | A47J 37/0857 | 198/783 |
| 2,195,638 A * | 4/1940 | Anderson | A47J 37/0857 | D7/328 |
| 2,223,486 A * | 12/1940 | Filben | A47J 37/0857 | 99/387 |
| 2,345,769 A * | 4/1944 | Osrow | A47J 37/0814 | 126/275 R |
| 2,358,996 A * | 9/1944 | Platkin | A47J 37/08 | 99/339 |
| 2,368,026 A * | 1/1945 | Jepson | A47J 37/0807 | 392/422 |
| 2,368,440 A * | 1/1945 | Barker | A47J 37/08 | 99/339 |
| 2,410,985 A * | 11/1946 | Malmquist | A47J 37/0857 | 99/341 |
| 2,438,470 A * | 3/1948 | Wilson | A47J 37/0857 | 126/41 R |
| 2,447,641 A * | 8/1948 | Dunham | A47J 37/0857 | 99/341 |
| 2,456,291 A * | 12/1948 | Malone | A47J 37/0857 | 99/386 |
| 2,459,170 A * | 1/1949 | Koci | A47J 37/0807 | 439/620.08 |
| 2,549,375 A * | 4/1951 | Goddard | A47J 37/0857 | 99/386 |
| 2,582,760 A * | 1/1952 | Schoonmaker | A47J 37/0857 | 99/327 |
| 2,588,851 A * | 3/1952 | Kompass | A47J 37/0857 | 99/386 |
| 2,631,523 A * | 3/1953 | Olving | A47J 37/085 | 219/502 |
| 2,634,749 A * | 4/1953 | Cone | A47J 37/00 | 137/586 |
| 2,662,465 A * | 12/1953 | Beer | A47J 37/0814 | 99/335 |
| 2,667,828 A * | 2/1954 | Koci | A47J 37/0807 | 60/528 |
| 2,693,141 A | 11/1954 | Johnson et al. | | |
| 2,711,684 A * | 6/1955 | Taylor | A47J 37/0611 | 99/329 R |
| 2,739,525 A * | 3/1956 | Giambertoni | A47J 37/0807 | 99/391 |
| 2,745,937 A | 5/1956 | Welch | | |
| 2,806,422 A * | 9/1957 | Koci | A47J 37/0807 | 99/331 |
| 2,862,441 A * | 12/1958 | Schmall | A47J 37/0807 | 126/19 R |
| 2,920,551 A * | 1/1960 | Schmall | A47J 37/0814 | 99/329 R |
| 2,958,754 A | 11/1960 | Hahn | | |
| 3,033,099 A * | 5/1962 | Marriott | A47J 37/0857 | 99/349 |
| 3,152,242 A * | 10/1964 | De Mott | F24C 15/22 | 392/416 |

(56) References Cited

U.S. PATENT DOCUMENTS

| | | | | |
|---|---|---|---|---|
| 3,154,004 A | * | 10/1964 | Huck | A47J 37/0807 99/337 |
| 3,298,300 A | * | 1/1967 | Grebow | A47J 37/0871 99/337 |
| 3,400,651 A | * | 9/1968 | Hatch | A47J 37/0857 126/41 R |
| 3,472,154 A | * | 10/1969 | Dokos | A47J 37/0814 219/532 |
| 3,487,770 A | * | 1/1970 | Svensson | A47J 37/0857 99/387 |
| 3,494,278 A | * | 2/1970 | Chaudoir | A47J 37/0857 474/135 |
| 3,515,054 A | * | 6/1970 | Tadashige | A47J 37/0857 99/335 |
| 3,529,539 A | * | 9/1970 | Schultz | A47J 37/0871 292/70 |
| 3,585,365 A | * | 6/1971 | Kircher | A47J 37/0807 219/512 |
| 3,593,648 A | * | 7/1971 | Walters | A47J 37/0688 99/332 |
| 3,599,312 A | * | 8/1971 | Hitzeroth | A47J 37/0814 99/329 R |
| 3,658,050 A | * | 4/1972 | Snyder | A47J 37/0871 126/340 |
| 3,660,637 A | * | 5/1972 | Grove | A47J 37/0871 126/335 |
| 3,669,004 A | * | 6/1972 | Eaton, Jr. | A47J 37/0623 99/391 |
| 3,684,860 A | * | 8/1972 | Snyder | F24C 7/087 219/398 |
| 3,684,861 A | * | 8/1972 | De Remer | F24C 7/087 219/398 |
| 3,693,536 A | * | 9/1972 | Carville | A47J 37/0857 219/539 |
| 3,693,538 A | * | 9/1972 | Synder | A47J 37/0635 99/337 |
| 3,712,207 A | * | 1/1973 | McGinley | A47J 37/0857 99/427 |
| 3,752,955 A | * | 8/1973 | Grove | A47J 37/0871 219/521 |
| 3,756,219 A | * | 9/1973 | Snyder | A47J 37/0871 217/60 E |
| 3,800,691 A | * | 4/1974 | Eaton, Jr. | F24C 7/087 99/393 |
| 3,823,658 A | * | 7/1974 | Pinchot | A47J 37/08 219/452.13 |
| 3,845,272 A | * | 10/1974 | Schultz | A47J 37/0878 219/521 |
| 3,859,903 A | * | 1/1975 | Kipp | A47J 37/0878 99/393 |
| 3,941,044 A | * | 3/1976 | Goltsos | A47J 37/0807 99/391 |
| 3,986,444 A | * | 10/1976 | Caudron | A47J 37/0814 219/521 |
| 4,044,660 A | * | 8/1977 | Montague | A47J 37/0857 221/253 |
| 4,051,266 A | * | 9/1977 | Goltsos | B65D 81/3492 426/107 |
| 4,065,658 A | * | 12/1977 | Keim | A47J 37/0835 219/386 |
| 4,178,498 A | * | 12/1979 | Snyder | A47J 37/0623 337/3 |
| 4,184,419 A | * | 1/1980 | Ponte | A47J 37/0688 99/402 |
| 4,188,867 A | * | 2/1980 | DeRemer | F24C 15/02 99/425 |
| 4,189,632 A | * | 2/1980 | Swanson | A47J 37/0623 126/340 |
| 4,226,176 A | * | 10/1980 | Macchi | A47J 37/0857 99/335 |
| 4,238,995 A | * | 12/1980 | Polster | A47J 37/0635 99/341 |
| 4,261,257 A | * | 4/1981 | Henderson | A47J 37/044 99/349 |
| 4,276,821 A | * | 7/1981 | Brown | A47J 37/0871 248/206.5 |
| 4,277,659 A | * | 7/1981 | DeRemer | H01H 9/226 219/521 |
| 4,296,312 A | * | 10/1981 | Salem | G05D 23/1951 219/505 |
| 4,345,145 A | * | 8/1982 | Norwood | A47J 37/0623 219/494 |
| 4,345,513 A | * | 8/1982 | Holt | A47J 37/0857 99/335 |
| 4,345,515 A | * | 8/1982 | Holt | A47J 37/0857 99/393 |
| 4,346,651 A | * | 8/1982 | Schickedanz | A47J 37/085 99/335 |
| 4,382,175 A | * | 5/1983 | Huggler | A47J 37/085 219/512 |
| 4,413,173 A | * | 11/1983 | Grove | A47J 37/0635 99/332 |
| 4,455,479 A | * | 6/1984 | Itoh | A47J 37/0635 359/359 |
| 4,456,820 A | * | 6/1984 | Krasznai | H01H 89/04 99/333 |
| 4,476,848 A | * | 10/1984 | Protas | A21B 1/52 126/339 |
| 4,491,066 A | * | 1/1985 | Juriga | A47J 37/0807 99/391 |
| 4,530,276 A | * | 7/1985 | Miller | A47J 37/044 99/393 |
| 4,533,558 A | * | 8/1985 | Ogle | A47J 37/0871 99/391 |
| 4,645,905 A | | 2/1987 | Ming | |
| D297,391 S | * | 8/1988 | Ansel | D7/330 |
| 4,791,862 A | * | 12/1988 | Hoffmann | A47J 37/0814 99/451 |
| 4,889,042 A | * | 12/1989 | Hantz | A47J 37/0629 99/337 |
| 4,972,768 A | * | 11/1990 | Basora San Juan | A47J 37/0807 99/393 |
| 5,011,353 A | | 4/1991 | Boyd | |
| 5,128,521 A | * | 7/1992 | Lanno | G05B 19/042 219/492 |
| D328,686 S | * | 8/1992 | Wolfe | D7/328 |
| 5,156,637 A | * | 10/1992 | Wai-Ching | A47J 37/0892 99/402 |
| 5,193,439 A | * | 3/1993 | Finesman | A47J 37/0842 99/335 |
| 5,203,252 A | * | 4/1993 | Hsieh | A47J 37/0871 219/521 |
| 5,216,944 A | * | 6/1993 | Trujillo | A47J 37/0871 219/521 |
| 5,309,826 A | * | 5/1994 | Ortiz | A47J 37/0807 219/521 |
| 5,335,310 A | | 8/1994 | Novy et al. | |
| 5,390,588 A | * | 2/1995 | Krasznai | A47J 37/0635 219/405 |
| 5,400,697 A | * | 3/1995 | Dax | A47J 37/0807 392/424 |
| 5,402,708 A | * | 4/1995 | Krasznai | A47J 37/0842 219/494 |
| 5,414,243 A | * | 5/1995 | Snell | A47J 37/0842 99/332 |
| 5,423,246 A | * | 6/1995 | McNair | A47J 37/0871 99/393 |
| 5,427,017 A | * | 6/1995 | Cheung | A47J 37/0871 99/450 |
| 5,473,975 A | * | 12/1995 | Bruno | A47J 37/044 99/335 |
| 5,487,328 A | * | 1/1996 | Fujii | A47J 37/0718 99/401 |
| 5,522,306 A | * | 6/1996 | DeMars | A47J 37/0871 99/357 |
| 5,528,980 A | * | 6/1996 | McClean | A47J 37/0871 99/385 |

(56) References Cited

U.S. PATENT DOCUMENTS

| | | | | |
|---|---|---|---|---|
| D371,274 S | * | 7/1996 | Sitaras | D7/350.4 |
| 5,584,231 A | * | 12/1996 | DeLeon | A47J 37/08 |
| | | | | 99/332 |
| 5,642,657 A | * | 7/1997 | Yeung | A47J 37/0871 |
| | | | | 99/393 |
| 5,647,270 A | * | 7/1997 | Rousseau | A47J 37/0814 |
| | | | | 219/521 |
| 5,653,158 A | * | 8/1997 | Balandier | A47J 37/0807 |
| | | | | 219/521 |
| 5,664,483 A | * | 9/1997 | Yip | A47J 37/08 |
| | | | | 99/399 |
| 5,672,288 A | * | 9/1997 | Tran | A47J 37/0842 |
| | | | | 219/505 |
| 5,673,608 A | * | 10/1997 | DeMars | A47J 47/005 |
| | | | | 83/762 |
| 5,673,610 A | * | 10/1997 | Stuck | A47J 37/0864 |
| | | | | 99/393 |
| 5,694,831 A | * | 12/1997 | Haroun | A47J 37/0623 |
| | | | | 219/400 |
| 5,705,791 A | * | 1/1998 | Sutton | A47J 37/0842 |
| | | | | 219/492 |
| 5,735,191 A | * | 4/1998 | Russell | A47J 37/0688 |
| | | | | 99/441 |
| 5,771,780 A | * | 6/1998 | Basora | A47J 37/0814 |
| | | | | 219/521 |
| 5,802,957 A | * | 9/1998 | Wanat | A47J 37/0842 |
| | | | | 219/521 |
| 5,844,207 A | * | 12/1998 | Allard | A47J 37/015 |
| | | | | 219/501 |
| 5,924,355 A | * | 7/1999 | Belknap | A47J 37/0807 |
| | | | | 219/521 |
| D413,041 S | * | 8/1999 | Lin-Yun | D7/350.4 |
| 5,934,721 A | * | 8/1999 | Walde | A47J 43/288 |
| | | | | 294/7 |
| 5,938,959 A | * | 8/1999 | Wang | A47J 37/0629 |
| | | | | 219/403 |
| 5,960,702 A | * | 10/1999 | Thiriat | A47J 37/08 |
| | | | | 99/341 |
| 5,983,785 A | * | 11/1999 | Schreiner | A47J 37/0857 |
| | | | | 99/393 |
| 6,011,242 A | * | 1/2000 | Westerberg | G01L 1/144 |
| | | | | 219/486 |
| 6,019,030 A | * | 2/2000 | Kettman | A47J 37/0857 |
| | | | | 198/849 |
| 6,029,649 A | * | 2/2000 | Su | A47J 37/0623 |
| | | | | 126/41 R |
| D422,172 S | * | 4/2000 | Hsu | D7/337 |
| D423,280 S | * | 4/2000 | Lin | D7/363 |
| 6,058,829 A | * | 5/2000 | Endres | B26D 3/30 |
| | | | | 426/520 |
| 6,060,701 A | | 5/2000 | McKee et al. | |
| 6,073,624 A | | 6/2000 | Laurent | |
| 6,080,963 A | * | 6/2000 | Cardillo | A47J 37/0857 |
| | | | | 219/391 |
| 6,100,502 A | * | 8/2000 | Sham | A47J 37/0623 |
| | | | | 126/369 |
| 6,104,001 A | * | 8/2000 | Huggler | A47J 37/0814 |
| | | | | 219/521 |
| 6,122,437 A | | 9/2000 | Johnson | |
| 6,123,012 A | * | 9/2000 | Hardin | A47J 37/0842 |
| | | | | 219/521 |
| 6,125,234 A | * | 9/2000 | de Jenlis | A47J 37/0807 |
| | | | | 219/385 |
| 6,140,621 A | * | 10/2000 | Ho | A47J 37/0629 |
| | | | | 219/494 |
| D433,867 S | * | 11/2000 | Hsu | D7/350.4 |
| 6,177,654 B1 | * | 1/2001 | Schackmuth | A47J 37/0857 |
| | | | | 99/349 |
| 6,188,045 B1 | | 2/2001 | Hansen et al. | |
| 6,192,789 B1 | * | 2/2001 | Agcaoili | A47J 37/0857 |
| | | | | 99/392 |
| 6,192,790 B1 | * | 2/2001 | Balandier | A47J 37/0807 |
| | | | | 219/521 |
| D438,421 S | * | 3/2001 | Su | D7/350.1 |
| 6,198,078 B1 | * | 3/2001 | Wanat | A47J 37/0842 |
| | | | | 219/501 |
| 6,199,548 B1 | * | 3/2001 | Hsu | F24C 15/023 |
| | | | | 126/41 R |
| 6,217,924 B1 | * | 4/2001 | Sit | A21B 7/005 |
| | | | | 426/523 |
| 6,222,163 B1 | | 4/2001 | Arntz et al. | |
| 6,223,650 B1 | * | 5/2001 | Stuck | A47J 37/0857 |
| | | | | 99/393 |
| 6,240,834 B1 | * | 6/2001 | Chen | A47J 37/0842 |
| | | | | 99/332 |
| 6,242,716 B1 | * | 6/2001 | Wang | A47J 37/0629 |
| | | | | 219/404 |
| 6,244,552 B1 | | 6/2001 | Adams et al. | |
| 6,252,201 B1 | * | 6/2001 | Nevarez | A21B 1/48 |
| | | | | 219/400 |
| 6,267,044 B1 | * | 7/2001 | Friel, Sr. | A47J 37/0857 |
| | | | | 219/521 |
| 6,271,502 B1 | * | 8/2001 | Lee | F24C 15/023 |
| | | | | 16/261 |
| 6,288,369 B1 | * | 9/2001 | Sherman | A47J 37/0635 |
| | | | | 99/392 |
| 6,291,808 B1 | | 9/2001 | Brown | |
| 6,294,769 B1 | | 9/2001 | McCarter | |
| 6,311,609 B1 | * | 11/2001 | Dotan | A47J 37/0807 |
| | | | | 219/521 |
| 6,311,610 B1 | * | 11/2001 | Kettman | A47J 37/0857 |
| | | | | 99/393 |
| 6,313,445 B1 | * | 11/2001 | Garneau | A47J 37/0629 |
| | | | | 219/412 |
| D451,333 S | * | 12/2001 | Hsu | D7/350.4 |
| 6,337,466 B1 | * | 1/2002 | Chasen | A47J 37/0635 |
| | | | | 126/339 |
| 6,357,343 B1 | * | 3/2002 | Tomsich | A47J 37/08 |
| | | | | 99/341 |
| 6,369,360 B1 | | 4/2002 | Cook | |
| 6,371,104 B1 | | 4/2002 | Voohris | |
| 6,378,602 B2 | | 4/2002 | Brown | |
| 6,382,085 B1 | * | 5/2002 | Dotan | A47J 37/0623 |
| | | | | 99/421 H |
| 6,417,492 B1 | * | 7/2002 | Gort-Barten | H05B 3/16 |
| | | | | 219/544 |
| 6,431,057 B1 | * | 8/2002 | Leung | A47J 37/0807 |
| | | | | 99/385 |
| 6,435,081 B1 | * | 8/2002 | Williams | A47J 37/0871 |
| | | | | D6/610 |
| 6,437,291 B1 | | 8/2002 | Hopponen | |
| 6,472,640 B2 | | 10/2002 | Brown et al. | |
| 6,476,360 B1 | * | 11/2002 | Huggler | A47J 37/08 |
| | | | | 99/401 |
| 6,509,549 B1 | * | 1/2003 | Chasen | F24C 15/164 |
| | | | | 99/421 H |
| 6,516,712 B1 | | 2/2003 | Ratermann et al. | |
| 6,521,870 B2 | | 2/2003 | Nolan et al. | |
| 6,523,458 B1 | * | 2/2003 | Turner | A47J 37/0871 |
| | | | | 99/332 |
| 6,539,840 B2 | * | 4/2003 | Choi | H05B 6/80 |
| | | | | 219/679 |
| 6,539,934 B2 | | 4/2003 | Moshonas et al. | |
| 6,543,337 B1 | * | 4/2003 | Brown | A47J 37/085 |
| | | | | 219/521 |
| 6,543,338 B2 | * | 4/2003 | Chasen | A47J 37/0664 |
| | | | | 99/357 |
| 6,546,844 B1 | * | 4/2003 | Trevino | A47J 37/0878 |
| | | | | 99/385 |
| 6,566,638 B2 | | 5/2003 | Brown | |
| 6,570,136 B1 | | 5/2003 | Lockwood et al. | |
| 6,571,687 B1 | * | 6/2003 | Wu | A47J 37/0842 |
| | | | | 219/521 |
| 6,595,117 B1 | * | 7/2003 | Jones | A21B 1/245 |
| | | | | 99/477 |
| 6,603,102 B2 | | 8/2003 | Brown et al. | |

(56) References Cited

U.S. PATENT DOCUMENTS

| | | | |
|---|---|---|---|
| 6,610,970 B1 * | 8/2003 | Back | A47J 37/08 99/392 |
| 6,621,053 B1 * | 9/2003 | Wensink | F24C 15/16 99/399 |
| 6,624,396 B2 | 9/2003 | Witt et al. | |
| 6,657,168 B1 * | 12/2003 | Lazzer | A47J 37/0807 219/386 |
| 6,675,700 B2 * | 1/2004 | Hong | A47J 37/0857 219/521 |
| 6,707,009 B1 * | 3/2004 | Ancona | A47J 47/12 99/357 |
| 6,708,602 B2 * | 3/2004 | Nguyen | A47J 37/08 99/385 |
| 6,718,965 B2 | 4/2004 | Rummel et al. | |
| 6,730,881 B1 | 5/2004 | Arntz et al. | |
| 6,730,888 B1 * | 5/2004 | Battu | A47J 37/085 219/521 |
| 6,732,637 B2 | 5/2004 | Artt | |
| 6,837,234 B2 | 1/2005 | Rabas et al. | |
| D501,356 S * | 2/2005 | Averty | D7/350.4 |
| 6,854,456 B1 | 2/2005 | Friedrich et al. | |
| 6,854,457 B2 | 2/2005 | Rabas et al. | |
| 6,867,398 B2 * | 3/2005 | Lee | H05B 6/80 219/685 |
| 6,874,495 B2 | 4/2005 | McFadden | |
| 6,881,054 B2 | 4/2005 | Levi et al. | |
| 6,903,309 B2 | 6/2005 | Rhinehart | |
| 6,914,219 B2 | 7/2005 | Kuehne | |
| 6,917,017 B2 | 7/2005 | Moon et al. | |
| 6,921,887 B2 * | 7/2005 | Back | A47J 37/08 219/685 |
| 6,930,284 B2 | 8/2005 | Kang | |
| 6,930,295 B2 * | 8/2005 | Kim | A47J 37/0814 219/757 |
| 6,943,321 B2 | 9/2005 | Carbone et al. | |
| 6,943,324 B2 | 9/2005 | Ahuja | |
| 6,979,803 B1 * | 12/2005 | Webb | A47J 37/0807 99/332 |
| 7,005,616 B2 * | 2/2006 | Kim | A47J 37/0676 99/357 |
| 7,044,122 B2 | 5/2006 | Personnettaz et al. | |
| 7,066,168 B1 | 6/2006 | Friedrich et al. | |
| 7,075,442 B2 | 7/2006 | Lion et al. | |
| 7,105,778 B1 * | 9/2006 | DeLong | A47J 37/0635 99/357 |
| 7,132,633 B2 * | 11/2006 | Lee | H05B 6/80 219/710 |
| 7,170,039 B2 * | 1/2007 | Lee | A47J 37/0814 219/685 |
| 7,217,906 B2 * | 5/2007 | Veltrop | A47J 37/08 219/404 |
| 7,220,945 B1 * | 5/2007 | Wang | F24C 15/164 219/393 |
| 7,238,921 B2 * | 7/2007 | Beesley | A47J 29/02 219/412 |
| D549,034 S * | 8/2007 | Garman | D7/329 |
| 7,285,755 B1 * | 10/2007 | Kingdon | A47J 37/0857 99/386 |
| 7,290,482 B2 * | 11/2007 | Pan | A47J 37/0892 219/521 |
| 7,297,903 B1 * | 11/2007 | March | A47J 37/0857 219/400 |
| 7,297,904 B2 | 11/2007 | Paller | |
| 7,301,128 B2 | 11/2007 | Li et al. | |
| 7,309,846 B2 | 12/2007 | Haberkamm et al. | |
| 7,323,663 B2 * | 1/2008 | Cavada | F24C 7/046 392/416 |
| 7,329,838 B2 | 2/2008 | Song et al. | |
| 7,339,138 B1 | 3/2008 | Brooks | |
| 7,340,993 B2 | 3/2008 | Sculuca | |
| 7,354,612 B2 | 4/2008 | Friel, Sr. | |
| 7,368,683 B2 | 5/2008 | Kim et al. | |
| D570,638 S * | 6/2008 | Barnes | D7/329 |
| 7,420,140 B2 | 9/2008 | Lenhart et al. | |
| 7,423,241 B2 | 9/2008 | Hanson | |
| 7,442,901 B2 | 10/2008 | Kim et al. | |
| 7,481,153 B2 * | 1/2009 | Barnes | A47J 37/0821 219/521 |
| 7,554,057 B2 | 6/2009 | Monny | |
| 7,592,570 B2 | 9/2009 | Yoder et al. | |
| D603,649 S * | 11/2009 | Chung | D7/330 |
| 7,619,186 B2 * | 11/2009 | Cavada | F24C 7/082 219/412 |
| D609,958 S * | 2/2010 | Chung | D7/330 |
| 7,750,271 B2 | 7/2010 | Smith et al. | |
| 7,750,272 B2 | 7/2010 | Furlanetto et al. | |
| 7,775,202 B2 | 8/2010 | Chen | |
| 7,793,586 B2 | 9/2010 | Rabas | |
| 7,798,138 B2 | 9/2010 | Babington | |
| 7,806,046 B2 * | 10/2010 | Long | A47J 37/0814 99/399 |
| 7,853,128 B2 * | 12/2010 | Cavada | A47J 37/0807 392/416 |
| 7,872,213 B2 | 1/2011 | De et al. | |
| 7,901,721 B2 | 3/2011 | Oosterling | |
| 7,921,768 B2 | 4/2011 | Fernandez et al. | |
| 7,964,824 B2 | 6/2011 | Moon | |
| 8,029,274 B2 | 10/2011 | Jones et al. | |
| 8,035,062 B2 | 10/2011 | McFadden et al. | |
| 8,042,533 B2 | 10/2011 | Dobie et al. | |
| 8,049,142 B2 | 11/2011 | Blackson et al. | |
| 8,063,342 B2 | 11/2011 | Hines, Jr. | |
| 8,069,776 B2 * | 12/2011 | Glucksman | A47J 37/0807 99/385 |
| 8,071,922 B2 | 12/2011 | Claesson et al. | |
| 8,087,407 B2 | 1/2012 | Wiker et al. | |
| 8,097,833 B2 | 1/2012 | Bonuso et al. | |
| 8,106,334 B2 | 1/2012 | Nam | |
| 8,127,666 B2 * | 3/2012 | Yip | A47J 37/0814 99/393 |
| 8,138,452 B2 | 3/2012 | Thomas et al. | |
| 8,138,453 B2 | 3/2012 | Yang et al. | |
| 8,145,548 B2 | 3/2012 | De Luca | |
| 8,168,928 B2 | 5/2012 | Kim et al. | |
| 8,173,942 B2 | 5/2012 | Wiseman et al. | |
| 8,193,470 B1 | 6/2012 | Harlamert et al. | |
| 8,258,435 B2 | 9/2012 | Bonuso et al. | |
| 8,281,779 B2 | 10/2012 | Wiker et al. | |
| 8,291,813 B2 * | 10/2012 | Leaman | A47J 37/0814 99/392 |
| 8,299,406 B2 | 10/2012 | Zhou et al. | |
| 8,304,695 B2 | 11/2012 | Bonuso et al. | |
| 8,336,449 B2 * | 12/2012 | Brady | A47J 37/0814 99/389 |
| 8,350,192 B2 | 1/2013 | Phillips et al. | |
| 8,371,285 B2 | 2/2013 | Wiker et al. | |
| 8,378,265 B2 | 2/2013 | Greenwood et al. | |
| 8,415,591 B2 | 4/2013 | Boyer et al. | |
| 8,453,890 B2 * | 6/2013 | Widdison | A47J 47/01 222/536 |
| 8,534,779 B2 | 9/2013 | Schaaf | |
| 8,561,526 B2 * | 10/2013 | Zhang | A47J 37/0814 99/392 |
| 8,642,928 B2 | 2/2014 | Schulte | |
| 8,669,500 B2 * | 3/2014 | Hensel | A47J 37/0807 219/483 |
| 8,735,778 B2 | 5/2014 | Greenwood et al. | |
| 8,748,783 B2 | 6/2014 | Hensel et al. | |
| 8,859,941 B2 | 10/2014 | Gladhill et al. | |
| 8,929,724 B1 * | 1/2015 | Mograbi | F24C 7/065 219/486 |
| 8,930,160 B2 | 1/2015 | Wall et al. | |
| 8,946,602 B2 | 2/2015 | Hertzberg et al. | |
| 8,946,604 B2 | 2/2015 | Kaiser et al. | |
| 8,950,319 B2 | 2/2015 | Nam et al. | |
| 8,991,383 B2 | 3/2015 | Johnson | |
| 8,993,934 B2 | 3/2015 | Giazzon et al. | |
| 8,997,635 B2 * | 4/2015 | Buzick | A47J 37/0629 99/393 |
| 9,016,191 B2 | 4/2015 | Krolick et al. | |
| 9,060,640 B2 | 6/2015 | Barrows et al. | |

(56) References Cited

U.S. PATENT DOCUMENTS

| | | | |
|---|---|---|---|
| 9,074,776 B2 | 7/2015 | Greenwood et al. | |
| 9,089,005 B2* | 7/2015 | Boedicker | H05B 1/0263 |
| 9,131,804 B2* | 9/2015 | Turner | A47J 37/0814 |
| 9,157,640 B2 | 10/2015 | Distaso et al. | |
| 9,215,951 B2* | 12/2015 | Korbin | A47J 37/0807 |
| 9,220,276 B2 | 12/2015 | Howard | |
| D751,853 S* | 3/2016 | Hunt | D7/330 |
| 9,314,134 B2 | 4/2016 | Molnar | |
| 9,335,054 B2 | 5/2016 | Donarski | |
| 9,372,000 B2 | 6/2016 | Ploof et al. | |
| 9,395,088 B2 | 7/2016 | Wiggins et al. | |
| 9,395,089 B2 | 7/2016 | Nelson et al. | |
| 9,402,472 B1 | 8/2016 | Levi | |
| 9,402,505 B2 | 8/2016 | Johncock et al. | |
| 9,404,660 B1 | 8/2016 | Karabin et al. | |
| 9,408,497 B2* | 8/2016 | Conti | A47J 37/08 |
| 9,418,528 B2 | 8/2016 | Stokes | |
| 9,474,284 B2 | 10/2016 | Dougherty | |
| 9,474,413 B2* | 10/2016 | Romandy | A47J 37/0629 |
| 9,482,586 B2 | 11/2016 | Chen et al. | |
| 9,526,374 B2 | 12/2016 | Kim | |
| 9,534,794 B2 | 1/2017 | Rogers et al. | |
| 9,545,154 B2 | 1/2017 | Duke | |
| 9,554,421 B2 | 1/2017 | Meusburger | |
| 9,629,499 B2 | 4/2017 | Kim | |
| 9,664,422 B2 | 5/2017 | Godecker et al. | |
| 9,677,774 B2 | 6/2017 | McKee et al. | |
| 9,681,773 B2 | 6/2017 | McKee et al. | |
| 9,689,576 B2 | 6/2017 | Johnson et al. | |
| 9,726,379 B2 | 8/2017 | Wiseman et al. | |
| 9,737,936 B2 | 8/2017 | Linglin et al. | |
| 9,746,189 B2 | 8/2017 | Kantas | |
| 9,841,261 B2 | 12/2017 | Raghavan et al. | |
| 9,863,644 B2 | 1/2018 | Bond et al. | |
| 9,874,353 B2* | 1/2018 | Thabit | F24C 15/16 |
| 9,900,936 B2 | 2/2018 | Imm et al. | |
| 9,903,598 B2 | 2/2018 | Greenwood et al. | |
| 9,920,934 B2 | 3/2018 | Donarski et al. | |
| 9,924,830 B1* | 3/2018 | Glucksman | A47J 37/0611 |
| 9,927,127 B2 | 3/2018 | Johnson et al. | |
| 10,004,358 B2 | 6/2018 | Wildebush | |
| 10,016,092 B2 | 7/2018 | Barrows et al. | |
| 10,022,008 B1 | 7/2018 | Staton et al. | |
| 10,024,541 B2 | 7/2018 | Wojick et al. | |
| 10,024,548 B2 | 7/2018 | Wiker et al. | |
| 10,028,608 B2* | 7/2018 | Carbone | A21B 3/04 |
| 10,034,609 B2 | 7/2018 | Sun et al. | |
| 10,036,558 B2 | 7/2018 | Wiker et al. | |
| 10,058,210 B2 | 8/2018 | Palermo | |
| 10,064,244 B2 | 8/2018 | Cheng et al. | |
| 10,082,297 B2 | 9/2018 | Kim et al. | |
| 10,088,172 B2 | 10/2018 | McKee et al. | |
| 10,094,575 B2 | 10/2018 | Evans et al. | |
| 10,101,038 B2 | 10/2018 | Kim et al. | |
| 10,119,706 B2 | 11/2018 | Chadwick et al. | |
| 10,119,708 B2 | 11/2018 | Bartelick et al. | |
| 10,132,505 B2 | 11/2018 | Son et al. | |
| 10,154,549 B2 | 12/2018 | Nasu et al. | |
| 10,156,366 B2 | 12/2018 | Braden et al. | |
| D836,964 S* | 1/2019 | Wenzel | D7/328 |
| 10,182,680 B2 | 1/2019 | Koetz | |
| 10,190,783 B2 | 1/2019 | Rogers et al. | |
| 10,222,071 B2 | 3/2019 | Deng et al. | |
| 10,234,145 B2 | 3/2019 | Chadwick et al. | |
| 10,240,387 B2 | 3/2019 | Nelson | |
| 10,253,988 B2 | 4/2019 | Colozzo et al. | |
| 10,253,989 B2 | 4/2019 | Helm et al. | |
| 10,258,195 B2 | 4/2019 | Blomberg | |
| 10,271,686 B2 | 4/2019 | Roy | |
| 10,274,205 B2 | 4/2019 | Cecchin et al. | |
| 10,278,540 B1* | 5/2019 | Huggins | A47J 37/0857 |
| 10,288,295 B2 | 5/2019 | Chadwick et al. | |
| 10,288,311 B2 | 5/2019 | Cho et al. | |
| 10,302,309 B2 | 5/2019 | Paller | |
| 10,314,315 B2 | 6/2019 | Hegge et al. | |
| 10,317,091 B2 | 6/2019 | Chadwick et al. | |
| 10,322,661 B2 | 6/2019 | Babington et al. | |
| 10,327,587 B2 | 6/2019 | Liao | |
| 10,327,592 B2 | 6/2019 | Wu | |
| 10,337,745 B2 | 7/2019 | McKee et al. | |
| 10,359,200 B2 | 7/2019 | Braden et al. | |
| 10,368,403 B2 | 7/2019 | Hayashi et al. | |
| 10,371,391 B2 | 8/2019 | Tcaciuc | |
| 10,405,696 B2 | 9/2019 | Kim | |
| 10,408,467 B2 | 9/2019 | Chadwick et al. | |
| 10,441,110 B2* | 10/2019 | Hensel | A47J 37/0835 |
| 10,448,457 B2 | 10/2019 | Johnson et al. | |
| 10,451,290 B2 | 10/2019 | Mayberry | |
| 10,517,429 B2 | 12/2019 | West et al. | |
| 10,520,199 B2 | 12/2019 | Polster | |
| 10,524,615 B2 | 1/2020 | Reales Bertomeo et al. | |
| 10,527,290 B2 | 1/2020 | Armstrong | |
| 10,561,274 B2 | 2/2020 | Huang | |
| 10,582,573 B2 | 3/2020 | Hoare et al. | |
| 10,591,166 B2 | 3/2020 | Reinhart | |
| 10,591,168 B2* | 3/2020 | Yang | F24C 15/026 |
| 10,624,497 B1* | 4/2020 | Bumgarner | A47J 37/06 |
| 10,660,470 B2 | 5/2020 | Li et al. | |
| 10,682,010 B2 | 6/2020 | Hoare et al. | |
| 10,682,014 B2* | 6/2020 | Moughton | A47J 37/08 |
| 10,728,962 B2 | 7/2020 | Rollet et al. | |
| 10,731,869 B2 | 8/2020 | Ghiglieri et al. | |
| 10,732,652 B2 | 8/2020 | Yazdi et al. | |
| 10,842,318 B2* | 11/2020 | Feldman | H01C 17/28 |
| 10,883,724 B2 | 1/2021 | Moon et al. | |
| 11,357,352 B2* | 6/2022 | Gray | A47J 37/0885 |
| 11,445,859 B2* | 9/2022 | Denham | A47J 37/0857 |
| 2001/0016222 A1* | 8/2001 | Tomsich | A47J 37/0857 426/523 |
| 2001/0029823 A1* | 10/2001 | Ancona | A47J 37/0871 99/357 |
| 2002/0023911 A1 | 2/2002 | Bales et al. | |
| 2002/0053564 A1* | 5/2002 | Taylor | A47J 37/0807 219/460.1 |
| 2002/0073851 A1* | 6/2002 | Chung | A47J 37/0814 99/389 |
| 2002/0104444 A1* | 8/2002 | Van Der Meer | A47J 37/0807 99/385 |
| 2002/0113054 A1* | 8/2002 | Arel | A47J 37/0857 219/386 |
| 2002/0117057 A1* | 8/2002 | Van Der Meer | A47J 37/0807 99/385 |
| 2002/0152898 A1* | 10/2002 | DuBois | A47J 37/0857 99/349 |
| 2002/0162833 A1 | 11/2002 | Arntz et al. | |
| 2003/0015514 A1 | 1/2003 | Choat et al. | |
| 2003/0015518 A1 | 1/2003 | Baker et al. | |
| 2003/0056658 A1* | 3/2003 | Jones | A47J 37/0857 99/443 C |
| 2003/0116555 A1 | 6/2003 | Wakefield et al. | |
| 2003/0116557 A1* | 6/2003 | Graff | F24C 7/087 219/412 |
| 2003/0145739 A1* | 8/2003 | Mauffrey | A47J 37/0878 99/389 |
| 2003/0146201 A1 | 8/2003 | Smith et al. | |
| 2003/0146205 A1 | 8/2003 | Rael et al. | |
| 2003/0159594 A1* | 8/2003 | Tan | A47J 37/0857 99/385 |
| 2003/0168438 A1* | 9/2003 | Zhou | A47J 37/0835 219/386 |
| 2003/0192885 A1 | 10/2003 | Shon et al. | |
| 2003/0196556 A1* | 10/2003 | Lile | A47J 37/0871 99/344 |
| 2003/0197002 A1* | 10/2003 | Lile | A47J 37/0842 219/501 |
| 2003/0226452 A1 | 12/2003 | Artt | |
| 2004/0040950 A1 | 3/2004 | Carbone et al. | |
| 2004/0059538 A1 | 3/2004 | Fulton et al. | |
| 2004/0083900 A1* | 5/2004 | Rousseau | A47J 37/0857 99/385 |
| 2004/0129692 A1 | 7/2004 | Kim et al. | |
| 2004/0178192 A1 | 9/2004 | Muegge et al. | |
| 2004/0200822 A1 | 10/2004 | Boyer | |

(56) References Cited

U.S. PATENT DOCUMENTS

| | | | |
|---|---|---|---|
| 2004/0211324 A1* | 10/2004 | Wanat | A47J 37/0871 99/385 |
| 2004/0216731 A1 | 11/2004 | Personnettaz et al. | |
| 2004/0222215 A1* | 11/2004 | Reyes | A47J 37/0807 219/521 |
| 2004/0261632 A1 | 12/2004 | Hansen et al. | |
| 2005/0006382 A1 | 1/2005 | Hayakawa et al. | |
| 2005/0056267 A1 | 3/2005 | Levi et al. | |
| 2005/0057910 A1 | 3/2005 | Schnurr | |
| 2005/0109218 A1* | 5/2005 | Arnedo | A47J 37/0857 99/389 |
| 2005/0132900 A1* | 6/2005 | Cavada | A47J 37/0807 99/389 |
| 2005/0204927 A1* | 9/2005 | Boyle | A47J 37/0857 99/389 |
| 2005/0217503 A1 | 10/2005 | McFadden | |
| 2006/0003277 A1 | 1/2006 | Jeng | |
| 2006/0049166 A1* | 3/2006 | Picozza | A47J 37/0871 219/386 |
| 2006/0065129 A1* | 3/2006 | Yu | H05B 6/687 99/385 |
| 2006/0113295 A1 | 6/2006 | Fisher et al. | |
| 2006/0131296 A1* | 6/2006 | Wong | A47J 37/0629 219/391 |
| 2006/0162573 A1* | 7/2006 | Yip | A47J 37/085 99/389 |
| 2006/0163238 A1 | 7/2006 | Miller et al. | |
| 2006/0182862 A1* | 8/2006 | Ely | A47J 37/0814 426/523 |
| 2006/0192468 A1 | 8/2006 | Gardner | |
| 2006/0213373 A1 | 9/2006 | Fernandez et al. | |
| 2006/0261056 A1* | 11/2006 | Veltrop | A47J 37/0857 219/521 |
| 2006/0289441 A1 | 12/2006 | Bartelick | |
| 2007/0012307 A1* | 1/2007 | Wiker | A21B 1/40 126/21 A |
| 2007/0084849 A1 | 4/2007 | Smith et al. | |
| 2007/0095813 A1 | 5/2007 | Sung et al. | |
| 2007/0251519 A1* | 11/2007 | Anikhindi | F24C 15/023 49/404 |
| 2007/0277678 A1 | 12/2007 | Mangano | |
| 2008/0037965 A1 | 2/2008 | De Luca | |
| 2008/0087200 A1 | 4/2008 | Salmon et al. | |
| 2008/0105135 A1 | 5/2008 | McFadden et al. | |
| 2008/0128403 A1 | 6/2008 | Jones et al. | |
| 2008/0149089 A1 | 6/2008 | Karabin et al. | |
| 2008/0156202 A1 | 7/2008 | Park et al. | |
| 2008/0173185 A1* | 7/2008 | Lam | A47J 37/0871 99/339 |
| 2008/0184898 A1* | 8/2008 | Huang | A47J 37/0857 99/386 |
| 2008/0185372 A1 | 8/2008 | Elkasevic | |
| 2008/0185373 A1 | 8/2008 | Elkasevic et al. | |
| 2008/0185942 A1 | 8/2008 | Elkasevic et al. | |
| 2008/0203085 A1* | 8/2008 | Hensel | A47J 37/0835 219/492 |
| 2008/0257171 A1* | 10/2008 | Wang | A47J 37/0807 99/389 |
| 2009/0039069 A1* | 2/2009 | Lin | A47J 36/34 219/393 |
| 2009/0064870 A1* | 3/2009 | Pan | A47J 37/0814 99/389 |
| 2009/0134151 A1 | 5/2009 | Bogatin et al. | |
| 2009/0139409 A1* | 6/2009 | Hall | A47J 37/0857 99/326 |
| 2009/0165657 A1 | 7/2009 | Cheng | |
| 2009/0175994 A1* | 7/2009 | Chung | A47J 37/0814 426/466 |
| 2009/0288563 A1* | 11/2009 | Lim | A47J 37/085 99/326 |
| 2009/0293737 A1* | 12/2009 | Davis | A47J 37/0885 99/394 |
| 2009/0293738 A1* | 12/2009 | Russell | A47J 37/0857 99/427 |
| 2010/0006561 A1* | 1/2010 | Hensel | A47J 37/0807 219/483 |
| 2010/0092275 A1 | 4/2010 | Savitz | |
| 2010/0122977 A1* | 5/2010 | Yang | A47J 37/0871 219/520 |
| 2010/0147824 A1 | 6/2010 | Bonuso et al. | |
| 2010/0154653 A1* | 6/2010 | Douglas | A47J 37/085 219/385 |
| 2010/0175562 A1* | 7/2010 | Brady | A47J 37/0814 99/332 |
| 2010/0178407 A1* | 7/2010 | Rizzuto | A21B 3/04 99/473 |
| 2010/0231105 A1 | 9/2010 | Latif | |
| 2010/0275789 A1* | 11/2010 | Lee | A47J 37/0857 99/386 |
| 2010/0282097 A1 | 11/2010 | Schulte | |
| 2010/0282738 A1 | 11/2010 | Leikam et al. | |
| 2010/0326980 A1 | 12/2010 | Shingler | |
| 2011/0059210 A1* | 3/2011 | Veltrop | A47J 37/0871 426/240 |
| 2011/0091621 A1* | 4/2011 | Hering | A47J 37/0885 99/449 |
| 2011/0100974 A1 | 5/2011 | Steer | |
| 2011/0151072 A1 | 6/2011 | Anderson et al. | |
| 2011/0179953 A1* | 7/2011 | Glucksman | A47J 37/0807 99/385 |
| 2011/0185918 A1* | 8/2011 | Zhang | A47J 37/0871 99/391 |
| 2011/0239871 A1* | 10/2011 | Lin | A47J 37/0857 219/443.1 |
| 2011/0256286 A1* | 10/2011 | Ewald | A23L 5/13 426/456 |
| 2011/0277643 A1* | 11/2011 | Schwierking | A47J 36/32 99/331 |
| 2011/0303099 A1* | 12/2011 | Lazzer | A47J 37/0807 99/385 |
| 2011/0303100 A1* | 12/2011 | Agnello | A47J 37/0807 165/104.19 |
| 2012/0058234 A1 | 3/2012 | Navon | |
| 2012/0060821 A1* | 3/2012 | McNamee | E05D 15/46 126/197 |
| 2012/0067225 A1* | 3/2012 | Attias | A47J 37/0871 99/339 |
| 2012/0121782 A1* | 5/2012 | Veltrop | A47J 37/0857 426/505 |
| 2012/0160111 A1 | 6/2012 | Hozumi et al. | |
| 2012/0163780 A1 | 6/2012 | De Luca | |
| 2012/0196011 A1* | 8/2012 | Felix | A23L 3/28 426/243 |
| 2012/0237646 A1 | 9/2012 | De Luca | |
| 2013/0101240 A1 | 4/2013 | Jaehrling et al. | |
| 2013/0153562 A1 | 6/2013 | Cescot et al. | |
| 2013/0177687 A1* | 7/2013 | Cheung | A47J 37/0857 426/466 |
| 2013/0220144 A1* | 8/2013 | Chen | A47J 37/0871 99/391 |
| 2013/0233182 A1 | 9/2013 | Hunt et al. | |
| 2013/0291854 A1* | 11/2013 | Johnson | A21B 1/245 126/21 A |
| 2013/0306616 A1* | 11/2013 | Wildebush | A47J 37/0857 219/413 |
| 2014/0016916 A1 | 1/2014 | Lee | |
| 2014/0021192 A1* | 1/2014 | Smith | F24C 1/10 219/409 |
| 2014/0157994 A1* | 6/2014 | Ryan | H05B 1/0263 99/332 |
| 2014/0157996 A1* | 6/2014 | Korbin | A47J 37/0807 99/389 |
| 2014/0158676 A1 | 6/2014 | Phillips et al. | |
| 2014/0178552 A1* | 6/2014 | Walker | A47J 37/0871 426/520 |
| 2014/0199446 A1* | 7/2014 | Huegerich | A47J 37/0857 426/233 |

(56) References Cited

U.S. PATENT DOCUMENTS

| | | | |
|---|---|---|---|
| 2014/0246418 A1* | 9/2014 | Ye | A47J 37/08 219/391 |
| 2014/0261371 A1 | 9/2014 | Van et al. | |
| 2014/0283811 A1 | 9/2014 | Kershner et al. | |
| 2014/0318382 A1* | 10/2014 | Hornbeck | A47J 36/32 99/332 |
| 2014/0352549 A1* | 12/2014 | Upston | A47J 37/0814 99/334 |
| 2015/0040774 A1* | 2/2015 | Fung | A47J 37/0623 219/412 |
| 2015/0047514 A1 | 2/2015 | Abe et al. | |
| 2015/0053093 A1* | 2/2015 | Chang | A47J 37/0807 99/341 |
| 2015/0053094 A1* | 2/2015 | Conti | A47J 37/0807 99/390 |
| 2015/0056355 A1* | 2/2015 | Cusell | A47J 37/0807 426/523 |
| 2015/0114237 A1* | 4/2015 | Abukashef | A47J 37/0857 99/393 |
| 2015/0122242 A1 | 5/2015 | Murray | |
| 2015/0208863 A1* | 7/2015 | Buzick | A47J 37/0722 99/446 |
| 2015/0257597 A1* | 9/2015 | Marschke | A47J 37/0807 29/890.03 |
| 2015/0260416 A1 | 9/2015 | Chadwick et al. | |
| 2015/0297030 A1* | 10/2015 | Everett, Jr. | H05B 3/265 426/466 |
| 2015/0354827 A1 | 12/2015 | Faraldi et al. | |
| 2015/0359046 A1 | 12/2015 | Mohseni | |
| 2015/0369491 A1 | 12/2015 | Estrella et al. | |
| 2016/0029829 A1* | 2/2016 | Klein | A47J 37/08 99/332 |
| 2016/0045069 A1* | 2/2016 | Benitez | A47J 37/08 426/418 |
| 2016/0096050 A1 | 4/2016 | Vermeersch et al. | |
| 2016/0120362 A1* | 5/2016 | Fields | A47J 37/08 99/378 |
| 2016/0183728 A1* | 6/2016 | Moma-M04-US1-APP-ADS et al. | B26D 7/34 426/466 |
| 2016/0220057 A1* | 8/2016 | Smith | H05B 3/0076 |
| 2016/0258634 A1 | 9/2016 | Helm et al. | |
| 2016/0278576 A1* | 9/2016 | Manning | A47J 37/0871 |
| 2016/0278579 A1* | 9/2016 | Goddard | A47J 43/283 |
| 2016/0296012 A1 | 10/2016 | Ciccacci et al. | |
| 2016/0298856 A1* | 10/2016 | Trood | F24C 15/021 |
| 2016/0367078 A1* | 12/2016 | Bauer | A47J 37/0857 |
| 2016/0374157 A1* | 12/2016 | Ham | F24C 15/023 |
| 2017/0010004 A1 | 1/2017 | Bettencourt | |
| 2017/0112155 A1 | 4/2017 | Franzolin | |
| 2017/0115008 A1 | 4/2017 | Erbe et al. | |
| 2017/0127700 A1 | 5/2017 | Armstrong et al. | |
| 2017/0215639 A1* | 8/2017 | Chang | A47J 37/0611 |
| 2017/0285597 A1 | 10/2017 | Franzolin | |
| 2017/0303742 A1* | 10/2017 | Gallego II, II | A47J 37/0885 |
| 2017/0318629 A1* | 11/2017 | Mohseni | H05B 6/6402 |
| 2018/0038737 A1 | 2/2018 | Hedlund et al. | |
| 2018/0045421 A1 | 2/2018 | Bailie | |
| 2018/0078091 A1* | 3/2018 | Chubb | A47J 37/0871 |
| 2018/0115161 A1 | 4/2018 | Marsh-croft et al. | |
| 2018/0132648 A1 | 5/2018 | Furlanetto et al. | |
| 2018/0134204 A1 | 5/2018 | Aplin | |
| 2018/0139805 A1 | 5/2018 | Hayashi | |
| 2018/0142900 A1 | 5/2018 | McKee et al. | |
| 2018/0152996 A1 | 5/2018 | Carcano et al. | |
| 2018/0153000 A1 | 5/2018 | Carcano et al. | |
| 2018/0156469 A1 | 6/2018 | Paller | |
| 2018/0184669 A1 | 7/2018 | Haas et al. | |
| 2018/0206677 A1 | 7/2018 | Ivarsson et al. | |
| 2018/0224127 A1 | 8/2018 | Lambert et al. | |
| 2018/0235239 A1 | 8/2018 | Reese et al. | |
| 2018/0238560 A1 | 8/2018 | Deng et al. | |
| 2018/0289209 A1* | 10/2018 | Yazvin | A47J 36/32 |
| 2018/0289213 A1 | 10/2018 | Stanford | |
| 2018/0317705 A1 | 11/2018 | Roy | |
| 2018/0317709 A1* | 11/2018 | Leach | A47J 37/0857 |
| 2018/0317710 A1* | 11/2018 | Vega | A21B 1/48 |
| 2018/0325311 A1* | 11/2018 | Feldman | F24C 7/046 |
| 2018/0332999 A1 | 11/2018 | Nie | |
| 2018/0338354 A1* | 11/2018 | Bassill | H05B 6/6441 |
| 2019/0000267 A1* | 1/2019 | Li | A47J 37/0641 |
| 2019/0008322 A1* | 1/2019 | Feldman | F24C 7/046 |
| 2019/0024904 A1* | 1/2019 | Ueda | F24C 13/00 |
| 2019/0069719 A1 | 3/2019 | Huang et al. | |
| 2019/0110630 A1 | 4/2019 | Kitabayashi et al. | |
| 2019/0120500 A1 | 4/2019 | Kim et al. | |
| 2019/0120502 A1 | 4/2019 | Zanchetta et al. | |
| 2019/0142206 A1 | 5/2019 | Yan et al. | |
| 2019/0142216 A1 | 5/2019 | Huang et al. | |
| 2019/0159288 A1 | 5/2019 | Warwick | |
| 2019/0166850 A1 | 6/2019 | Bailie | |
| 2019/0167040 A1* | 6/2019 | Bauer | A21C 15/00 |
| 2019/0168968 A1* | 6/2019 | Bauer | B65G 17/065 |
| 2019/0170368 A1 | 6/2019 | Rogers et al. | |
| 2019/0208793 A1* | 7/2019 | Bauer | A47J 37/0857 |
| 2019/0254471 A1 | 8/2019 | Reinhard-Herrscher et al. | |
| 2019/0264924 A1* | 8/2019 | Wang | F24C 5/16 |
| 2019/0274315 A1* | 9/2019 | Newhouse | A21B 1/26 |
| 2019/0282029 A1 | 9/2019 | Goldberg | |
| 2019/0313846 A1* | 10/2019 | Abukashef | A47J 37/0629 |
| 2019/0331536 A1 | 10/2019 | Hioki et al. | |
| 2019/0350407 A1* | 11/2019 | Sharpe | A47J 37/0664 |
| 2019/0357319 A1 | 11/2019 | Bassill et al. | |
| 2020/0011535 A1 | 1/2020 | Lambert et al. | |
| 2020/0029735 A1* | 1/2020 | Tofaili | A47J 37/085 |
| 2020/0037816 A1 | 2/2020 | Hackley | |
| 2020/0037820 A1* | 2/2020 | Vega | A47J 37/045 |
| 2020/0054169 A1* | 2/2020 | Loftin | A47J 37/0857 |
| 2020/0060470 A1 | 2/2020 | Bate | |
| 2020/0069113 A1 | 3/2020 | Anthony et al. | |
| 2020/0093329 A1 | 3/2020 | Glucksman | |
| 2020/0121128 A1* | 4/2020 | Gauger | A47J 37/0864 |
| 2020/0173663 A1 | 6/2020 | Yang et al. | |
| 2020/0178731 A1* | 6/2020 | Zheng | H05B 3/141 |
| 2020/0178732 A1* | 6/2020 | Staun | A47J 37/0807 |
| 2020/0217504 A1 | 7/2020 | Hensley | |
| 2020/0227874 A1* | 7/2020 | Schroeder | H01R 13/642 |
| 2020/0260912 A1* | 8/2020 | Carbone | H05B 3/24 |
| 2020/0268200 A1* | 8/2020 | Anthony | A47J 37/0871 |
| 2020/0288912 A1* | 9/2020 | Shei | H04N 5/33 |
| 2020/0305640 A1* | 10/2020 | Bauer | A47J 37/0857 |
| 2020/0323389 A1* | 10/2020 | Nie | A47J 37/0807 |
| 2020/0337499 A1* | 10/2020 | Tsui | A47J 37/0611 |
| 2020/0346823 A1* | 11/2020 | Patel | B65D 43/161 |
| 2020/0375397 A1* | 12/2020 | Zhang | A47J 37/0871 |
| 2021/0076687 A1* | 3/2021 | Okur | A47J 37/0871 |
| 2021/0106175 A1* | 4/2021 | Carbone | A47J 37/085 |

FOREIGN PATENT DOCUMENTS

| | | |
|---|---|---|
| CN | 100574687 C | 12/2009 |
| CN | 101091625 B | 2/2011 |
| CN | 101484756 B | 5/2012 |
| CN | 102472496 A | 5/2012 |
| CN | 202698901 U | 1/2013 |
| CN | 203195501 U | 9/2013 |
| CN | 203914492 U | 11/2014 |
| CN | 104783642 A | 7/2015 |
| CN | 204427667 U | 7/2015 |
| CN | 105009687 A | 10/2015 |
| CN | 105147130 A | 12/2015 |
| CN | 204931396 U | 1/2016 |
| CN | 204931397 U | 1/2016 |
| CN | 204970939 U | 1/2016 |
| CN | 105662172 A | 6/2016 |
| CN | 105708180 A | 6/2016 |
| CN | 205697311 U | 11/2016 |
| CN | 106196182 A | 12/2016 |
| CN | 106214012 A | 12/2016 |
| CN | 205795486 U | 12/2016 |
| CN | 106413477 A | 2/2017 |
| CN | 106419618 A | 2/2017 |

(56) References Cited

FOREIGN PATENT DOCUMENTS

| | | | |
|---|---|---|---|
| CN | 106539503 A | 3/2017 |
| CN | 206006997 U | 3/2017 |
| CN | 206007052 U | 3/2017 |
| CN | 106724895 A | 5/2017 |
| CN | 106821018 A | 6/2017 |
| CN | 106821025 A | 6/2017 |
| CN | 206414143 U | 8/2017 |
| CN | 107143891 A | 9/2017 |
| CN | 206548360 U | 10/2017 |
| CN | 206641763 U | 11/2017 |
| CN | 107495855 A | 12/2017 |
| CN | 105852659 B | 2/2018 |
| CN | 107661027 A | 2/2018 |
| CN | 107713767 A | 2/2018 |
| CN | 107847064 A | 3/2018 |
| CN | 207071051 U | 3/2018 |
| CN | 107928444 A | 4/2018 |
| CN | 207306565 U | 5/2018 |
| CN | 108158242 A | 6/2018 |
| CN | 108185838 A | 6/2018 |
| CN | 108354469 A | 8/2018 |
| CN | 108392098 A | 8/2018 |
| CN | 108523630 A | 9/2018 |
| CN | 207804022 U | 9/2018 |
| CN | 207804081 U | 9/2018 |
| CN | 207870767 U | 9/2018 |
| CN | 108814331 A | 11/2018 |
| CN | 208048599 U | 11/2018 |
| CN | 208114513 U | 11/2018 |
| CN | 108968709 A | 12/2018 |
| CN | 109059059 A | 12/2018 |
| CN | 208192773 U | 12/2018 |
| CN | 109419379 A | 3/2019 |
| CN | 109431290 A | 3/2019 |
| CN | 109464016 A | 3/2019 |
| CN | 109497820 A | 3/2019 |
| CN | 208610551 U | 3/2019 |
| CN | 208625320 U | 3/2019 |
| CN | 107280448 B | 4/2019 |
| CN | 109645808 A | 4/2019 |
| CN | 109645809 A | 4/2019 |
| CN | 208692933 U | 4/2019 |
| CN | 208692935 U | 4/2019 |
| CN | 208709570 U | 4/2019 |
| CN | 208740622 U | 4/2019 |
| CN | 208740631 U | 4/2019 |
| CN | 208769451 U | 4/2019 |
| CN | 208769454 U | 4/2019 |
| CN | 208769558 U | 4/2019 |
| CN | 208837593 U | 5/2019 |
| CN | 208905522 U | 5/2019 |
| CN | 208909702 U | 5/2019 |
| CN | 208941783 U | 6/2019 |
| CN | 208957617 U | 6/2019 |
| CN | 208957778 U | 6/2019 |
| CN | 208973345 U | 6/2019 |
| CN | 208973366 U | 6/2019 |
| CN | 209003525 U | 6/2019 |
| CN | 209047883 U | 7/2019 |
| CN | 209058777 U | 7/2019 |
| CN | 209058815 U | 7/2019 |
| CN | 209121883 U | 7/2019 |
| CN | 107741038 B | 8/2019 |
| CN | 209235721 U | 8/2019 |
| CN | 209235732 U | 8/2019 |
| CN | 209252419 U | 8/2019 |
| CN | 209252420 U | 8/2019 |
| CN | 209315609 U | 8/2019 |
| CN | 209391650 U | 9/2019 |
| CN | 110353515 A | 10/2019 |
| CN | 209450370 U | 10/2019 |
| CN | 209547804 U | 10/2019 |
| CN | 110403444 A | 11/2019 |
| CN | 209574358 U | 11/2019 |
| CN | 209661251 U | 11/2019 |
| CN | 107744329 B | 12/2019 |
| CN | 110584452 A | 12/2019 |
| CN | 110604453 A | 12/2019 |
| CN | 209712532 U | 12/2019 |
| CN | 209826268 U | 12/2019 |
| CN | 209863300 U | 12/2019 |
| CN | 209863301 U | 12/2019 |
| CN | 209863302 U | 12/2019 |
| CN | 209863303 U | 12/2019 |
| CN | 209863304 U | 12/2019 |
| CN | 209863306 U | 12/2019 |
| CN | 209863308 U | 12/2019 |
| CN | 209863317 U | 12/2019 |
| CN | 110731694 A | 1/2020 |
| CN | 209899161 U | 1/2020 |
| CN | 209966076 U | 1/2020 |
| CN | 209995896 U | 1/2020 |
| CN | 209995897 U | 1/2020 |
| CN | 209995898 U | 1/2020 |
| CN | 209995899 U | 1/2020 |
| CN | 209995927 U | 1/2020 |
| CN | 209995930 U | 1/2020 |
| CN | 110742493 A | 2/2020 |
| CN | 110786723 A | 2/2020 |
| CN | 110786724 A | 2/2020 |
| CN | 210124571 U | 3/2020 |
| CN | 210124572 U | 3/2020 |
| CN | 210124573 U | 3/2020 |
| CN | 210124574 U | 3/2020 |
| CN | 210124575 U | 3/2020 |
| CN | 210124576 U | 3/2020 |
| CN | 210124577 U | 3/2020 |
| CN | 210124579 U | 3/2020 |
| CN | 210124628 U | 3/2020 |
| CN | 210169717 U | 3/2020 |
| CN | 210169718 U | 3/2020 |
| CN | 210169780 U | 3/2020 |
| CN | 110946465 A | 4/2020 |
| CN | 210276843 U | 4/2020 |
| CN | 210300599 U | 4/2020 |
| CN | 111110009 A | 5/2020 |
| CN | 210446663 U | 5/2020 |
| CN | 210520760 U | 5/2020 |
| CN | 210540950 U | 5/2020 |
| CN | 210582123 U | 5/2020 |
| CN | 210697141 U | 6/2020 |
| CN | 210697167 U | 6/2020 |
| CN | 210810510 U | 6/2020 |
| CN | 210871007 U | 6/2020 |
| CN | 111358268 A | 7/2020 |
| CN | 111358269 A | 7/2020 |
| CN | 111358270 A | 7/2020 |
| CN | 111358271 A | 7/2020 |
| CN | 111358272 A | 7/2020 |
| CN | 111358274 A | 7/2020 |
| CN | 111358275 A | 7/2020 |
| CN | 210902571 U | 7/2020 |
| CN | 210989616 U | 7/2020 |
| CN | 210989619 U | 7/2020 |
| CN | 210989629 U | 7/2020 |
| CN | 211022157 U | 7/2020 |
| CN | 211022158 U | 7/2020 |
| CN | 211022267 U | 7/2020 |
| CN | 211049077 U | 7/2020 |
| CN | 211066122 U | 7/2020 |
| CN | 211066229 U | 7/2020 |
| CN | 211093326 U | 7/2020 |
| CN | 211155193 U | 8/2020 |
| CN | 211186811 U | 8/2020 |
| DE | 2453080 A1 | 5/1975 |
| DE | 2409370 A1 | 9/1975 |
| DE | 3319724 A1 | 12/1984 |
| DE | 3401002 A1 | 7/1985 |
| DE | 3628617 A1 | 3/1988 |
| DE | 112004000002 B4 | 7/2006 |
| EP | 833110 A1 | 4/1998 |
| EP | 1772085 A1 | 4/2007 |
| EP | 1884687 A1 | 2/2008 |
| EP | 2090206 A1 | 8/2009 |

(56) References Cited

FOREIGN PATENT DOCUMENTS

| | | |
|---|---|---|
| EP | 2417880 A2 | 2/2012 |
| EP | 2893859 A1 | 7/2015 |
| EP | 2648582 B1 | 8/2016 |
| EP | 3287051 A1 | 2/2018 |
| EP | 3287058 A1 | 2/2018 |
| EP | 3203886 B1 | 3/2020 |
| FR | 1320733 A | 3/1963 |
| GB | 1140386 A | 1/1969 |
| GB | 1488907 A | 10/1977 |
| GB | 2197578 A | 5/1988 |
| GB | 2212713 A | 8/1989 |
| GB | 2401307 A | 11/2004 |
| GB | 2490540 A | 11/2012 |
| GB | 2523365 A | 8/2015 |
| JP | H01300124 A | 12/1989 |
| KR | 19980055603 U | 10/1998 |
| WO | 2010094690 A1 | 8/2010 |
| WO | 2011144762 A1 | 11/2011 |
| WO | 2012012479 A1 | 1/2012 |
| WO | 2012018161 A1 | 2/2012 |
| WO | 2012062679 A1 | 5/2012 |
| WO | 2012162072 A1 | 11/2012 |
| WO | 2013008813 A1 | 1/2013 |
| WO | 2014132105 A1 | 9/2014 |
| WO | 2014153134 A1 | 9/2014 |
| WO | 2014196676 A1 | 12/2014 |
| WO | 2015101875 A1 | 7/2015 |
| WO | 2015118867 A1 | 8/2015 |
| WO | 2015164875 A1 | 10/2015 |
| WO | 2017109717 A1 | 6/2017 |
| WO | 2017188526 A1 | 11/2017 |
| WO | 2017207930 A1 | 12/2017 |
| WO | 2018019766 A1 | 2/2018 |
| WO | 2018091225 A1 | 5/2018 |
| WO | 2018172404 A1 | 9/2018 |
| WO | 2018187458 A1 | 10/2018 |
| WO | 2019038172 A1 | 2/2019 |
| WO | 2019068202 A1 | 4/2019 |
| WO | 2019129598 A1 | 7/2019 |
| WO | 2019137013 A1 | 7/2019 |
| WO | 2019171404 A1 | 9/2019 |
| WO | 2019218685 A1 | 11/2019 |
| WO | 2019223963 A1 | 11/2019 |
| WO | 2019238994 A1 | 12/2019 |
| WO | 2020000052 A1 | 1/2020 |
| WO | 2020000056 A1 | 1/2020 |
| WO | 2020014142 A1 | 1/2020 |
| WO | 2020077974 A1 | 4/2020 |
| WO | 2020148329 A1 | 7/2020 |
| WO | 2020173027 A1 | 9/2020 |
| WO | 2020177410 A1 | 9/2020 |
| WO | 2020180643 A1 | 9/2020 |
| WO | 2020245087 A1 | 12/2020 |

OTHER PUBLICATIONS

Directive for Consultation; Japanese Application No. 2019-027096; International Filing Date: Dec. 6, 2019; Date of Mailing: Feb. 19, 2021; 2 pages, no translation.
Directive for Consultation; Japanese Application No. 2020-024087; International Filing Date: Nov. 9, 2020; Date of Mailing: Feb. 19, 2021; 2 pages, no translation.
Extended European Search Report issued in European Application No. 21166930.4, mailed on Aug. 5, 2021, 6 pages.
International Search Report and Written Opinion for International Patent Application No. PCT/US2021/025750, mailed Sep. 2, 2021, 14 pages.
International Search Report and Written Opinion for International Patent Application No. PCT/US2020/019855, mailed on Nov. 26, 2020, 9 pages.
Japanese Office Action; International Application No. 2019-27096; International Filing Date: Dec. 6, 2019, mailed on Aug. 7, 2020, 2 pages.
Notification of Reasons for Rejection; Japanese Application No. 2019-027096; International Filing Date: Dec. 6, 2019; Date of Mailing: Feb. 19, 2021; 2 pages, no translation.
Notification of Reasons for Rejection; Japanese Application No. 2020-024087; International Filing Date: Nov. 9, 2020; Date of Mailing: Feb. 19, 2021; 2 pages, no translation.
Breville et al. (2016) "The Smart Oven Air, Instruction Book—Suits all BOV900 Models", Breville, BOV900 USCB16, pp. 1-68.
Cuisinart (2019) "Cuisinart, Instruction and Recipe Booklet, Cuisinart AirFryer Toaster Oven", TOA-60, Cuisinart, IB-14326-EPS-B, pp. 1-74.
Ninja et al. (2019) "Foodi Digital Air Fry Oven—Owner's Guide, SP100 Series", Ninja Kitchen, SP100_Series_IB_E_F S_MP Mv5, pp. 1-29.
Wikipedia (Aug. 4, 2019) "Phase-Fired Controller", Available on: https://en.wikipedia.org/wiki/Phase-fired_controllerWikipedia, 1-3.
Wikipedia (Jun. 8, 2019) "Zero Crossing Wikipedia", Available at: https://en.wikipedia.org/wiki/Zero_crossingWikipedia, pp. 1-2.

* cited by examiner

DYNAMIC FLIP TOASTER

CROSS REFERENCE TO RELATED APPLICATIONS

This application is a continuation of U.S. patent application Ser. No. 17/139,751 filed Dec. 31, 2020 and entitled "Dynamic Flip Toaster," which claims priority to U.S. Provisional Application Ser. No. 63/083,308 filed Sep. 25, 2020 and to U.S. Provisional Application Ser. No. 63/005,774 filed Apr. 6, 2020 and also to U.S. Provisional Application Ser. No. 63/005,777 filed Apr. 6, 2020, all of which are incorporated by reference in their entirety herein.

BACKGROUND

Embodiments of the present disclosure relate generally to a cooking system, and more particularly, to a countertop cooking system operable in both a first position and a second, rotated position.

Existing countertop cooking systems, such as toasters for example, may be used to conveniently warm or cook food. Food is typically inserted into an opening of a toaster in a vertical orientation. As a result, the toaster is only capable of cooking a dry piece of bread or bagel. If a topping were included on a surface of the food item inserted vertically into the toaster, the topping would likely drip or fall as a result of gravity, to the bottom of the toaster. It is therefore desirable to develop a countertop toaster that can transform between various orientations based on the type of cooking operation to be performed.

SUMMARY

According to an embodiment, a cooking system positionable on a support surface includes a housing having an internal cooking compartment and an opening formed in said housing for accessing said internal cooking compartment. The housing is positionable about the support surface in both a first orientation and a second, distinct orientation. At least one heating element is associated with said internal cooking compartment. The at least one heating element is operable to heat said internal cooking compartment in both said first orientation and said second orientation.

In addition to one or more of the features described above, or as an alternative, in further embodiments said housing is rotatable about an axis between said first orientation and said second orientation.

In addition to one or more of the features described above, or as an alternative, in further embodiments comprising a pivot structure coupled to said housing, said pivot structure defining said axis.

In addition to one or more of the features described above, or as an alternative, in further embodiments said first orientation of said housing is arranged perpendicular to said second orientation of said housing.

In addition to one or more of the features described above, or as an alternative, in further embodiments said at least one heating element is located within said internal cooking compartment.

In addition to one or more of the features described above, or as an alternative, in further embodiments said at least one heating element is located remotely from said internal cooking compartment.

In addition to one or more of the features described above, or as an alternative, in further embodiments food is receivable within said opening in both said first orientation and said second orientation.

In addition to one or more of the features described above, or as an alternative, in further embodiments said at least one heating element includes a first heating element and a second heating element.

In addition to one or more of the features described above, or as an alternative, in further embodiments said first heating element is energized during said first cooking operation and said second cooking operation and said second heating element is energized during said first cooking operation and is de-energized during said second cooking operation.

In addition to one or more of the features described above, or as an alternative, in further embodiments the cooking system is operable in a plurality of cooking modes and one or more of said plurality of cooking modes is selectable in based on an orientation of said housing.

In addition to one or more of the features described above, or as an alternative, in further embodiments the cooking system is operable in a first cooking mode of said plurality of cooking modes when said housing is in said first orientation and the cooking system is operable in second cooking mode of said plurality of cooking modes when said housing is in said second orientation.

In addition to one or more of the features described above, or as an alternative, in further embodiments said first cooking mode includes a toasting operation, and said second cooking mode includes at least one of a bake, broil, warm and reheat operation.

According to another embodiment, a cooking system positionable on a support surface includes a housing having a cooking compartment and an opening formed in said housing for accessing said cooking compartment. A position of said opening is transformable between a first orientation and a second orientation, said first orientation and said second plane orientation distinct. At least one heating element is operable to heat said cooking compartment. Food is insertable into said cooking compartment via said opening when said opening is arranged within both said first orientation and said second orientation.

In addition to one or more of the features described above, or as an alternative, in further embodiments said opening is transformable between said first plane and said second plane via rotation of said housing about an axis of rotation.

In addition to one or more of the features described above, or as an alternative, in further embodiments said housing includes a pivot structure connected to said housing, said pivot structure defining said axis of rotation.

In addition to one or more of the features described above, or as an alternative, in further embodiments said first orientation is oriented perpendicular to said second orientation.

In addition to one or more of the features described above, or as an alternative, in further embodiments in said first orientation, said opening is arranged horizontally relative to the support surface and in said second orientation, said opening is oriented vertically relative to the support surface.

In addition to one or more of the features described above, or as an alternative, in further embodiments said at least one heating element is located within said internal cooking compartment.

In addition to one or more of the features described above, or as an alternative, in further embodiments said at least one heating element is operable to heat said internal cooking compartment when said opening is in said first orientation and said opening is in said second plane.

In addition to one or more of the features described above, or as an alternative, in further embodiments the cooking system is operable in a first cooking mode when said opening is in said first plane and the cooking system is operable in second cooking mode when said opening is arranged in said second plane.

According to an embodiment, a cooking system positionable on a support surface including a housing having an internal cooking compartment and an opening formed in said housing for accessing said internal cooking compartment. At least one food support element is disposed within said internal cooking compartment. The at least one food support element is movable within said internal cooking compartment between a first position and a second position in response to an orientation of said housing relative to the support surface.

In addition to one or more of the features described above, or as an alternative, in further embodiments said housing is rotatable about an axis between a first orientation and a second orientation.

In addition to one or more of the features described above, or as an alternative, in further embodiments said at least one food support element is automatically movable between said first position and said second position as said housing is rotated between said first position and said second position.

In addition to one or more of the features described above, or as an alternative, in further embodiments including a mechanism for moving said at least one food support element between said first position and said second position, said mechanism including a panel having an opening formed therein, a post disposed within said opening, said post being operably coupled to said at least one support member and a support wedge movable relative to said panel, wherein said support wedge is operable to engage and move said post within said opening.

In addition to one or more of the features described above, or as an alternative, in further embodiments said support wedge is operably coupled to a mount via a rod, wherein said mount remains stationary when said housing is moved relative to the support surface.

In addition to one or more of the features described above, or as an alternative, in further embodiments said at least one food support element includes a first food support element and a second food support element, and in said first position, a clearance defined between said first food support element and said second food support element is a first distance, and in said second position, said clearance is a second distance, said second distance being greater than said first distance.

In addition to one or more of the features described above, or as an alternative, in further embodiments said first food support element is movable between said first position and said second position.

In addition to one or more of the features described above, or as an alternative, in further embodiments both said first food support element and said second food support element are movable between said first position and said second position, respectively.

In addition to one or more of the features described above, or as an alternative, in further embodiments at least one heating element for heating said internal cooking compartment.

In addition to one or more of the features described above, or as an alternative, in further embodiments said at least one heating element is disposed within said internal cooking chamber between said housing and said at least one food support element.

In addition to one or more of the features described above, or as an alternative, in further embodiments said at least one heating element includes a first heating element and a second heating element.

In addition to one or more of the features described above, or as an alternative, in further embodiments both said first heating element and said second heating element are energized when said at least one food support element is in said first position.

According to another embodiment, a cooking system positionable on a support surface includes a housing having an internal cooking compartment. The housing is movable between a first orientation and a second orientation. The cooking system additionally includes at least one heating element for heating said internal cooking compartment, a lever movable between a first position and a second position, and a locking mechanism operable to lock said lever in said second position. The housing is movable between said first orientation and said second orientation only when said lever is in said second position and said locking mechanism is engaged with said lever.

In addition to one or more of the features described above, or as an alternative, in further embodiments said lever includes a slider, said locking mechanism connectable to said slider when said lever is in said second position.

In addition to one or more of the features described above, or as an alternative, in further embodiments said locking mechanism includes an actuator having a shaft movable to selectively engage a portion of said lever.

In addition to one or more of the features described above, or as an alternative, in further embodiments said actuator is a push-push button.

In addition to one or more of the features described above, or as an alternative, in further embodiments said actuator is not operable when said housing is in said second orientation.

In addition to one or more of the features described above, or as an alternative, in further embodiments in said second position, said lever is arranged in contact with a switch, and said at least one heating element is energized.

In addition to one or more of the features described above, or as an alternative, in further embodiments said lever is not arranged in contact with said switch when said locking mechanism and said lever are engaged.

According to another embodiment, a cooking system positionable on a support surface includes a housing having an internal cooking compartment and an opening formed in said housing for accessing said internal cooking compartment. At least one heating element is operable to heat said internal cooking compartment while said opening is at least partially exposed to an ambient environment to allow fluid transfer between said ambient environment and said internal cooking compartment. The output from said at least one heating element is variable across said internal cooking compartment during operation of the system.

In addition to one or more of the features described above, or as an alternative, in further embodiments said output from said at least one heating element into said internal cooking compartment at a location adjacent said opening is greater than said output from said at least one heating element at a location adjacent a rear of said cooking compartment.

In addition to one or more of the features described above, or as an alternative, in further embodiments said at least one heating element includes a plurality of heating elements and a first heating element and a second heating element, said first heating element being operable to heat a front portion of said internal cooking compartment adjacent said opening, and said second heating element being operable to heat a rear portion of said cooking compartment.

In addition to one or more of the features described above, or as an alternative, in further embodiments said first heating element is operable independently from said second heating element.

In addition to one or more of the features described above, or as an alternative, in further embodiments during operation of the cooking system in the second position, heat generated by said first heating element is greater than heat generated by said second heating element.

In addition to one or more of the features described above, or as an alternative, in further embodiments during operation of the cooking system in the second position, said first heating element is energized for a greater time than said second heating element.

In addition to one or more of the features described above, or as an alternative, in further embodiments during operation of the cooking system in the second position said first heating element is continuously energized and said second heating element is pulsed.

In addition to one or more of the features described above, or as an alternative, in further embodiments said first heating element has a greater wattage than said second heating element.

In addition to one or more of the features described above, or as an alternative, in further embodiments said at least one heating element is a single heating element having a non-uniform configuration.

In addition to one or more of the features described above, or as an alternative, in further embodiments in said first configuration, said opening is arranged horizontally relative to the support surface and in said second configuration, said opening is oriented vertically relative to the support surface.

According to another embodiment, a cooking system positionable on a support surface includes a housing having an internal cooking compartment and an opening formed in said housing for accessing said internal cooking compartment. At least one heating element is operable to heat said internal cooking compartment. An accessory is receivable within said internal cooking compartment via said opening. The accessory closes at least a portion of said opening when said accessory is received within said internal cooking compartment.

In addition to one or more of the features described above, or as an alternative, in further embodiments said accessory is a tray having a base and a lip extending perpendicularly to said base.

In addition to one or more of the features described above, or as an alternative, in further embodiments when said tray is positioned within said internal cooking compartment said lip substantially closes said opening.

In addition to one or more of the features described above, or as an alternative, in further embodiments at least one view port is formed in said lip.

In addition to one or more of the features described above, or as an alternative, in further embodiments at least one view port is closed with a transparent material.

According to yet another embodiment, a cooking system positionable on a support surface includes a housing having an internal cooking compartment. The housing is movable between a first orientation and a second orientation. At least one heating element is operable to heat said internal cooking compartment. A mechanism positionable in or about said housing is operable to detect insertion of said insert in said internal cooking compartment. The mechanism allows operation of said at least one heating element when said insert is detected.

In addition to one or more of the features described above, or as an alternative, in further embodiments said mechanism allows operation of said at least one heating element only when said insert is detected.

In addition to one or more of the features described above, or as an alternative, in further embodiments said mechanism determines when said insert is properly positioned within said internal cooking compartment.

In addition to one or more of the features described above, or as an alternative, in further embodiments said mechanism further comprises a stop bar.

In addition to one or more of the features described above, or as an alternative, in further embodiments comprising a switch, said stop bar being movable to actuate said switch in response to detecting insertion of said insert in said internal cooking compartment.

In addition to one or more of the features described above, or as an alternative, in further embodiments said mechanism further comprises a plunger.

In addition to one or more of the features described above, or as an alternative, in further embodiments comprising a switch, said plunger being movable to actuate said switch in response to detecting insertion of said insert in said internal cooking compartment.

In addition to one or more of the features described above, or as an alternative, in further embodiments at least a portion of said mechanism is positioned within said internal cooking compartment, within a path of insertion of said insert.

In addition to one or more of the features described above, or as an alternative, in further embodiments said mechanism restricts movement of said insert within said internal cooking compartment.

In addition to one or more of the features described above, or as an alternative, in further embodiments said insert includes a first support feature complementary to a second support arranged about said housing, wherein said second support feature cooperates with said first support feature to position said accessory within said internal cooking compartment.

In addition to one or more of the features described above, or as an alternative, in further embodiments said second support feature is a rod having a non-linear configuration including a raised portion and said first support feature is a groove sized to receive said raised portion therein.

According to another embodiment, a cooking system positionable on a support surface includes a housing having an internal cooking compartment and an exterior surface. The housing is movable between a first orientation and a second orientation. At least one heating element is configured to heat both said internal cooking compartment and said exterior surface. The exterior surface is oriented to support a food support item when said housing is in said second position.

In addition to one or more of the features described above, or as an alternative, in further embodiments said internal cooking compartment and said exterior surface are heatable by said at least one heating element independently.

In addition to one or more of the features described above, or as an alternative, in further embodiments said internal cooking compartment and said exterior surface are heatable by said at least one heating element simultaneously.

In addition to one or more of the features described above, or as an alternative, in further embodiments said exterior surface further comprises at least one raised feature oriented to support said food support item.

In addition to one or more of the features described above, or as an alternative, in further embodiments a support surface of said at least one raised feature is offset from said exterior surface by about 2 mm.

In addition to one or more of the features described above, or as an alternative, in further embodiments said at least one raised feature is a plurality of ribs.

In addition to one or more of the features described above, or as an alternative, in further embodiments said at least one heating element operable to heat said exterior surface is located within said internal cooking compartment.

In addition to one or more of the features described above, or as an alternative, in further embodiments said at least one heating element includes a first heating element and a second heating element, wherein said first heating element is operable to heat said internal cooking compartment and said second heating element is operable to heat said exterior surface.

In addition to one or more of the features described above, or as an alternative, in further embodiments said first heating element and said second heating element are independently controllable.

In addition to one or more of the features described above, or as an alternative, in further embodiments said first heating element and said second heating element are operable simultaneously.

According to another embodiment, a cooking system positionable on a support surface includes a housing having an internal cooking compartment. At least one heating element is operable to heat said internal cooking compartment. At least one food support element is affixed within said internal cooking compartment and is translatable and pivotable within said internal cooking compartment.

In addition to one or more of the features described above, or as an alternative, in further embodiments the cooking system further comprises a radiant casing positioned within said housing, said at least one food support element being mounted to said radiant casing.

In addition to one or more of the features described above, or as an alternative, in further embodiments said at least one food support element includes one or more posts located within one or more support openings formed in said radiant casing, wherein a configuration of said one or more support openings defines a path of movement of said at least one food support element.

In addition to one or more of the features described above, or as an alternative, in further embodiments said at least one food support element has an upper post located within a first support opening and a lower post located within a second support opening.

In addition to one or more of the features described above, or as an alternative, in further embodiments said first support opening and said second support opening are horizontally oriented and a length of said first support opening is greater than a length of said second support opening In addition to one or more of the features described above, or as an alternative, in further embodiments comprising a biasing mechanism operably coupled to said at least one food support element, wherein said at least one food support element is movable in response to a biasing force of said biasing mechanism.

In addition to one or more of the features described above, or as an alternative, in further embodiments said at least one food support element includes a first food support element and a second food support element separated from one another by a gap.

In addition to one or more of the features described above, or as an alternative, in further embodiments said at least one food support element is movable between a first position and a second position, wherein when said at least one support element is in said second position, said gap is non-uniform over a height of said at least one food support element.

In addition to one or more of the features described above, or as an alternative, in further embodiments when said at least one support element is in said first position, said gap is uniform over said height of said at least one food support element.

In addition to one or more of the features described above, or as an alternative, in further embodiments said gap adjacent a first end of said first food support element and a first end of said second food support element when in said second position is less than said gap adjacent said first end of said first food support element and said first end of said second food support element when in said first position, and said gap adjacent a second end of said first food support element and a second end of said second food support element when in said second position is less than said gap adjacent said second end of said first food support element and said second end of said second food support element when in said first position.

In addition to one or more of the features described above, or as an alternative, in further embodiments comprising a movable support member disposed within said internal cooking compartment, wherein said at least one food support element translates and pivots in response to movement of said support member.

In addition to one or more of the features described above, or as an alternative, in further embodiments comprising a movement mechanism operable to move said support member.

BRIEF DESCRIPTION OF THE FIGURES

The accompanying drawings incorporated in and forming a part of the specification embodies several aspects of the present disclosure and, together with the description, serves to explain the principles of the disclosure. In the drawings.

Figure 1:
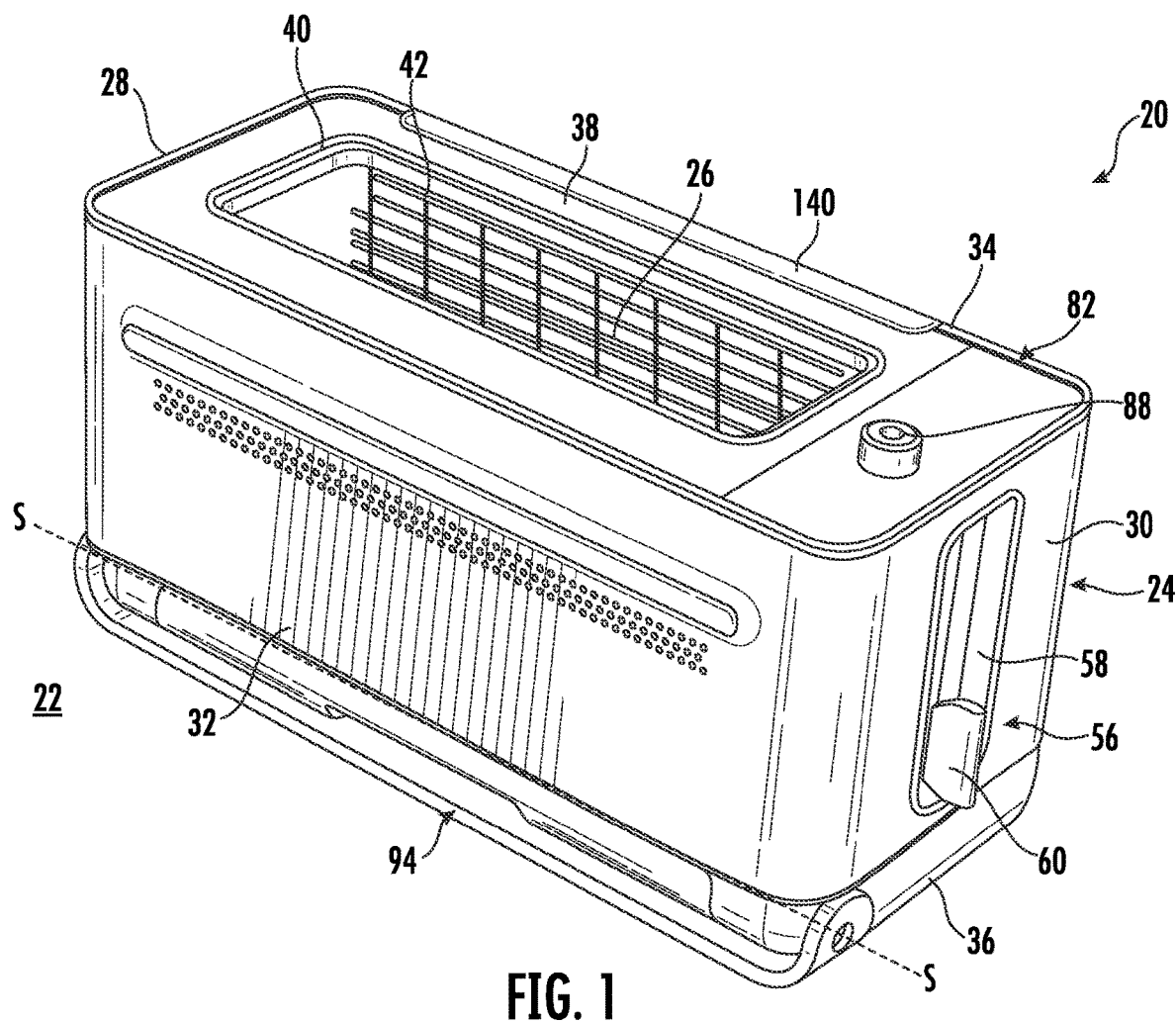
FIG. 1 is a perspective view of a cooking system in a first cooking orientation according to an embodiment.
Figure 2:
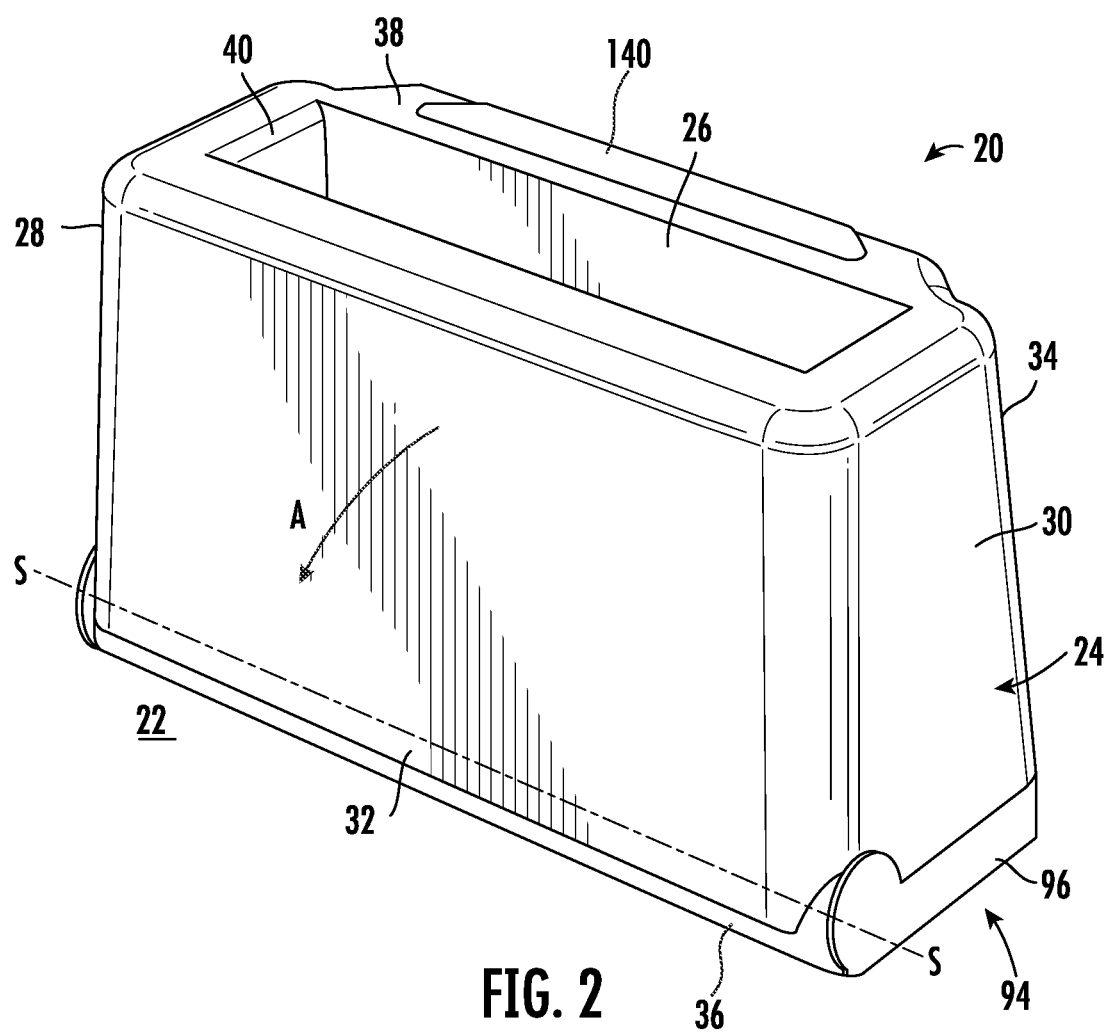
FIG. 2 is a perspective view of a cooking system in a first cooking orientation according to an embodiment.
Figure 3:
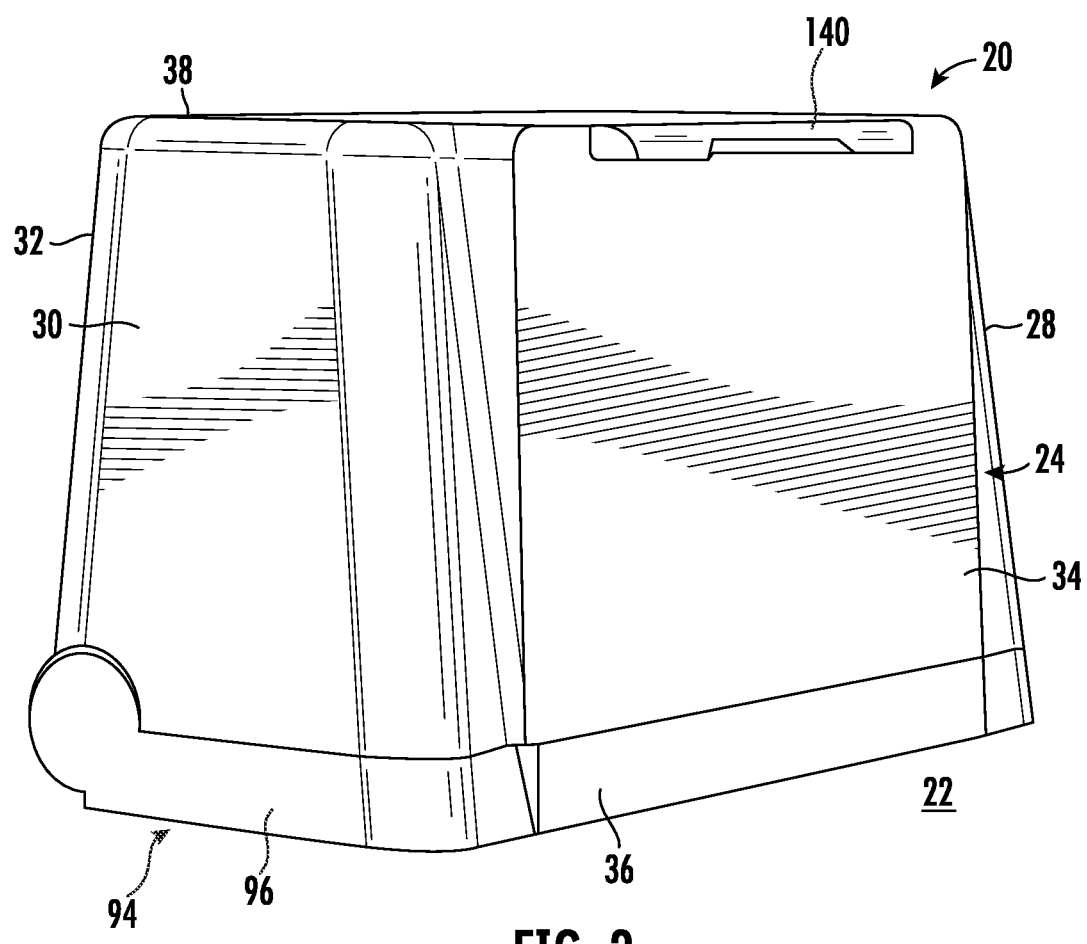
FIG. 3 is another perspective view of the cooking system of FIG. 2 in a first cooking orientation according to an embodiment.

The detailed description explains embodiments of the disclosure, together with advantages and features, by way of example with reference to the drawings.

DETAILED DESCRIPTION

With reference now to FIGS. 1-4, various examples of a cooking system 20 suitable for use on a support surface 22, such as a countertop for example, are illustrated. The cooking system 20 includes a thermally insulated housing 24 having an internal cooking compartment or cooking volume 26. In the illustrated, non-limiting embodiment, the housing 24 includes a left side 28, a right side 30, a front 32, a back 34, and a bottom 36 connected to one another such that the cooking compartment 26 is located there between. In an embodiment, the housing 24 additionally includes a top 38 through which the cooking compartment 26 is accessed by a user. However, it should be understood that embodiments where the housing 24 does not include a top 38, or alternatively, includes an at least partially movable top 38, such as a door for example, are also within the scope of the disclosure.

As shown, the top 38 of the housing 24 may extend between the left and right sides 28, 30, respectively, and between the front 32 and the back 34, respectively. In such embodiments, an opening 40 for providing access to the cooking compartment 26 of the housing 24 is formed in the top 38. Although the opening 40 is illustrated in the FIGS. as being exposed to the ambient atmosphere, it should be understood that embodiments where the housing 24 additionally includes a door (not shown) or another component(s) movable to selectively seal the opening 40 formed in the top 38 are also within the scope of the disclosure. Further, the housing 24 is illustrated and described herein as an external housing of the cooking system 20. As a result, one or more radiant cases may be located between an interior surface of the housing 24 and the cooking compartment 26; however, it should be understood that in other embodiments, the housing 24 described herein may alternatively refer to an internal housing disposed within a separate external case or housing.

As best shown in FIGS. 5a, 5b, 11a, 11b, 12b, 13a, and 13b, at least one food support element 42 is operable to position and retain a food item in the cooking compartment 26. In the illustrated, non-limiting embodiment, the at least one food support element 42 includes a first food support element 42a positioned within the cooking compartment 26 generally adjacent to a first interior surface 46 thereof and a second food support element 42b positioned within the cooking compartment 26 generally adjacent to an opposite, second interior surface 48 thereof. In an embodiment, the first and second food support elements 42a, 42b cooperate to form a cage. A gap 50 for receiving a food item is defined between the first food support element 42a and the second food support element 42b. At least one of the first food support element 42a and the second food support element 42b defines a support surface operable to contact a surface of a food item installed within the gap 50. The first and second food support elements 42a, 42b may be formed from any suitable thermally conductive material, such as metal, and more specifically wire for example. Further, a configuration of the first and second food support elements 42a, 42b may be substantially identical, or alternatively may be different. It should be understood that the at least one food support element 42 illustrated and described herein is intended as an example only. A cooking system 20 having any number and/or configuration of food support elements arranged within the internal cooking compartment 26, such as a single food support element or more than two food support elements for example, are also within the scope of the disclosure.

In an embodiment, a support bar or member 52 (see FIGS. 8, and 11a-13a) is also arranged within the cooking compartment 26 and is configured to support a food item against gravity. As shown, the support member 52 may extend across the internal cooking compartment 26, between the left side 28 and the right side 30 for example, and may additionally span the gap 50 defined between the first and second food support elements 42a, 42b. In an embodiment, the support member 52 includes a plurality of teeth 54 extending in opposite directions towards the first and second food support elements 42a, 42b, respectively. Although the teeth 54 are illustrated as being angled upwardly in a direction towards the opening 40, embodiments where one or more of the teeth 54 have a generally horizontal configuration are also contemplated herein. Further, the opposing teeth 54 may be generally aligned, or alternatively, may be offset from one another. It should be understood that the support member 52 illustrated and described herein is intended as an example only, and that a support member 52 having another configuration, such as formed from a piece of rectangular material (see FIG. 7) for example, is also within the scope of the disclosure.

Figure 11B:
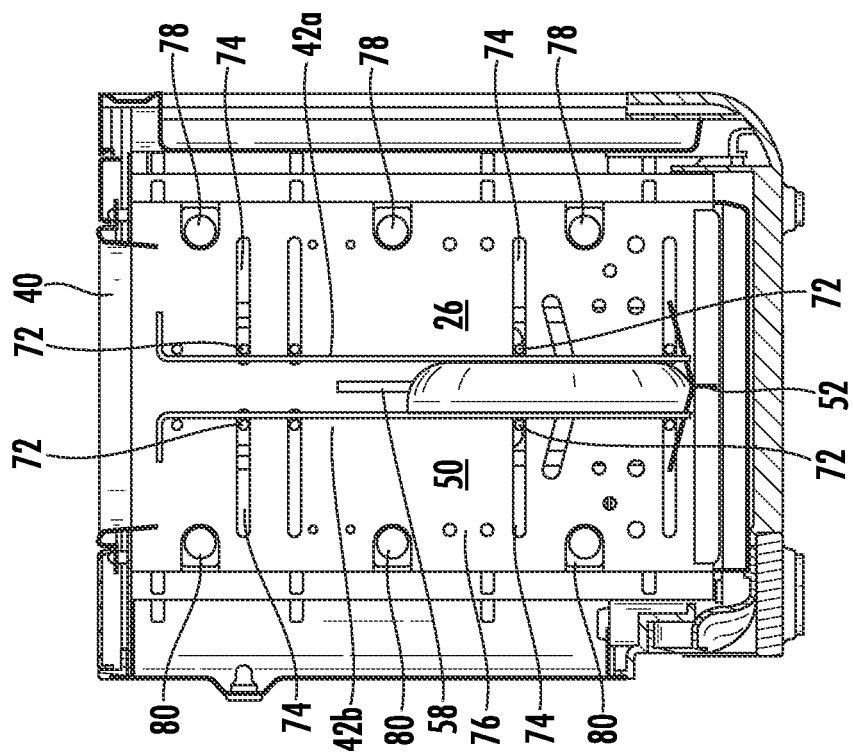
FIG. 11B is a cross-sectional view of the cooking system of FIG. 11A when the support member is in an active position according to an embodiment.
Figure 11A:
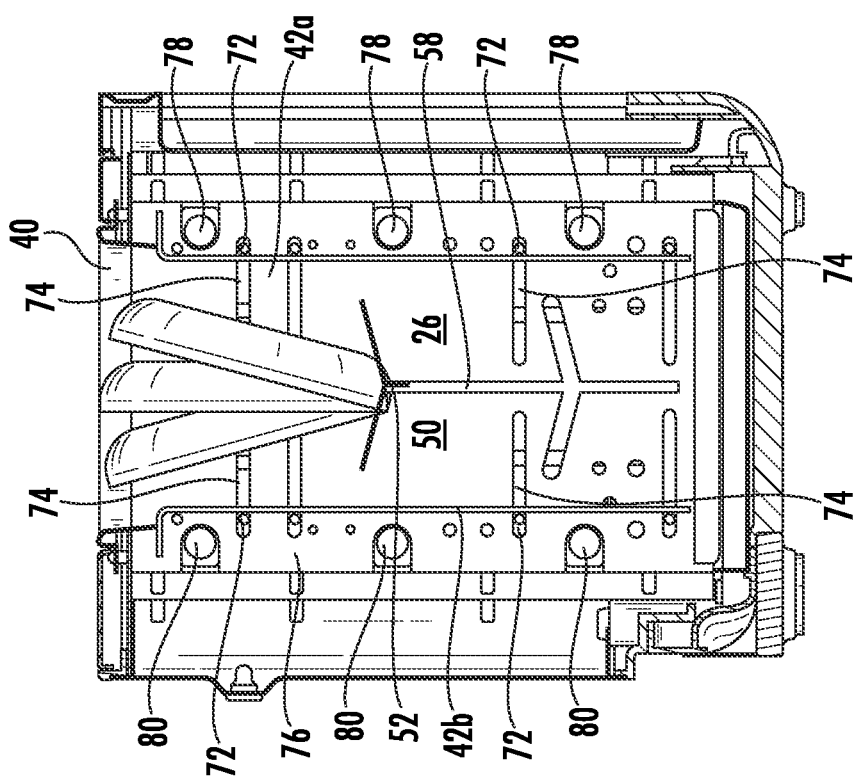
FIG. 11A is a cross-sectional view of a cooking system when the support member is in an inactive position according to an embodiment.
Figure 12B:
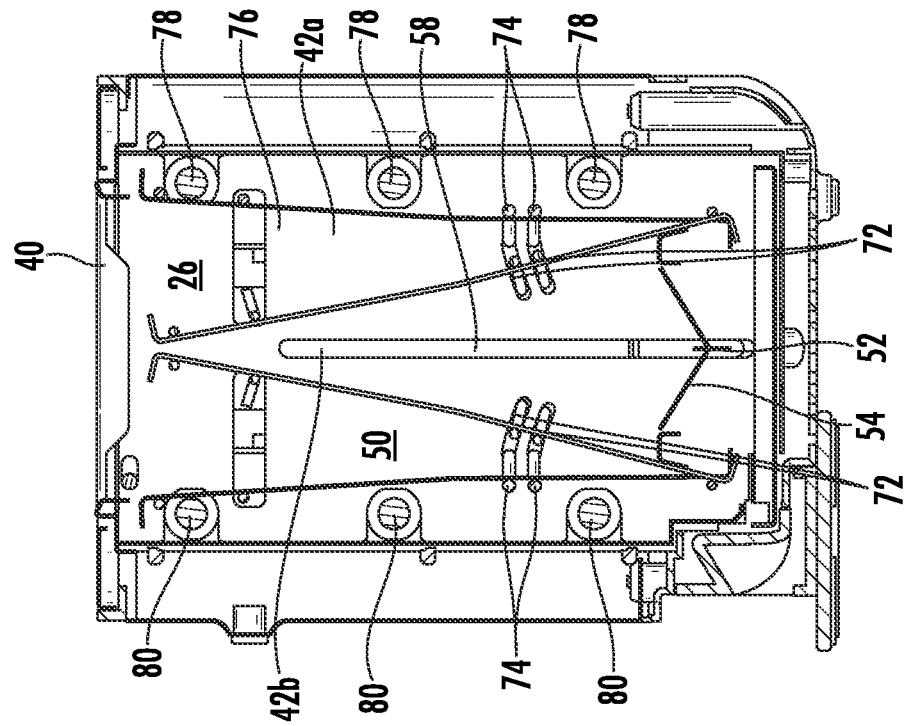
FIG. 12B is a cross-sectional view of the cooking system of FIG. 11A when the support member is in an active position according to an embodiment.
Figure 12A:
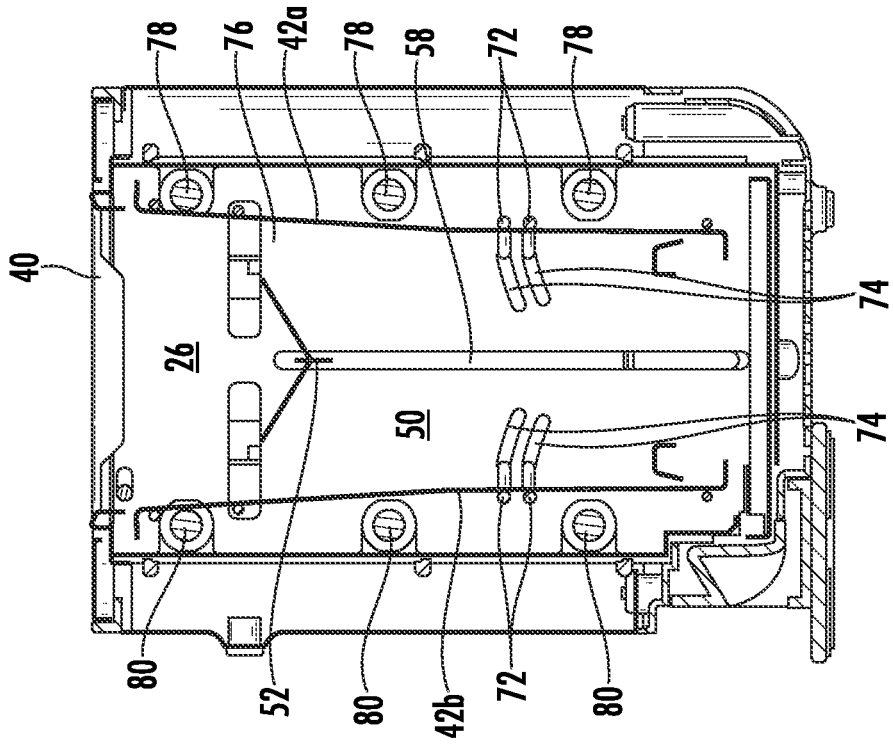
FIG. 12A is a cross-sectional view of a cooking system when the support member is in an inactive position according to an embodiment.
Figure 13B:
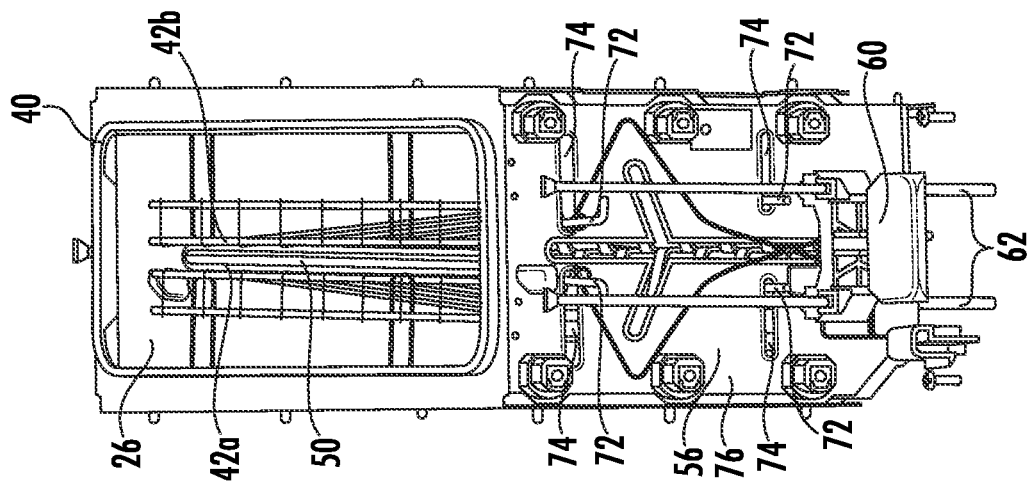
FIG. 13B is a perspective view of a portion of a cooking system of FIG. 13A when the support member is in an active position according to an embodiment.

A movement mechanism 56 may be used to move the support member 52 within the cooking compartment 26 between an inactive position, such as near the opening 40 for example (see FIGS. 11a, 12a, and 13a) and an active position, for example near the bottom 36 of the housing 24 (see FIGS. 11b, 12b, and 13b). Transformation of the support member 52 from the inactive position to the active position is configured to locate a substantial entirety of a food item within the cooking compartment 26, in the gap 50 defined between the food support elements 42. Further, in some embodiments, the movement mechanism 56 may be operable to transform the support member 52 from an active position to an inactive position, to substantially remove a food item from the cooking compartment 26. A distance between the support member 52 and the opening 40 is greater when in the active position than when the support member 52 is in the inactive position. In an embodiment, a biasing mechanism 57 (see FIGS. 13a and 13b) is coupled to the support member 52 and is configured to bias the support member 52 toward the inactive position.

Figure 6:
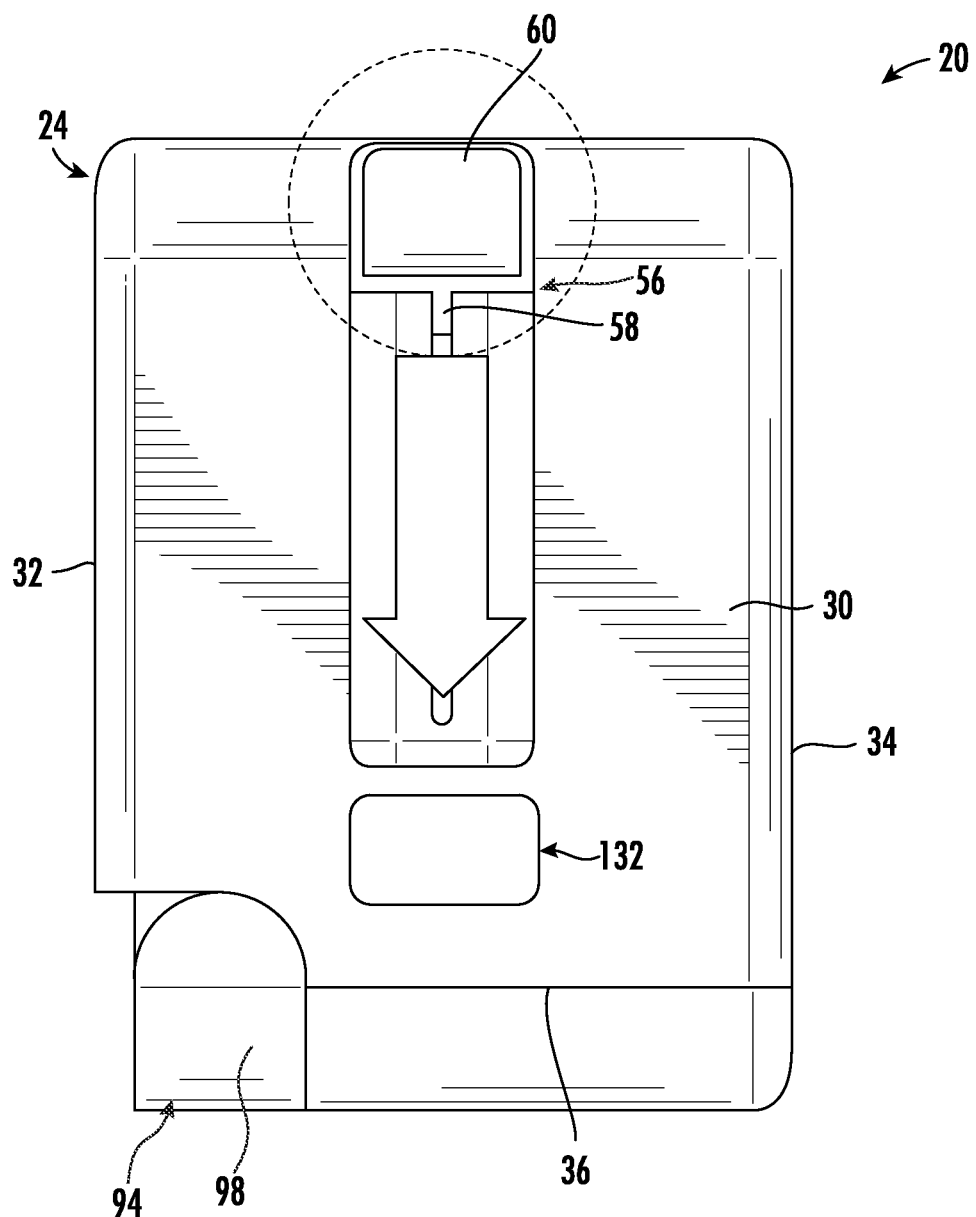
FIG. 6 is a side view of a cooking system including a load/ejector lever according to an embodiment.
Figure 7:
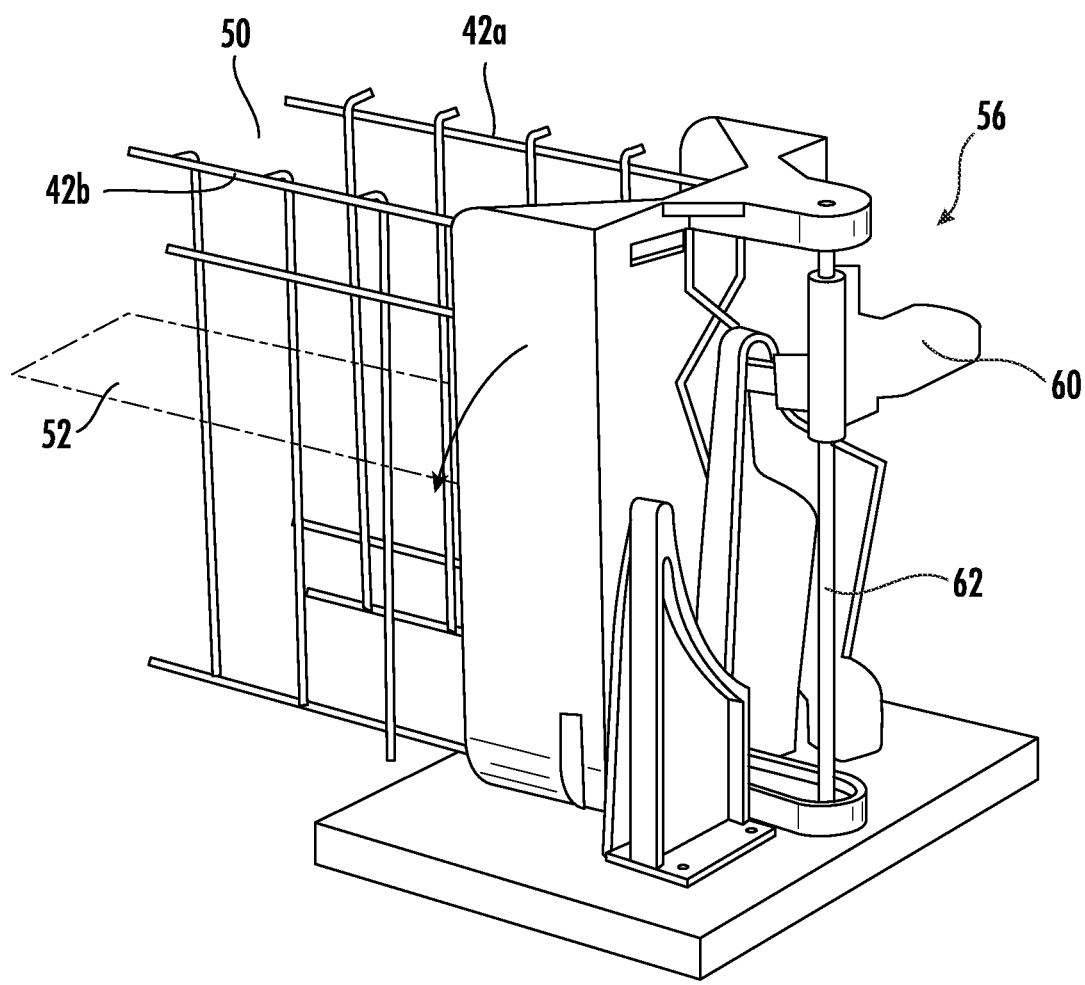
FIG. 7 is a perspective view of a portion of a movement mechanism and a support member of the cooking system according to an embodiment.
Figure 8:
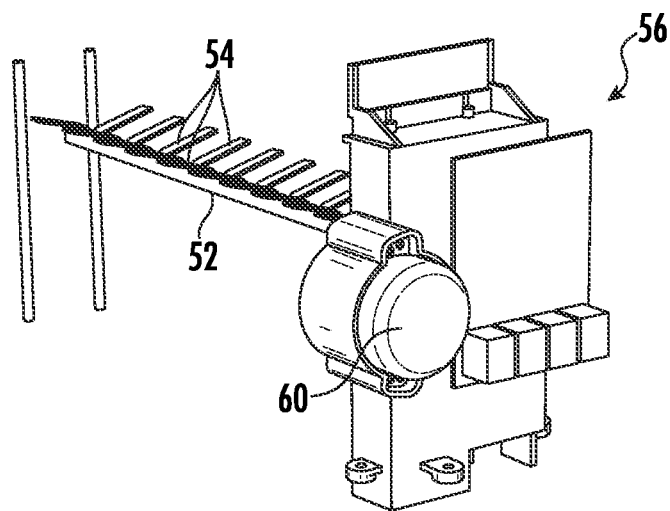
FIG. 8 is a perspective view of a portion of a movement mechanism and a support member of the cooking system according to another embodiment.
Figure 9:
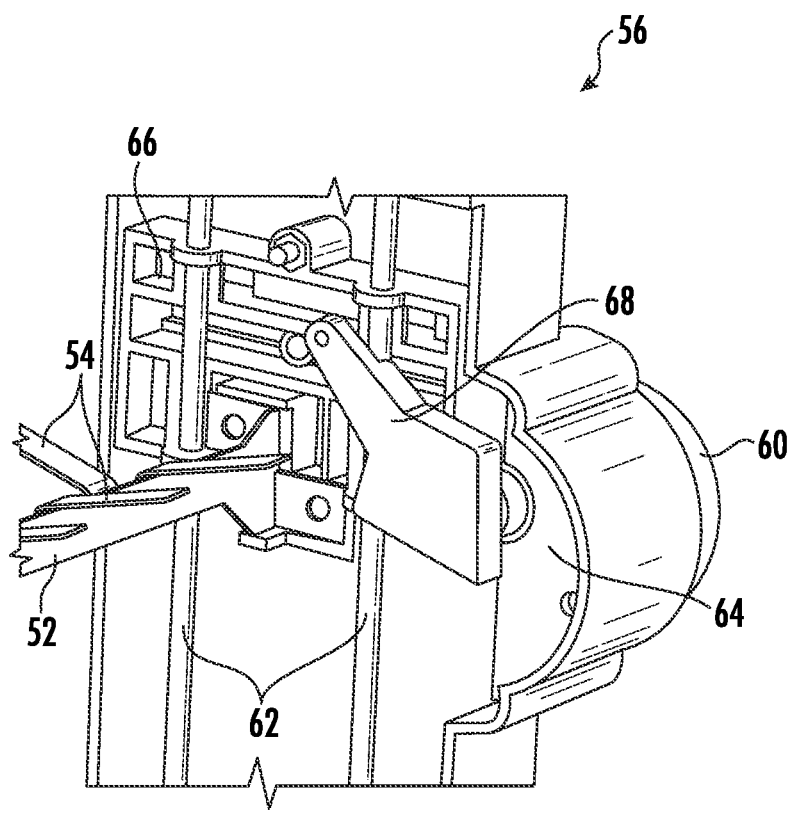
FIG. 9 is another perspective view of a portion of a movement mechanism and support member of FIG. 8 according to another embodiment.
Figure 10A:
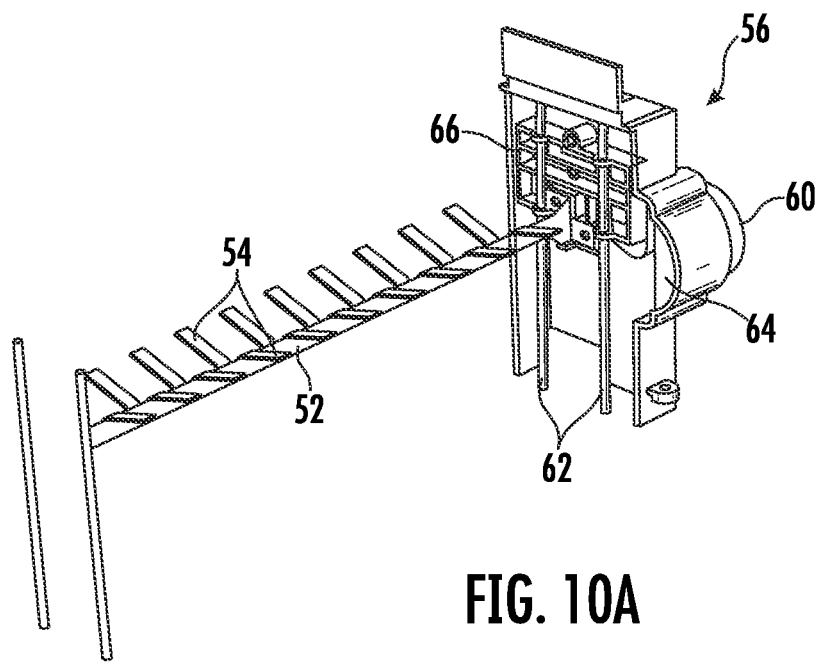
FIG. 10A is a perspective view of a portion of a movement mechanism and a support member of the cooking system when the support member is in an inactive position according to an embodiment.
Figure 10B:
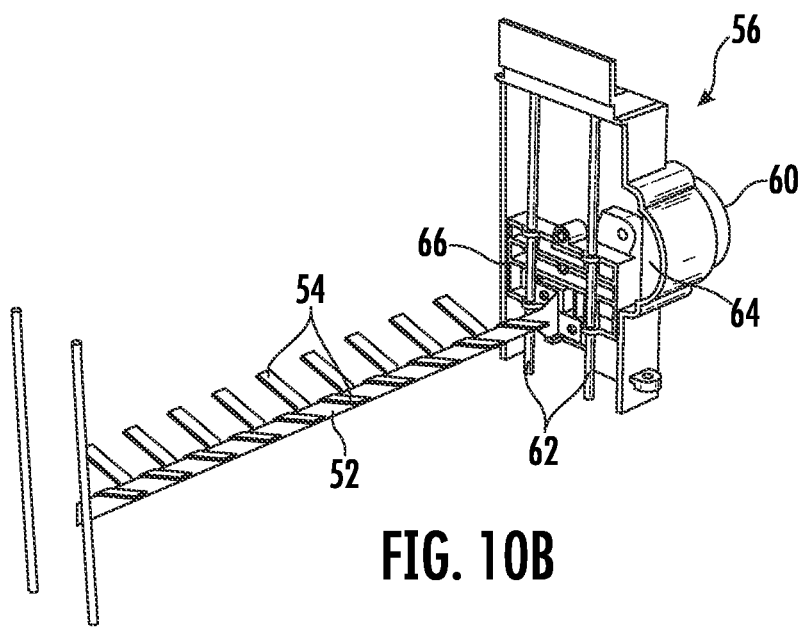
FIG. 10B is a perspective view of a portion of a movement mechanism and a support member of FIG. 10A when the support member is in an active position according to an embodiment.

In an embodiment, a user may manually translate the support member 52 within the cooking compartment 26 via the movement mechanism 56. An example of such a manual movement mechanism 56 is a load/eject lever. As shown in FIGS. 6 and 7, the lever is movable relative to the housing 24, for example translatable within a slot 58 formed at a respective side of the housing 24. In the illustrated, non-limiting embodiment, a first portion of the lever 56 is directly or indirectly connected to the support member 52 and another portion of the lever 56, such as a paddle 60 for example, is arranged adjacent an exterior of the housing 24 and forms a user interface of the movement mechanism 56. The lever 56 additionally includes a rod 62 oriented parallel to the slot 58. The rod 62 defines an axis of translation of the lever 56. Although the rod 62 is illustrated as extending generally vertically between the bottom 36 and the top 38 of the housing 24, embodiments where the rod 62 is oriented at an angle thereto are also contemplated herein. To operate the movement mechanism 56, a user applies a force to the paddle 60 to manually move the lever 56, and therefore the support member 52, from the inactive position to the active position.

With reference now to FIG. 8-10*b*, in an alternative embodiment, the movement mechanism 56 is configured to automatically move the support member 52 between the inactive and the active position in response to a user input. In such embodiments, the movement mechanism 56 may include a motor or other actuation device 64 operably coupled to the support member 52. As shown, the movement mechanism 56 may additionally include a sliding element 66 connected to the support member 52 and configured to translate vertically along one or more rods 62. In the illustrated, non-limiting embodiment, a connecting member 68 extending from the motor 64 is coupled to the sliding element 66. Further, an input 70 configured to operate the motor 64, such as a button for example, is located at the exterior of the housing 24, for access by a user. In response to application of a force to the input 70 by a user, the motor 64 will rotate the connecting member 68, which in turn causes the sliding element 66 and the support member 52 to translate along the axis defined by the at least one rod 62. The motor 64 may be bidirectional, such that the support member 52 can be both lowered (FIG. 10*a*) and raised (FIG. 10*b*) automatically by the movement mechanism 56 in response to an input 70. The motor 64 may additionally be operable in response to a command, for example indicating when a cooking operation has been completed, generated by a processor of the cooking system 20. The connection defined between the motor 64 and the support member 52 illustrated and described herein is intended as an example only, and it should be understood that any suitable configuration of the movement mechanism 56 that is capable of automatically moving the support member 52 within the cooking compartment 26 is contemplated herein. Further, any type of connection between the motor 64 and the support member 52, including embodiments where the motor or actuation device 64 is configured to translate rather than rotate, is within the scope of the disclosure.

At least one biasing mechanism may be operably coupled to one or more of the food support elements 42*a*, 42*b*. In the illustrated, non-limiting embodiment, the same biasing mechanism 57 (FIGS. 13*a* and 13*b*) coupled to the support member 52 is also coupled to the food support elements 42*a*, 42*b*. The biasing force of the at least one biasing mechanism 57 defines a neutral position of the food support elements 42*a*, 42*b*, and therefore the neutral gap 50 between the food support elements 42*a*, 42*b*. As a result, the food support elements 42*a*, 42*b* may be configured to further separate, thereby increasing the gap 50, to accommodate a food item that is greater than the neutral gap 50. Upon removal of such a food, the biasing force of the at least one biasing mechanism 57 will cause the food support elements 42*a*, 42*b* to return to the neutral position.

In an embodiment, the gap 50 defined between the first and second food support elements 42*a*, 42*b* is configured to change in response to movement of the support member 52 within the cooking compartment 26. For example, when the support member 52 is in the inactive position (FIGS. 11*a*, 12*a*, and 13*a*), the neutral gap 50 is generally uniform over the height of the food support elements 42*a*, 42*b*. In an embodiment, the neutral gap 50 is approximately 35 mm. When the support member 52 is lowered to the active position (FIGS. 11*b*, 12*b*, and 13*b*), at least one of the first and second food support elements 42*a*, 42*b* is moved to reduce the gap 50 and restrict movement of a food item positioned between the food support elements 42*a*, 42*b*.

In an embodiment, the food support elements 42*a*, 42*b* are configured to rotate about an axis in response to movement of the support member 52 to the active position. As a result of this rotation, the gap 50 varies over the height of the food support elements 42*a*, 42*b* (best shown in FIG. 12*b*). In an embodiment, the ends of the food support elements 42*a*, 42*b* closest to the opening 40 are configured to rotate inwardly. In such embodiments, the narrowest portion of the gap 50 defined between the food support elements 42*a*, 42*b* (and without a food item positioned within the gap 50) may be about 5 mm. In other embodiments, one or more of the food support elements 42*a*, 42*b* may be configured to translate horizontally (FIG. 11*b*) in response to movement of the support member 52 to the active position.

This movement of at least one of the food support elements 42*a*, 42*b* may be driven by the support member 52. In the illustrated, non-limiting embodiment, a post or other elongated member 72 associated with a corresponding food support element 42 is positioned within one or more slots or openings 74 formed in a panel or portion of a radiant casing, identified at 76 in FIGS. 11*a*-13*b*, adjacent a side of the cooking compartment 26. The at least one post 72 may be integrally formed with the food support element 42*a*, 42*b*, or alternatively, may be part of a separate component connected to a food support element 42*a*, 42*b*.

The at least one opening 74 may have any suitable configuration, such as a horizontal configuration, an angled configuration, or an arcuate configuration for example. The configuration of the openings 74 at least partially defines the movement of the food support element 42 associated therewith. In the illustrated, non-limiting embodiments, each food support element 42*a*, 42*b* has at least one post 72, for example two posts, associated therewith. However, any suitable number of posts 72 and openings 74, including a single post and opening, or more than two posts and openings are contemplated herein. In such embodiments, the food support elements 42*a*, 42*b* may include an upper post and a lower post received within a corresponding elongated opening.

As the support member 52 moves between the inactive and active positions, one or more of the posts 72 is configured to translate within a respective opening 74. In the illustrated, non-limiting embodiment of FIGS. 11*a* and 11*b*, the openings 74 associated with the upper and lower posts 72 have a generally horizontal orientation and are parallel to one another. Further, as shown, the openings 74 associated with the upper and lower post 72 of each food support element 42*a*, 42*b* are equal in length. According as the support member 52 moves to the active position, the biasing force of the biasing mechanism causes the posts 72 to translate within the openings 74. Because each of the posts 72 is configured to move the same distance in response to the biasing force of the biasing mechanism, the food support elements 42*a*, 42*b* are oriented generally parallel when the support member 52 is in both the inactive and active positions. In such embodiments, the gap 50 is generally constant over the height of the food support elements 42*a*, 42*b* when the support member 52 is in both the inactive and active positions.

In embodiments where at least one of the first and second food support elements 42*a*, 42*b* is configured to rotate in response to movement of the support member 52, the rotation of the food support elements 42*a*, 42*b* may occur as a result of movement of some, but not all of the posts associated with each food support element 42a, 42b. In the non-limiting embodiment of FIGS. 12a-12b, a fixed pin 75 is arranged adjacent an end, such as the end closest to the bottom 36 of the housing 24 for example, of each food support element 42a, 42b. In addition, the plurality of openings 74 are arcuate in shape. Because the lower end of each of the food support element 42a, 42b is restricted from moving outwardly by the pin 75, the biasing force of the biasing mechanism 57 applied to the food support element 42a, 42b when the support member is in the active position causes the upper end of each food support element 42a, 42b to rotate inwardly, while the lower end of each food support element 42a, 42b remains stationary.

Figure 13A:
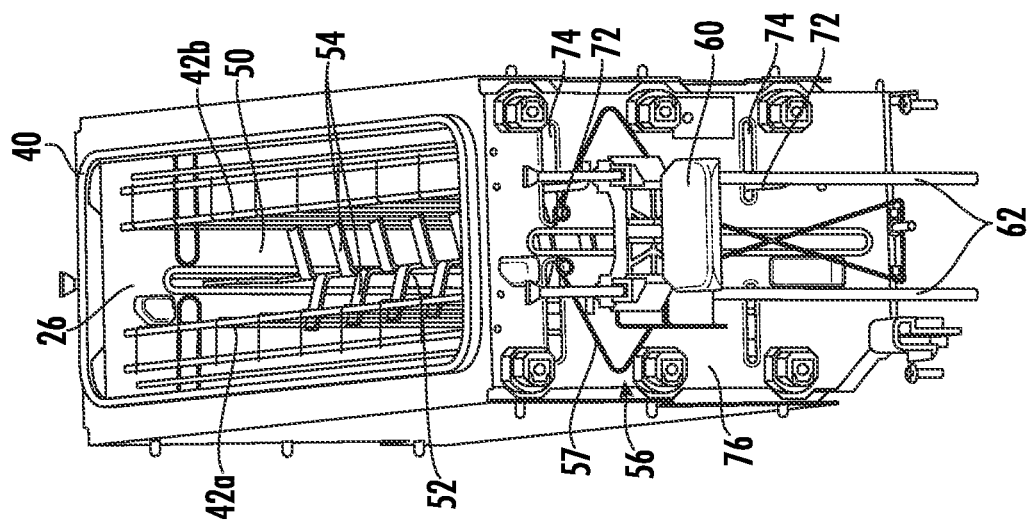
FIG. 13A is a perspective view of a portion of a cooking system when the support member is in an inactive position according to an embodiment.

In another embodiment, illustrated in FIGS. 13a and 13b, the food support elements 42a, 42b are configured to translate and pivot within the internal cooking compartment 26 in response to movement of the support member 52 to the active position. As shown, each of the openings 74 has a generally horizontal configuration. However, a length of the openings 74 that receive and define a path of movement of the upper posts 72 is greater than the length of the openings 74 that receive and define a path of movement of the lower posts 72. Accordingly, when the support member 52 is lowered to the active position, the biasing mechanism 57 will cause the food support elements 42a, 42b to translate in a generally parallel configuration until the lower posts 72 abut an end of their respective openings 74. Although further movement of the lower posts is prevented, the biasing force of the biasing mechanism will cause the upper posts 72 to continue to translate within the openings 74. This additional movement of the upper posts 72 results in a pivoting of the food support elements 42a, 42b. In embodiments where the food support elements 42a, 42b are configured to translate and pivot, the gap 50 when the support member 52 is in the active position is non-uniform over the height of the food support elements 42a, 42b. Further, the gap 50 adjacent both the upper and lower ends of the food support elements 42a, 42b when the support member 52 is in the active position is less than the gap 50 adjacent the upper and lower ends of the food support elements 42a, 42b when the support member 52 is in the inactive position.

The cooking compartment 26 is heated by at least one heating element. With continued reference to FIGS. 11a-13b, in the illustrated, non-limiting embodiments, the cooking system 20 includes one or more first heating elements 78 positioned within the cooking compartment 26, for example adjacent the back 34 of the housing 24. In the illustrated, non-limiting embodiment, the cooking system 20 includes a plurality of first heating elements 78, such as three first heating elements for example, oriented horizontally and generally parallel to the front and back 32, 34, and spaced over the height of the cooking compartment 26. It should be understood that any number and configuration of the first heating elements 78 is contemplated herein.

Alternatively, or in addition, at least one second heating element 80 may be positioned within the cooking compartment 26, for example adjacent the front 32 of the housing 24. In the illustrated, non-limiting embodiment, the cooking system 20 includes a plurality of second heating elements 80, such as three second heating elements for example, oriented generally parallel to the front and back 32, 34 and spaced over the height of the cooking compartment 26. The first heating elements 78 and the second heating elements 80 may be generally aligned, or may be staggered relative to one another.

It should be understood that although the heating elements 78, 80 of the cooking system 20 are illustrated and described as being positioned within the cooking compartment 26 generally adjacent the front 32 and the back 34 of the housing 24, embodiments where the cooking system 20 alternatively or additionally includes one or more heating elements (not shown) located within the cooking compartment adjacent a side 28, 30, or the bottom 36 of the housing, or within a center of the cooking compartment 26 are also contemplated herein. Further, embodiments where one or more of the heating elements 78, 80 extend vertically between the top 38 and bottom 36 are also within the scope of the disclosure. Additionally, it should be understood that the cooking compartment 26 may alternatively, or additionally, be heated by one or more heating elements (not shown) located remotely from the cooking compartment 26.

The one or more heating elements 78, 80 of the cooking system 20 may be selected to perform any suitable type of heating, including but not limited to, conduction, convection, radiation, and induction. Further, the heat output across one or more of the heating elements 78, 80 may vary. In an embodiment, one or more of the heating elements 78, 80 has a non-uniform construction, for example including a coiled wire arranged within a tube which heats and emits radiation when power is supplied thereto. By varying the spacing between adjacent coils over the length of the heating element 78, 80, the amount of heat emitted at various portions of the heating element 78, 80 may be greater than others. However, embodiments where the heat output by one or more of the heating elements 78, 80 is constant over the length of the heating element are also within the scope of the disclosure.

Figure 4:
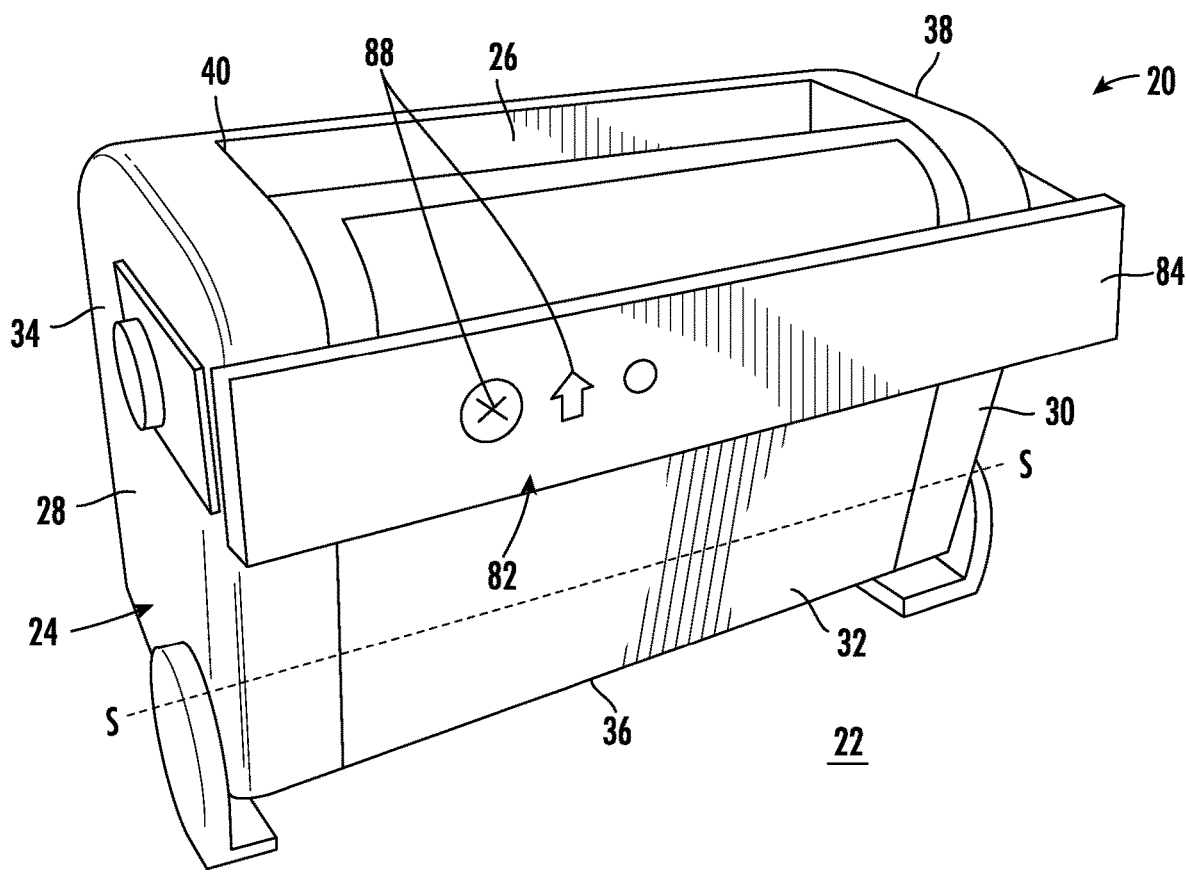
FIG. 4 is a perspective view of a cooking system in a first cooking orientation according to an embodiment.
Figure 18:
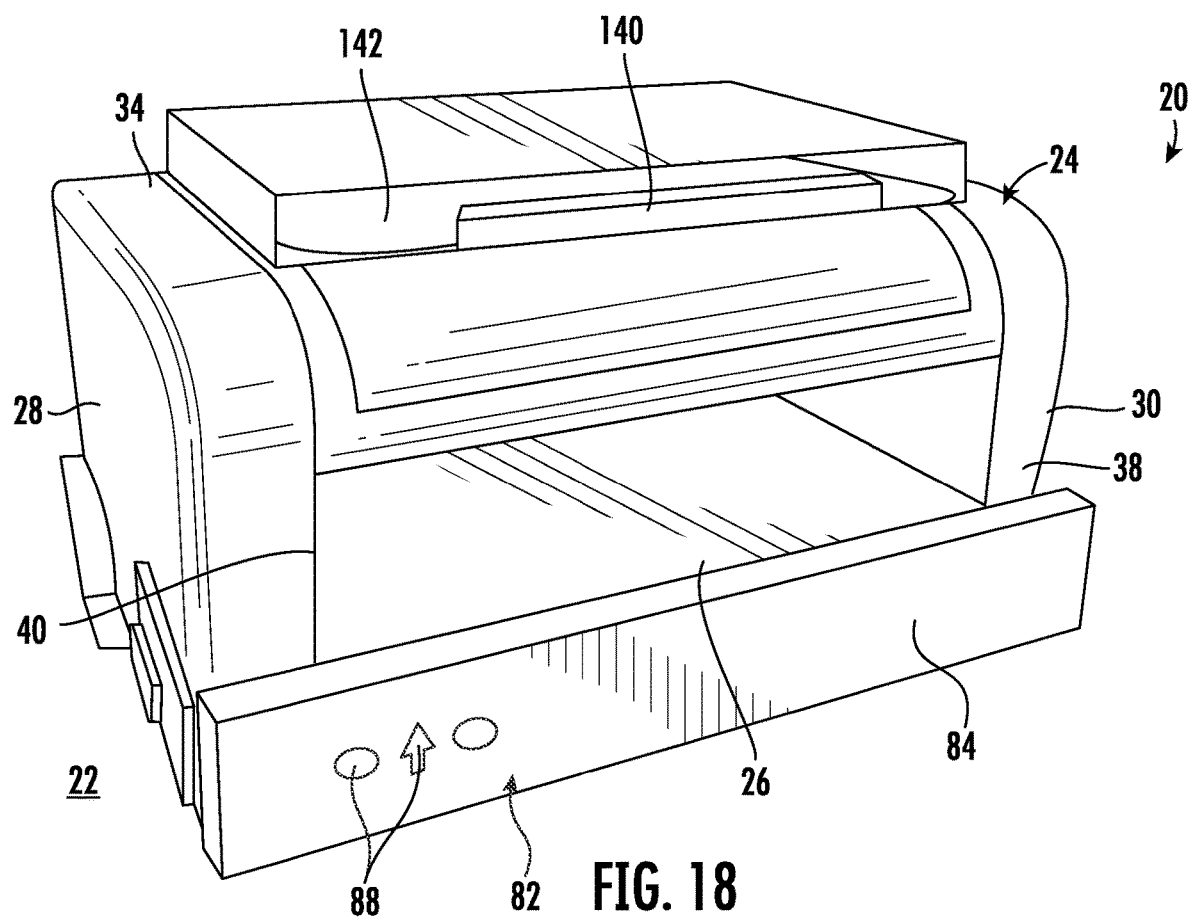
FIG. 18 is a perspective view the cooking system of FIG. 4 in a second cooking orientation according to an embodiment.
Figure 19:
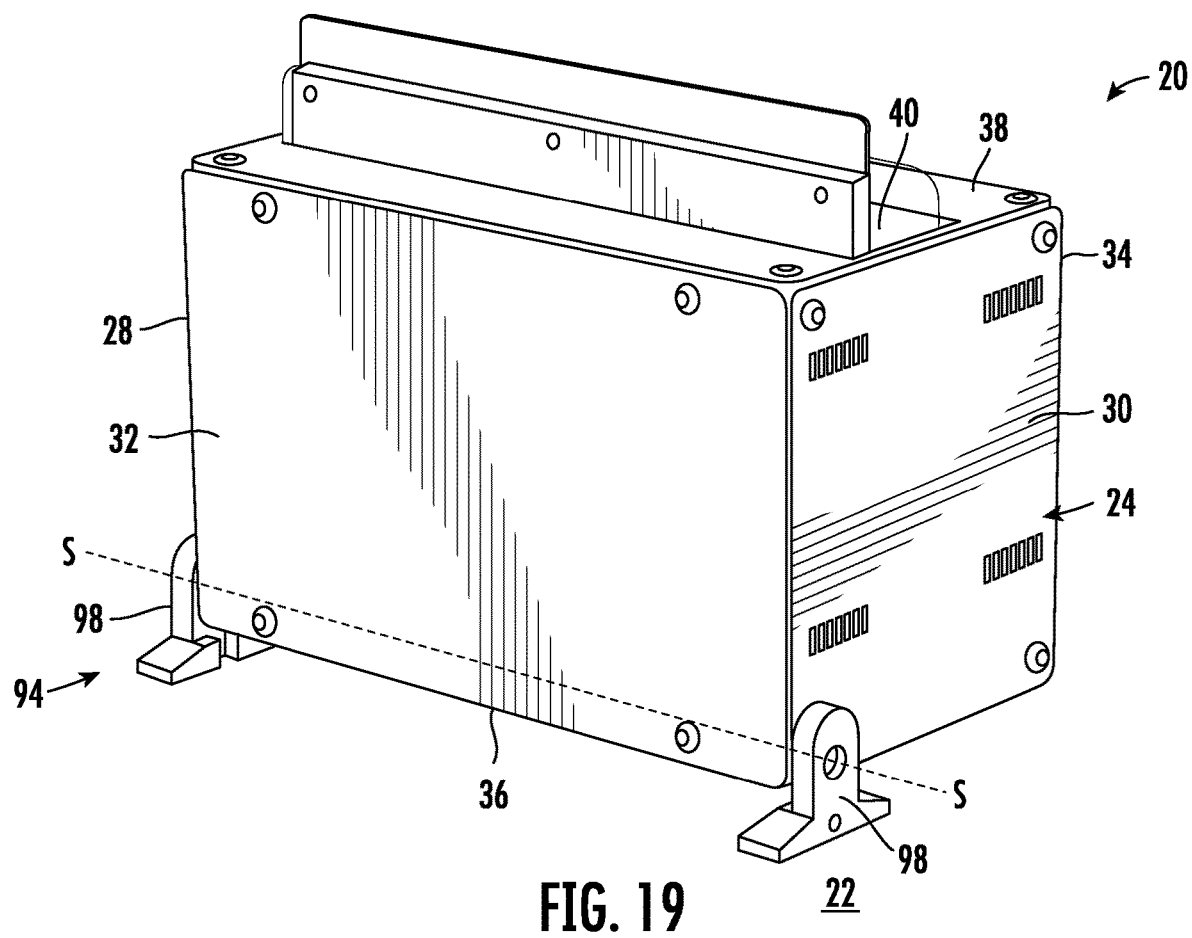
FIG. 19 is a perspective view a cooking system in a first cooking orientation according to an embodiment.
Figure 20:
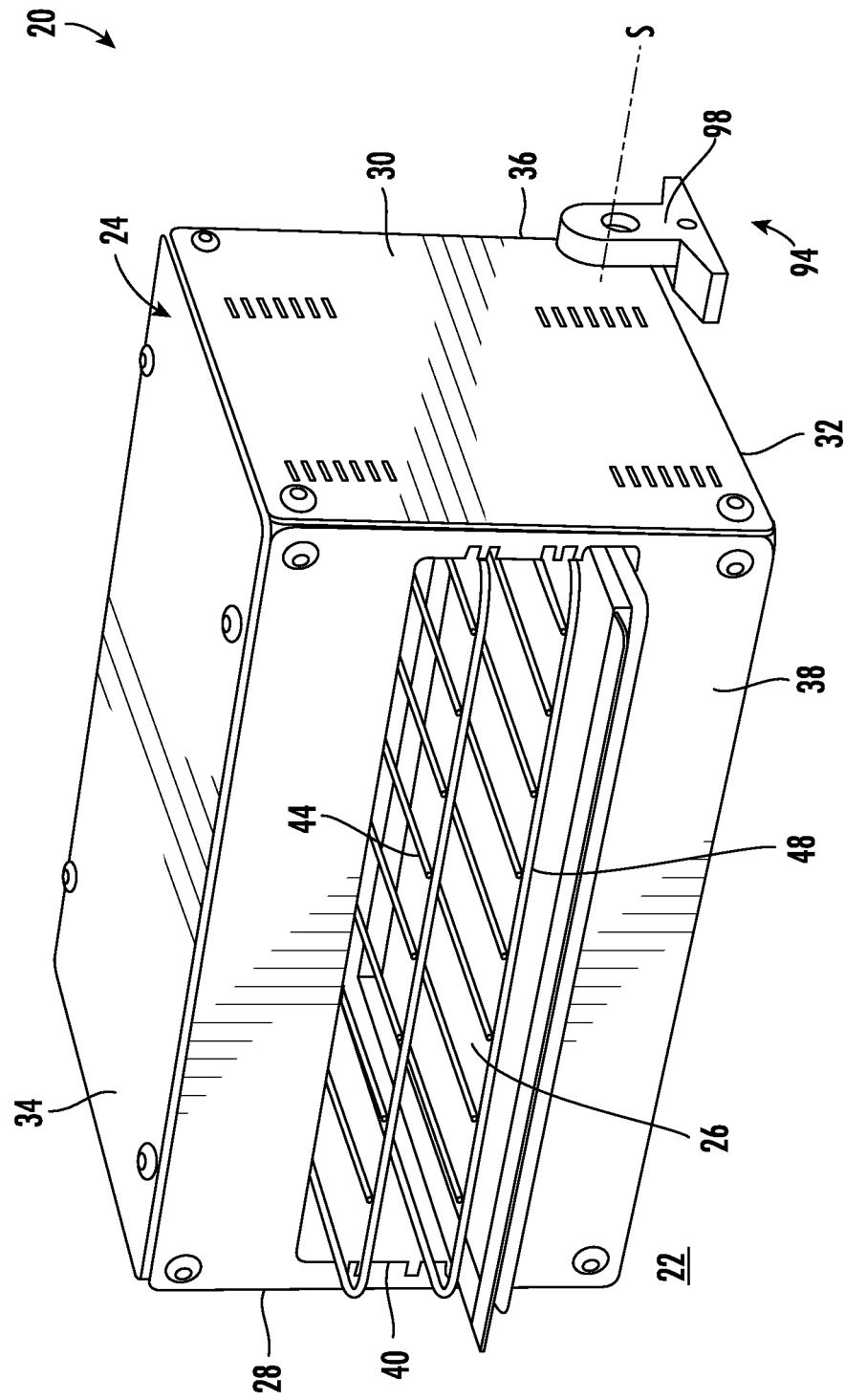
FIG. 20 is a perspective view the cooking system of FIG. 19 in a second cooking orientation according to an embodiment.

A control panel or user interface 82 for operating the cooking system 20 may be mounted to an exterior portion of the housing 24, such as the top 38 for example (see FIGS. 1, 15, 25a, 25b, 26a, 27a, 31, 34b and 40. Alternatively, as best shown in FIGS. 4 and 18, the cooking system 20 may include a component 84 movably mounted to the housing 24, and at least a portion of the control panel 82 may be coupled to or integrated into the movable component 84. In an embodiment, the movable component 84 is a handle pivotally mounted to opposing sides of the housing 24, such as the left side 28 and the right side 30 for example.

Figure 14:
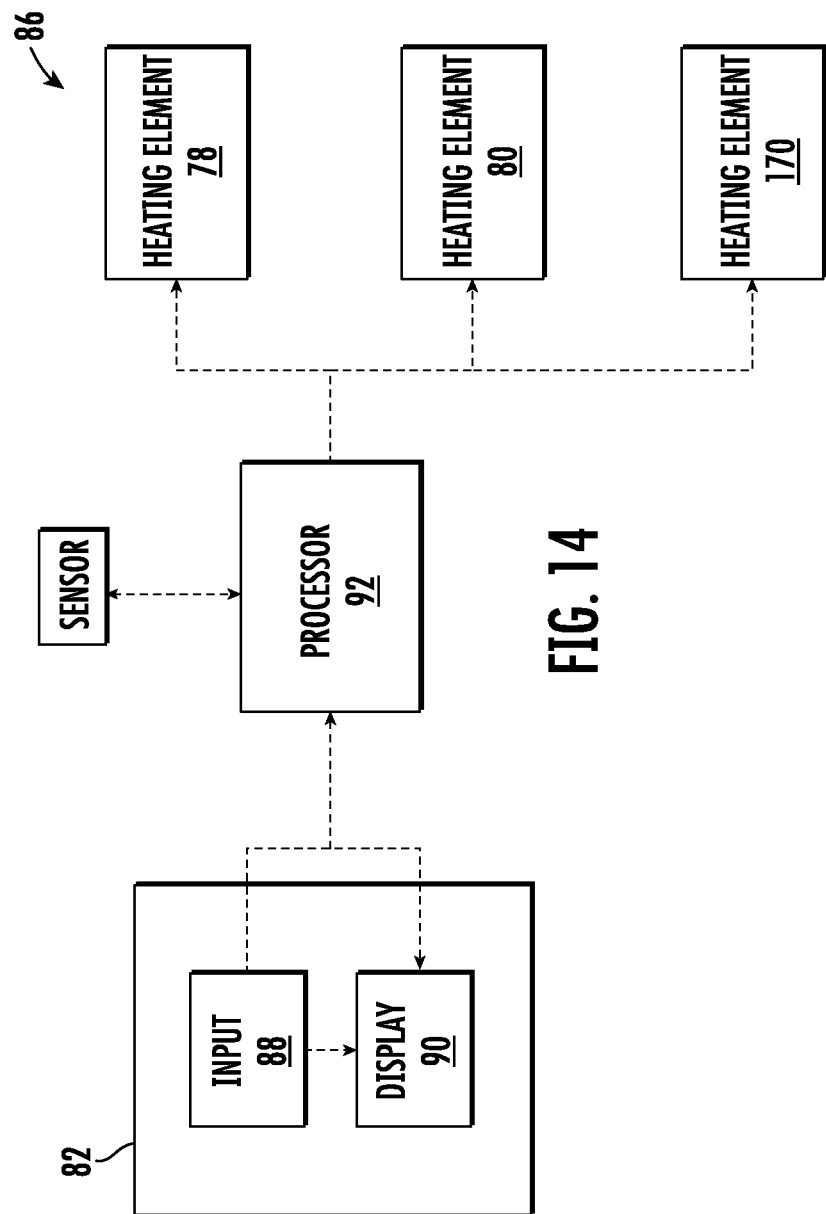
FIG. 14 is a schematic diagram of a control system of the cooking system according to an embodiment.
Figure 15:
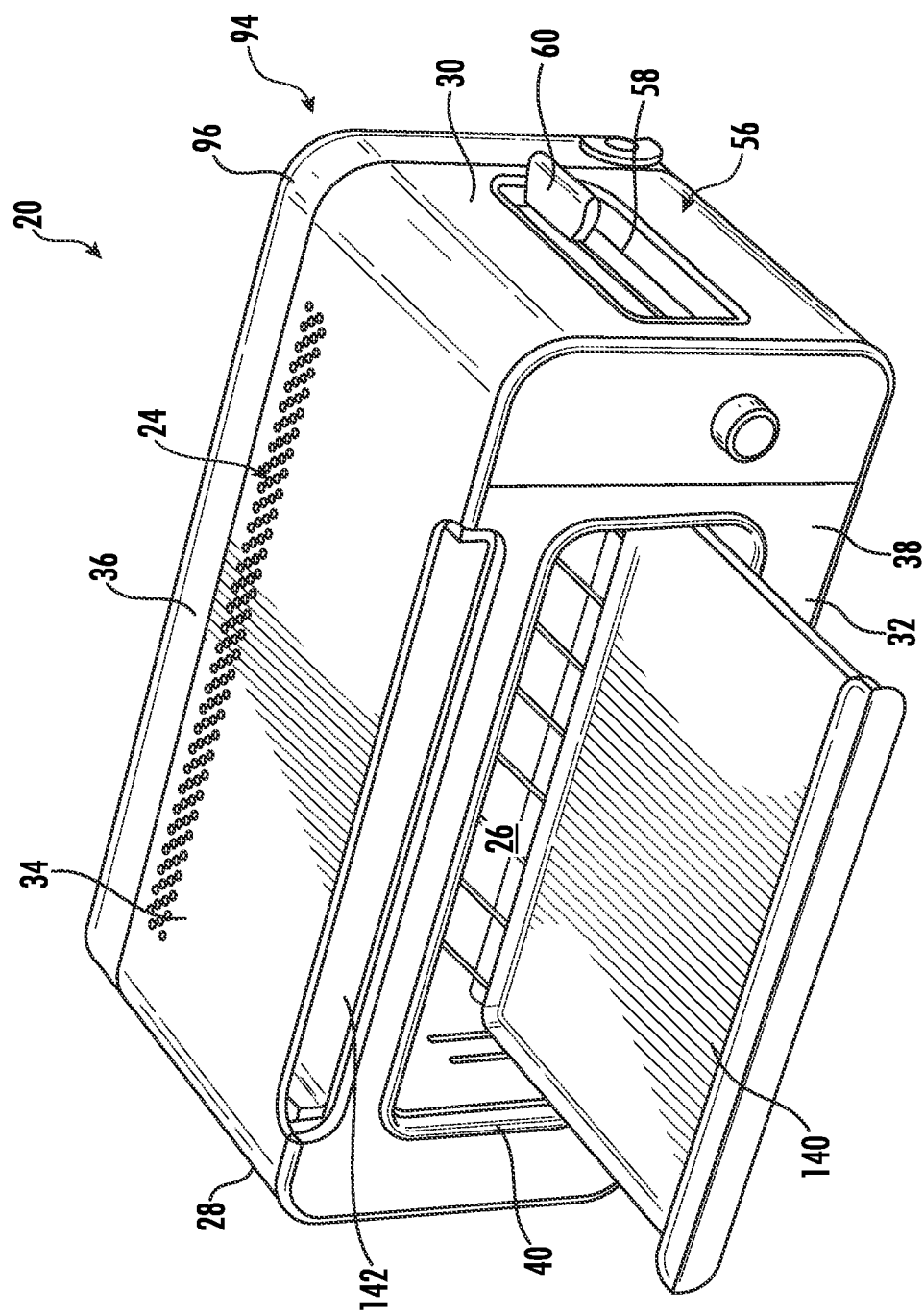
FIG. 15 is a perspective view the cooking system of FIG. 1 in a second cooking orientation according to an embodiment.
Figure 16:
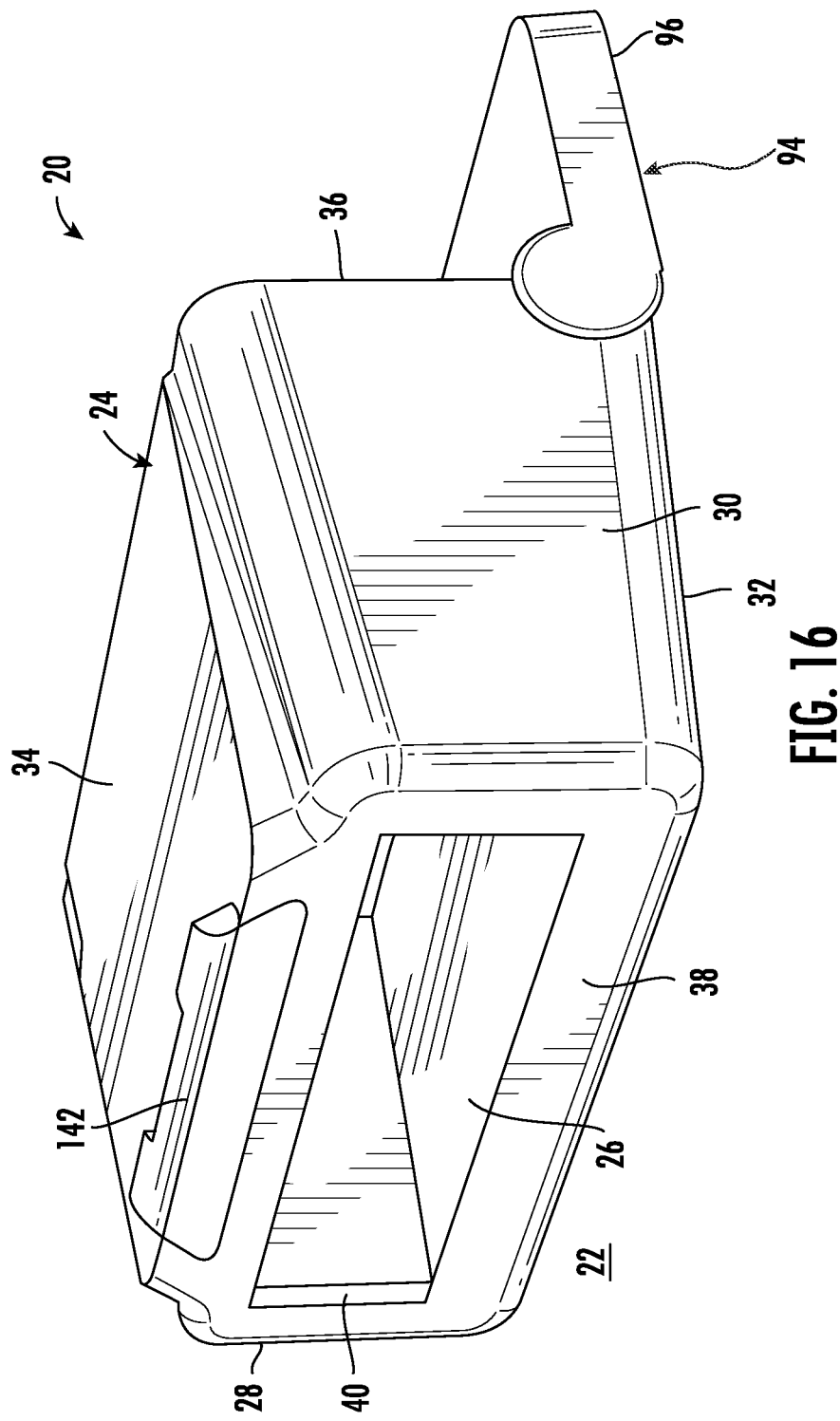
FIG. 16 is a perspective view the cooking system of FIG. 2 in a second cooking orientation according to an embodiment.
Figure 17:
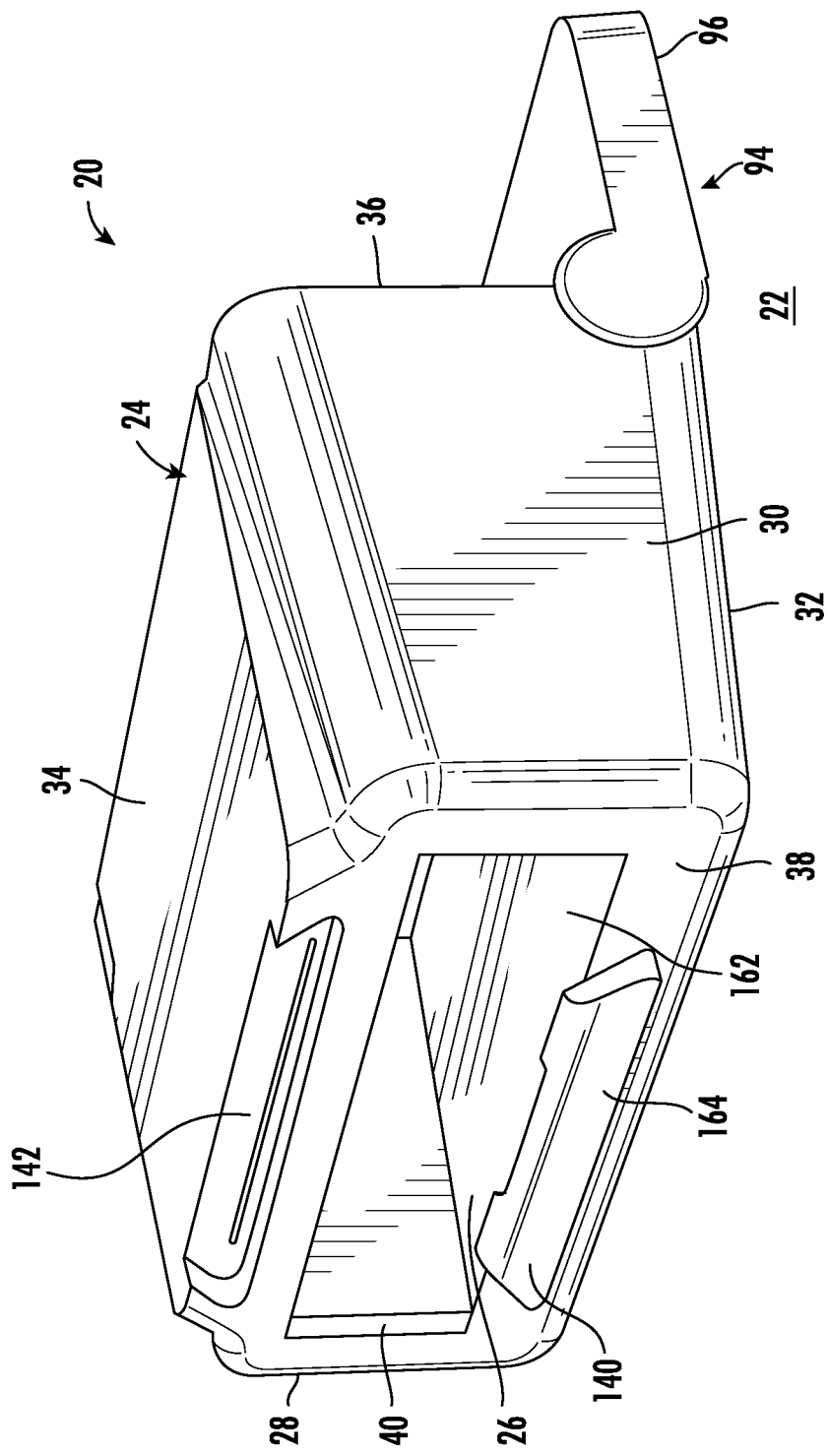
FIG. 17 is a perspective view the cooking system of FIG. 2 in a second cooking orientation with an accessory located in the internal cooking compartment according to an embodiment.

The control panel 82 is part of a control system 86 that is electrically connected to the one or more heating elements 78, 80. A schematic diagram of the control system 86 is illustrated in FIG. 14. The control panel 82 includes one or more inputs 88 associated with energizing or operation of the one or more heating elements 78, 80 of the cooking system 20 and for selecting various modes of operation of the cooking system 20. One or more of the inputs 88 may include a light or other indicator to show a user that the respective input 88 has been selected. The control panel 82 may additionally include a display 90 separate from and associated with the at least one input 88. However, embodiments where the display 90 and the at least one input 88 are integrated are also contemplated herein.

Operation of the one or more inputs 88 will be described in more detail below. As shown in FIG. 14, the control system 86 includes a controller or processor, illustrated schematically at 92, for controlling operation of the heating elements 78, 80 in response to a user input provided via the one or more inputs 88 and for using algorithms to execute stored sequences of heating operation. In embodiments where the cooking system 20 includes a plurality of heating elements, the heating elements 78, 80 may be independently operable. Further, the heating output of one or more of the heating elements 78, 80 may be variable in response to the power supplied to the heating elements 78, 80. The control system 86 may include one or more sensors arranged in communication with the processor 92 and operable to monitor one or more parameters of the cooking system 20, for example temperature within the cooking compartment 26. In some embodiments, the cooking system may additionally include an air movement device, such as a fan for example, to move a fluid through the cooking compartment 26 to achieve a convection operation. In such embodiments, the air movement device is operably coupled to and controlled by the processor 92.

In an embodiment, at least one input 88 on the control panel 82 is an on/off button which allows the user to activate or deactivate the control panel 82. When the control panel 82 is deactivated, none of the heating elements 78, 80 are energized. In an embodiment, the at least one input 88 is operable to select one or more manual modes of operation of at least one of the heating elements 78, 80. Alternatively, or in addition, at least one input 88 is operable to select a stored sequence of operation of at least one heating element 78, 80. In some cases, the stored sequences may be particularly well suited for a given method of food preparation and/or for particular ingredients or types of ingredients. The plurality of stored sequences associated with the at least one input 88 may be stored within a memory accessible by the processor 92. Alternatively, the plurality of stored sequences may be stored remotely from the cooking system 20, and may be accessed by the processor 92, such as via wireless communication for example.

In addition, a user may be able to enter or select a time associated with operation of the cooking system 20 in a desired manual mode. The time may be entered via the same input 88, or a separate input 88 as used to select a mode of operation. Further in embodiments where the cooking system 20 is in a mode configured to perform a stored sequence in response to selection of one of the inputs, the display 90 may indicate a time remaining. Temperature or other parameters, such as toasting color for example, may also be entered via inputs 88.

The at least one input 88 may include a distinct start button intended to initiate operation in a desired mode, a distinct stop button to cease all operation, or a stop/start button intended to initiate and cease functions. Alternatively, the cooking system 20 may be operable to automatically start operation after a predetermined time has elapsed once an input has been selected and any necessary information has been provided to the control panel 82. One or more of the other inputs 88, such as a knob for example, may be operable, such as by pushing the knob towards the control panel 82, to start and stop operation of the cooking system 20, regardless of whether the cooking system 20 is following a stored sequence or is in a manual mode.

The one or more inputs 88 are operable to initiate operation of the cooking system 20 in a plurality of cooking modes. Examples of modes of operation of the cooking system 20 include, but are not limited to, toast, bake, broil, warm, and reheat. Independent control of the heating elements 78, 80 allows a user to configure a cooking/heating cycle based on the type of food item positioned within the cooking compartment 26.

In an embodiment, the cooking system 20 is transformable between a first orientation or configuration (FIGS. 1-4 and 19), and a second orientation or configuration (FIGS. 15-18 and 20). However it should be understood that the cooking system 20 may perform a cooking operation or may be inactive or "stowed" in either the first orientation or the second orientation. In the illustrated, non-limiting embodiments, the housing 24 of the cooking system 20 is rotatable about a pivot axis S between the first orientation and the second orientation. In the first orientation, the housing 24 and the cooking compartment 26 have a generally vertical orientation, similar to a conventional toaster. As a result, the heating elements 78, 80 of the cooking system 20 have a first orientation, such as being spaced vertically for example. As shown, in the first orientation, at least one of the top 38 including the opening 40 formed therein and the bottom 36 of the housing 24 is arranged generally parallel to the support surface 22 on which the cooking system 20 is located, and the front 32 is oriented generally perpendicular to the support surface 22.

The cooking system 20 is rotatable about the pivot axis S in a first direction, indicated by arrow A (see FIG. 24a, 25a), toward the second orientation. In an embodiment, the cooking system 20 is rotatable approximately ninety degrees between the first orientation and the second orientation. However, it should be understood that embodiments where the cooking system 20 is configured to rotate greater than ninety degrees, or alternatively, less than ninety degrees, between the first orientation and the second orientation are also within the scope of the disclosure. In the second orientation, the housing 24 and the cooking compartment 26 are oriented generally horizontally, similar to a conventional countertop oven. As a result, the heating elements 78, 80 of the cooking system 20 have a second orientation, such as a horizontal orientation where the first and second heating elements 78, 80 are spaced within a horizontally oriented plane for example, when the cooking system 20 is in the second orientation. Further, in the second orientation, at least one of the back 34 and the front 32 is oriented generally parallel to the support surface 22 and the top 38 and/or bottom 36 of the housing 24 is oriented generally perpendicular to the support surface 22.

From the second orientation, the housing 24 of the cooking system 20 is rotatable about the pivot axis S in a second direction, indicated by arrow B (see FIG. 24b, 25b), toward the first orientation. As the cooking system 20 transforms between the first orientation and the second orientation, the top 38 and/or the opening 40 rotates out of plane, such as from a first plane to a second plane distinct from the first plane. Because the projected surface area of the housing 24 onto support surface 22 when in the first orientation is substantially smaller than the projected surface area of the housing 24 onto support surface 22 when in the second orientation, the surface area of the support surface 22 occupied by the cooking system 20 when the cooking system 20 is in the first orientation is minimized.

In an embodiment, the pivot axis S is positioned near an edge of the housing 24. For example, the pivot axis S is shown being located adjacent a bottom corner of the housing 24, near the interface between the bottom 36 and the front 32, or alternatively, near the interface between the bottom 36 and the back 34. However, it should be understood that embodiments where the pivot axis S is arranged along another edge of the housing 24, such as adjacent the interface between the bottom and a side 28, 30 for example, are also contemplated herein.

The pivot axis S may be defined by a pivot structure 94 coupled to or integrally formed with the housing 24. Accordingly, the pivot structure 94 locates at least a portion of the housing 24 relative to the support surface 22. In the illustrated, non-limiting embodiment of FIGS. 2-3, 16, and 17, the pivot structure 94 includes a component rotatably affixed to the bottom 36 of the housing 24. When the cooking system 20 is in the first orientation, the body 96 of the pivot structure 94 is disposed between the bottom 36 of the housing 24 and the support surface 22, and when the cooking system 20 is rotated about the pivot axis S to the second orientation, the cooking system 20 may be supported in a cantilevered configuration by the pivot structure 94. However, in other embodiments, one or more feet (not shown) may extend from a portion of the housing 24, such as from the front 32 of the housing 24 for example. These feet may cooperate with the pivot structure 94 to position the cooking system 20 on the support surface 22 in either the first or the second orientation.

In another embodiment, best shown in FIGS. 1, 6, 15, 19-21 the pivot structure 94 includes one or more mounting brackets 98 coupled to the housing 24. In the illustrated, non-limiting embodiment, the pivot structure 94 includes two separate mounting brackets 98, such as arranged at the left side 28 and right side 30 of the housing 24 for example. However, embodiments including a single mounting bracket 98 that extends between opposite sides of the housing 24 or two mounting brackets 98 that are integrally formed or connected together are also within the scope of the disclosure. The one or more mounting brackets 98 are pivotally connected to the housing 24 to position the cooking system 20 on the support surface 22. Accordingly, the one or more mounting brackets 98 remain constant or stationary relative to the support surface 22 as the housing 24 rotates relative to the at least one mounting bracket 98. As shown, the housing 24 may be supported entirely by the at least one mounting bracket 98, such as in a cantilevered configuration for example, in both the first orientation and the second orientation.

Figure 21:
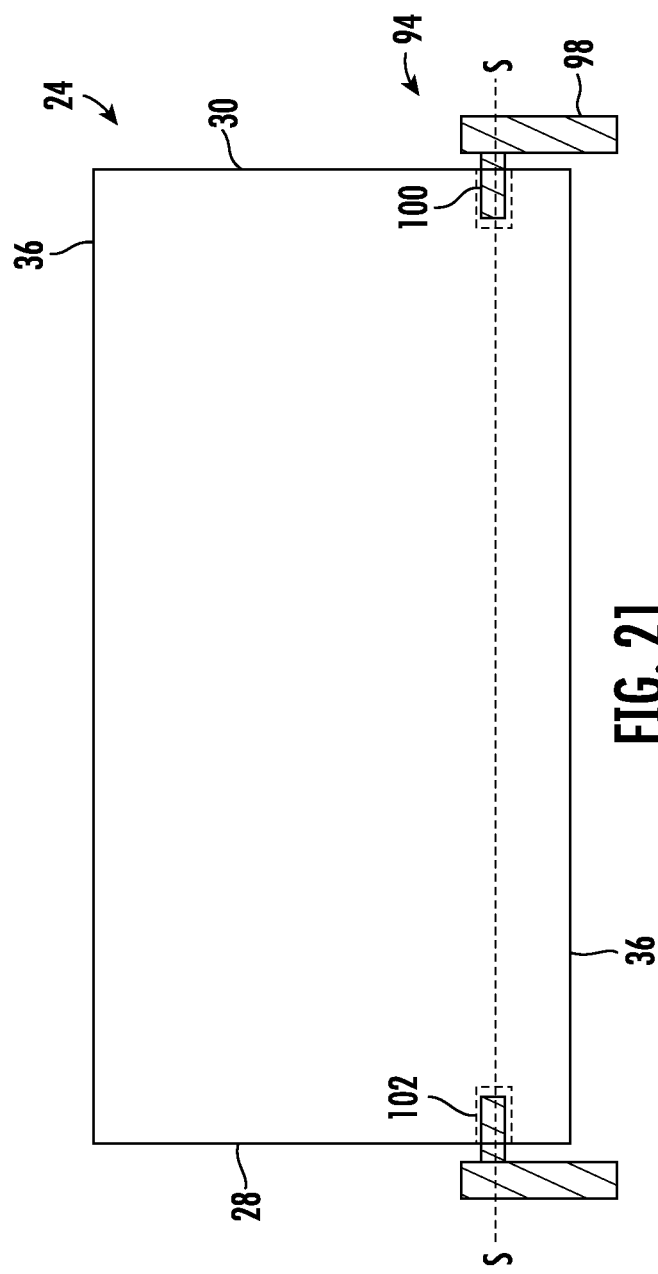
FIG. 21 is a schematic diagram of a pivot structure of the cooking system according to an embodiment.

In an embodiment, best shown in FIG. 21, each of the mounting brackets 98 includes a pin connector 100 receivable within a corresponding opening 102 formed in a side, such as sides 28 and 30 for example, of the housing 24. In the illustrated, non-limiting embodiment, the pin connectors 100 of the at least one mounting bracket 98, respectively, are coaxially oriented. Together, the pin connectors 100 cooperate to define the pivot axis S. The pin connectors 100 may directly contact an interior surface of the opening 102, or alternatively, a bearing (not shown) may be located at the interface between the pin connector 100 and the opening 102 to facilitate movement of the housing 24 relative to the pin connectors 100. In an embodiment, the pin connectors 100 and/or the openings 102 may be configured to restrict rotation of the housing 24 about the pivot axis S to a position beyond the first orientation and the second orientation. However, the rotation of the housing 24 about the pivot axis S may be controlled or limited via any suitable mechanism.

In yet another embodiment, the pivot structure 94 may be a rounded feature (not shown) arranged at an edge of the housing 24. However, the rounded feature of the pivot structure 94 is distinct from the rounded edges of the housing 24. In an embodiment, the pivot structure 94 includes one or more arcuate features, such as ribs for example, located at an exterior surface of the housing 24 and extending between the bottom 36 and the rear wall 34. The origin of each of the arcuate features may define the pivot axis S and the contour of the arcuate features may facilitate rotation of the housing 24 by a user between the first position and the second position. It should be understood that the various embodiments of a pivot structure 94 illustrated and described herein are intended as an example only, and that any suitable configuration that allows the housing 24 to transform between a first orientation and a second orientation relative to the support surface 22 is within the scope of the disclosure. Although as described herein, the housing 24 is rotatable relative to the pivot structure 94 it should be understood that embodiments where the pivot structure is rotatable relative to the housing 24 are also contemplated herein.

The cooking system 20 is operable in a plurality of cooking modes, and in an embodiment, one or more of the cooking modes available for operation is dependent on an orientation of the cooking system 20. For example, when in the first orientation, the cooking system 20 is operable to perform a first cooking operation. In an embodiment, the first cooking operation or mode includes a toasting operation where both the first plurality of heating elements 78 and the second plurality of heating elements 80 are energized. However, other cooking operations where only a portion of the heating elements 78, 80, such as one or more of the first plurality of heating elements 78 and/or one or more of the second plurality of heating elements 80, are energized may also be performed when the cooking system 20 is in the first orientation.

To use the cooking system 20 in the first orientation, a food item is inserted into the portion of the gap 50 between the first food support element 42a and the second food support element 42b. In the first orientation, the first food support element 42a defines a first support surface configured to contact a first side or surface of a food item installed within the gap 50 and the second food support element 42b defines a second support surface operable to contact a second, opposite surface of a food item installed within the gap 50. An end of the food item is typically arranged in contact with and supported against gravity by the support member 52. To properly position the food item within the gap 50 for a cooking operation, the support member 52, is translated from the raised, inactive position to the lowered, active position by operating the movement mechanism 56. When the food item is properly positioned within the gap 50, a substantial portion, or in some embodiments, an entirety of the food item, is positioned within the cooking compartment 26 between the first food support element 42a and the second food support element 42b, adjacent one or more heating elements 78, 80.

In an embodiment, when the cooking system 20 is in the first orientation, operation of the movement mechanism 56 and/or translation of the support member 52 to the active position automatically initiates the first cooking operation. For example, when the support member 52 or the movement mechanism 56 associated therewith is moved to the active position, a signal may be generated and communicated to the processor 92 to energize one or more of the plurality of heating elements 78, 80, and/or a timer. In an embodiment, operation of the movement mechanism 56, such as movement of the lever to the lowered position, operates a switch (not shown), thereby completing a circuit for delivering power to one or more components of the cooking system 20.

Figure 22:
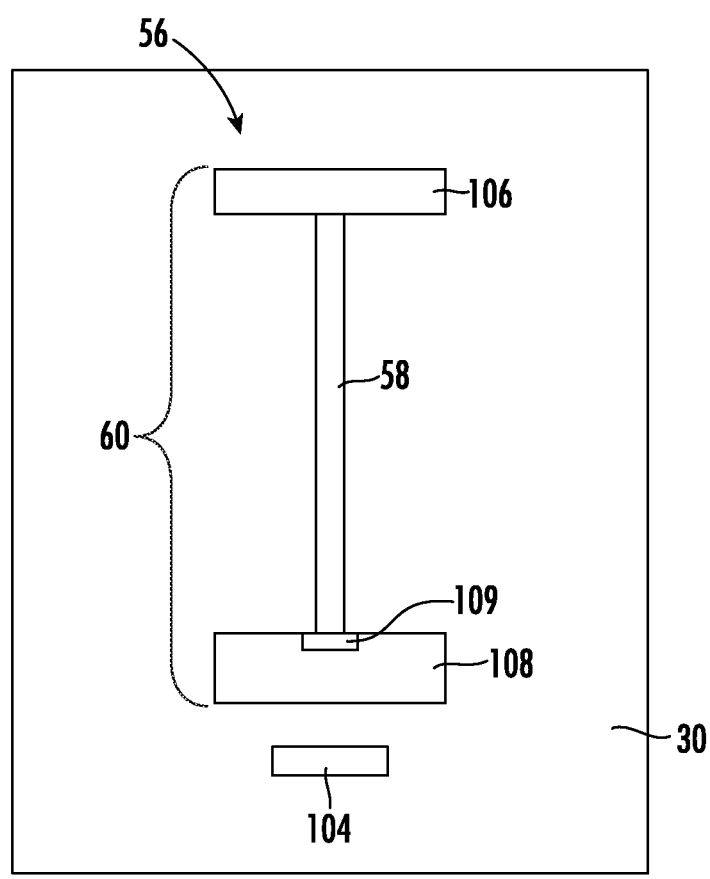
FIG. 22 is an end view of a cooking system including a movement mechanism according to an embodiment.

With reference now to FIG. 22, an electromagnetic catch 104 operably coupled to the processor 92 may be located adjacent a portion of the support member 52 or an end of the slot 58. A magnetic field generated by the electromagnetic catch 104 when energized may cooperate with a portion of the movement mechanism 56 to retain the movement mechanism 56 and/or support member 52 in the lowered position. In an embodiment, the attraction between a portion of the movement mechanism 56 and/or the support member 52 and the electromagnetic catch 104 is sufficient to oppose a biasing force of a biasing mechanism 57 acting on the movement mechanism 56.

With continued reference to FIG. 22, in an embodiment where the movement mechanism 56 is a manually translatable lever, the paddle 60 includes a first portion 106 and a second portion 108. The first and second portions 106, 108 are removably connected to one another via any suitable coupling mechanism 109, including but not limited to a magnet for example. In such embodiments, the support member 52 may be associated with or connected to the first portion 106 of the paddle 60. To initiate the first cooking operation, both the first portion 106 and the second portion 108 are moved as a single unit from the inactive position to the active position. In the active position, the second portion 108 of the paddle 60 engages the switch. Additionally, the electromagnetic catch 104 may be configured to cooperate with the second portion 108 to retain the second portion 108 in the lowered position as previously described.

During the first cooking operation, the first portion 106 of the paddle 60 may be selectively decoupled from the second portion 108, such as via application of a force thereto. When the first portion 106 is decoupled from the second portion 108, the support member 52 connected to the first portion 106 may be translated within the slot 58 to the raised position, causing at least a portion of the food item within the gap 50 to move out of the cooking compartment 26. In this raised position, a user can view the food item to determine a cooking status thereof, such as a color or doneness of the food item, without interrupting the first cooking operation. However, it should be understood that a paddle 60 having only a single piece translatable relative to the slot 58 is also within the scope of the disclosure.

As noted previously, when the cooking system 20 is in the second orientation, the cooking system 20 is operable to perform a second cooking operation. Examples of the second cooking operation include, but are not limited to baking, broiling, heating, warming, and reheating for example. Depending on the second cooking operation selected to be performed, all or a portion of the heating elements 78, 80 of the cooking system 20 are energized. For example, one or more of the first plurality of heating elements 78 may be energized, one or more of the second plurality of heating elements 80 may be energized, or at least one of both the first plurality of heating elements 78 and the second plurality of heating elements 80 may be energized.

Figure 5A:
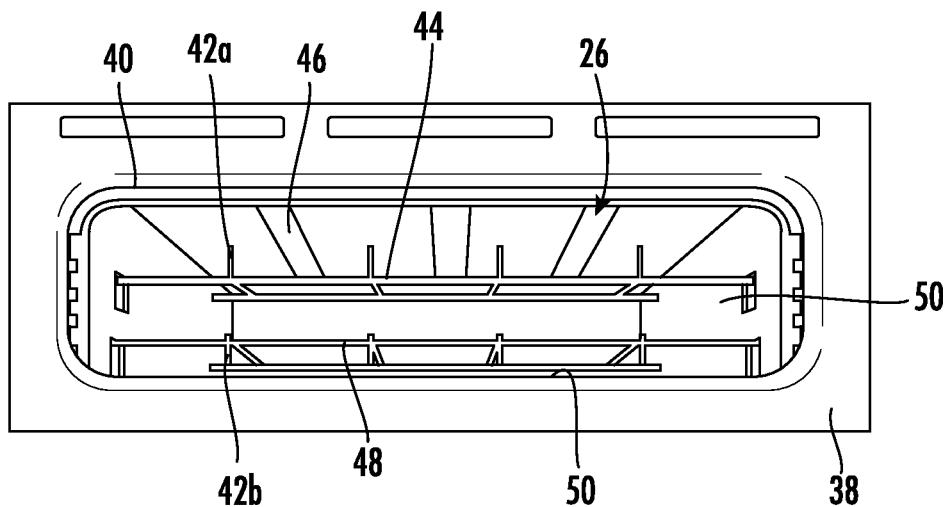
FIG. 5A is a perspective view of at least one food support element when the cooking system is in the first cooking orientation according to an embodiment.
Figure 5B:
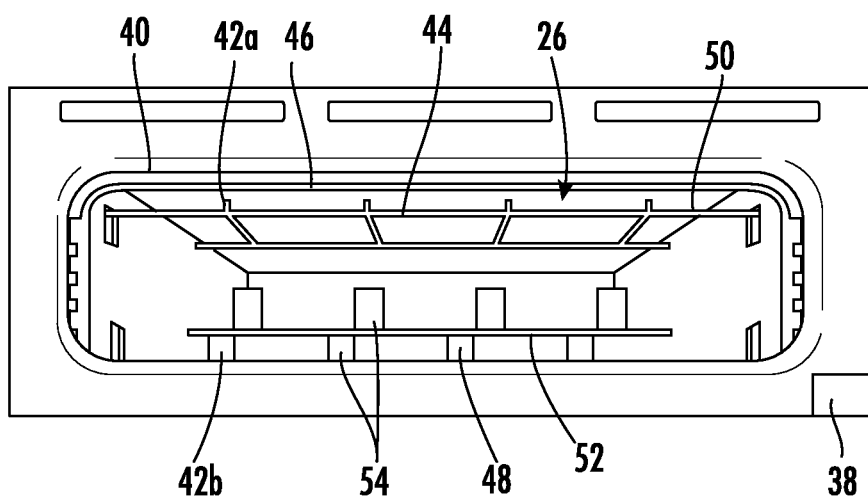
FIG. 5B is a perspective view of at least one food support element when the cooking system is in the second cooking orientation according to an embodiment.
Figure 41A:
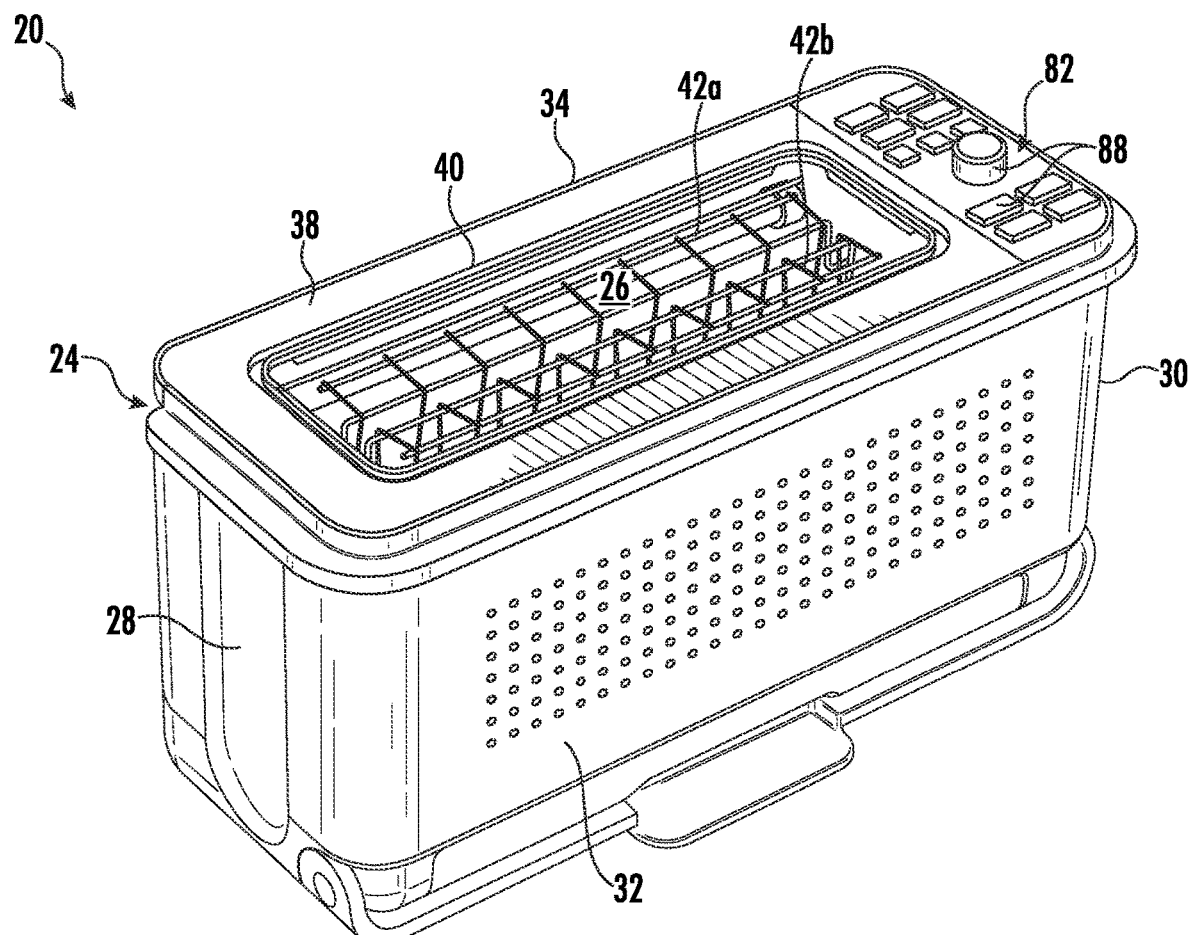
FIG. 41A is a perspective view a cooking system in a first cooking orientation according to an embodiment.
Figure 41B:
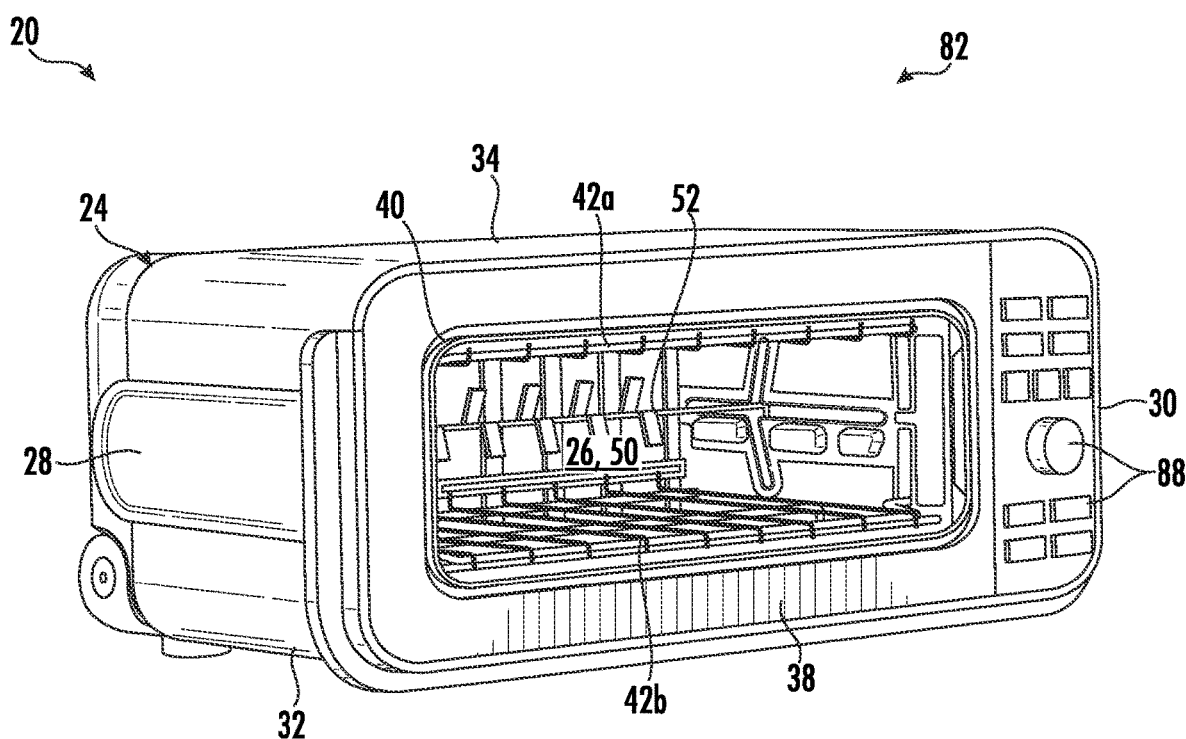
FIG. 41B is a perspective view the cooking system of FIG. 41A in a second cooking orientation according to an embodiment.

As the cooking system 20 transforms between the first orientation and the second orientation, the at least one food support element 42a, 42b is configured to move between a first position (see FIGS. 5A and 41a) and a second position (see FIGS. 5B and 41b). When the cooking system 20 is in the first orientation, the at least one food support element 42a, 42b is arranged at a first, extended position relative to the cooking compartment 26. For example, the first food support element 42a is offset from the first interior surface 46 by a distance and the second food support element 42b is also offset from the second interior surface 48 by a distance. The distance between each of the first and second food support elements 42a, 42b and a respective interior surface 46, 48 may, but need not be the same.

When the cooking system 20 is transformed to the second orientation, the at least one food support element 42 is moved to a second, retracted position relative to the cooking compartment 26. Accordingly, the distance defined between the first interior surface 46 and the first food support element 42a and/or the distance between the second interior surface 48 and the second food support element 42b when the cooking system 20 is in the second orientation is reduced compared to when the cooking system 20 is in the first orientation. As a result, the gap 50 defined between the first and second food support elements 42a, 42b when the cooking system 20 is in the second orientation is greater than the gap 50 when the cooking system 20 is in the first orientation (regardless of whether the support member 52 is in an active or inactive position). In an embodiment, the 50 between the first and second food support elements 42a, 42b in the first, extended position is about 35 mm, and the gap 50 between the first and second food support elements 42a, 42b in the second, retracted position is about 72 mm.

By increasing the gap 50 when the cooking system 20 is in the second orientation, larger food items may be received within the cooking compartment 26. As a result, a food item having one or more toppings positioned thereon, such as a piece of bread having a piece of cheese stacked thereon for example, may be inserted into the cooking compartment 26 without interference with an adjacent food support element 42. When the housing 24 is in the second orientation, the second food support element 42b, arranged adjacent the front 32 of the housing 24 may be used to the support a food item within the cooking compartment 26. The second food support element 42b may directly support a food item, such that the food item is placed upon or in contact with the second food support element 42b for example. Alternatively, or in addition, the second food support element 42b may indirectly support a food item, such that an accessory or insert is positioned between the second food support element 42b and the food item to be cooked. Accordingly, the first food support element 42a may simply provide a barrier to prevent direct contact with the one or more adjacent heating elements 78.

Figure 24A:
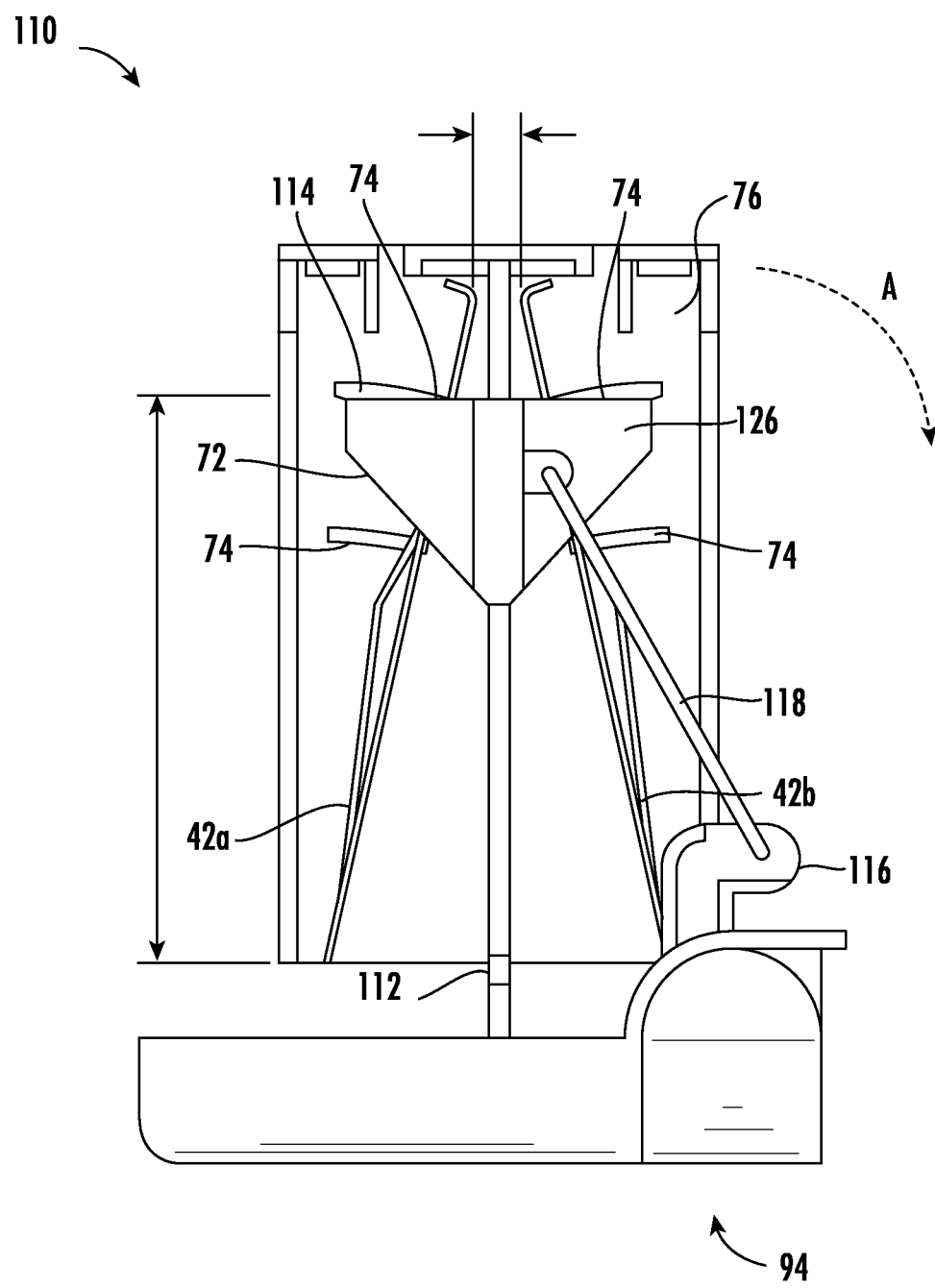
FIG. 24A is an end view of a mechanism for moving the food support elements of the cooking system when the cooking system is in the first cooking orientation according to an embodiment.
Figure 24B:
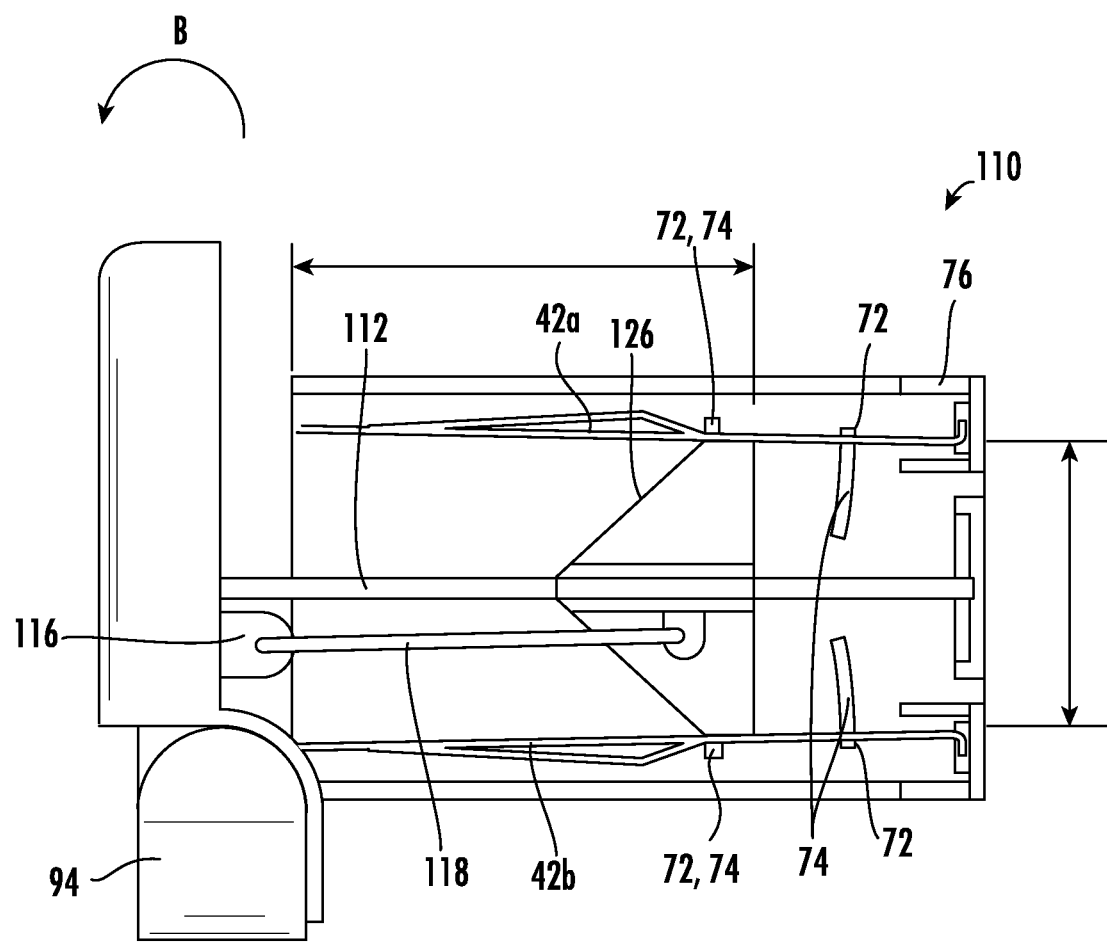
FIG. 24B is an end view of the mechanism of FIG. 24A when the cooking system is in the second cooking orientation according to an embodiment.

The cooking system 20 may include a mechanism 110 for automatically moving the at least one food support element 42 between the extended position and the retracted position when the cooking system 20 is transformed between the first orientation and the second orientation. The mechanism 110 may be the same mechanism, or a different mechanism than that used to move the food support elements 42a, 42b in response to movement of the support member 52. With reference now to FIGS. 24a and 24b, an example of such a mechanism 110 is illustrated in more detail. In the illustrated, non-limiting embodiment, one or more posts 72 associated with a corresponding food support element 42 are received within one or more openings 74 formed in a panel or radiant casing 76 adjacent a side of the cooking compartment 26. For example, each food support element 42a, 42b may have two posts associated therewith.

In the illustrated, non-limiting embodiment shown, the openings 74 have a generally arcuate contour; however, openings 74 having any suitable shape are within the scope of the disclosure. For example, the openings 74 of the mechanism 110 illustrated in FIGS. 25a-25b have a generally linear or horizontal configuration. As previously described, the openings 74 define a path of movement of the posts 72 and therefore the food support elements 42a, 42b, within the cooking compartment 26. For example, when the food support elements 42a, 42b are in the extended position, the posts 72 of the food support elements 42a, 42b are arranged at a first position within each of the openings 74, such as adjacent a first end thereof. Similarly, when the food support elements 42a, 42b are in the retracted position, the posts 72 are located at a second position within the openings 74, such as adjacent a second, opposite end thereof.

In the illustrated, non-limiting embodiment of FIGS. 24a and 24b, a central support rod 112 is mounted to a surface of the panel or radiant casing and extends parallel to the gap 50. A support wedge 114 is slidably mounted to the support rod 112. A mount 116 arranged within the interior of the housing 24 and fixed to the pivot structure 94 is connected to the support wedge 114 by a connecting member 118, such as a rod for example. In an embodiment, when the cooking system 20 is in the first orientation, the support wedge 114 does not engage or interact with the posts 72, which are located at the first position, associated with the food support elements 42a, 42b in the extended position.

Figure 25A:
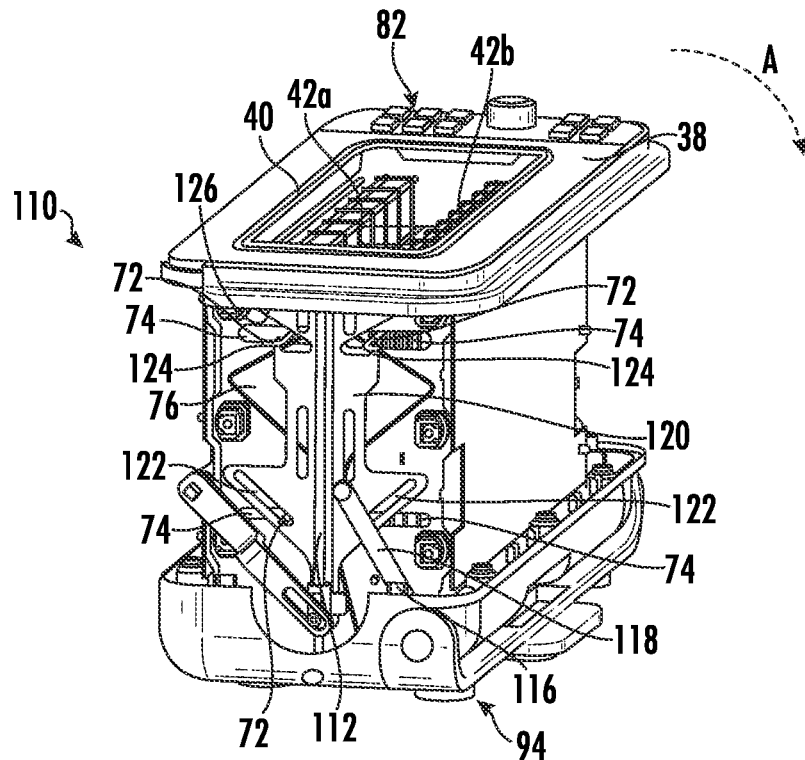
FIG. 25A is a perspective view of a mechanism for moving the food support elements of the cooking system when the cooking system is in the first cooking orientation according to an embodiment.
Figure 25B:
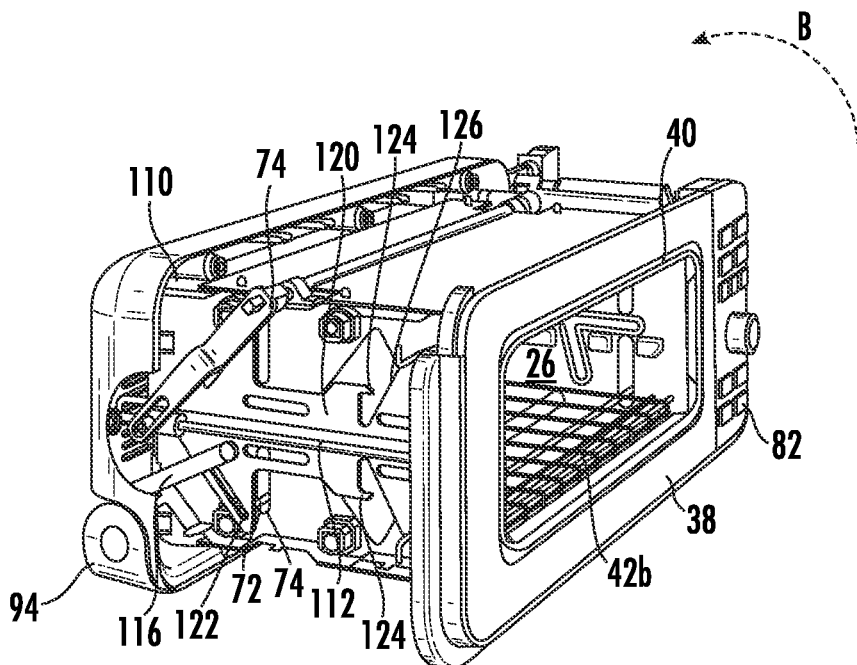
FIG. 25B is a perspective view of the mechanism of FIG. 25A when the cooking system is in the second cooking orientation according to an embodiment.
Figure 26A:
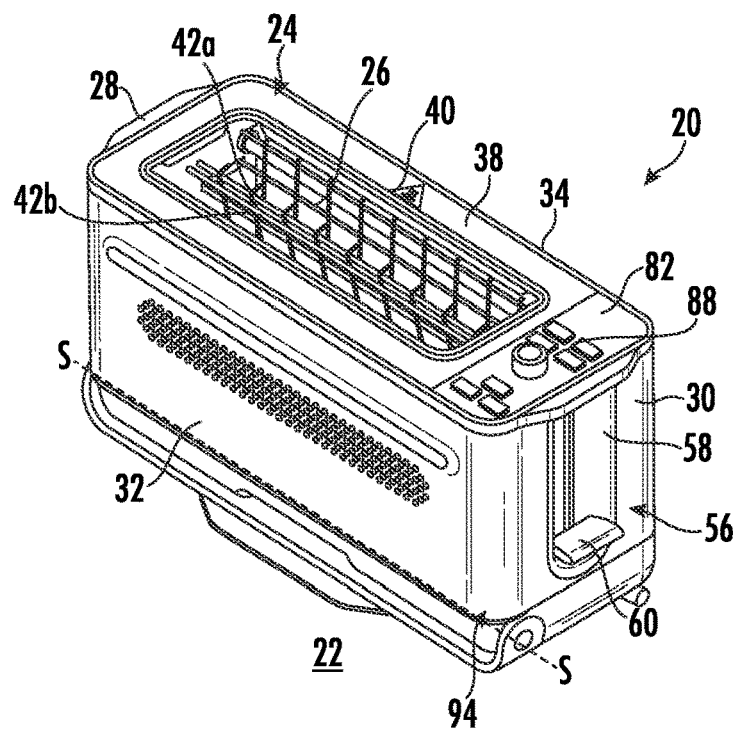
FIG. 26A is a perspective view of a cooking system is in the first cooking orientation according to an embodiment.
Figure 26B:
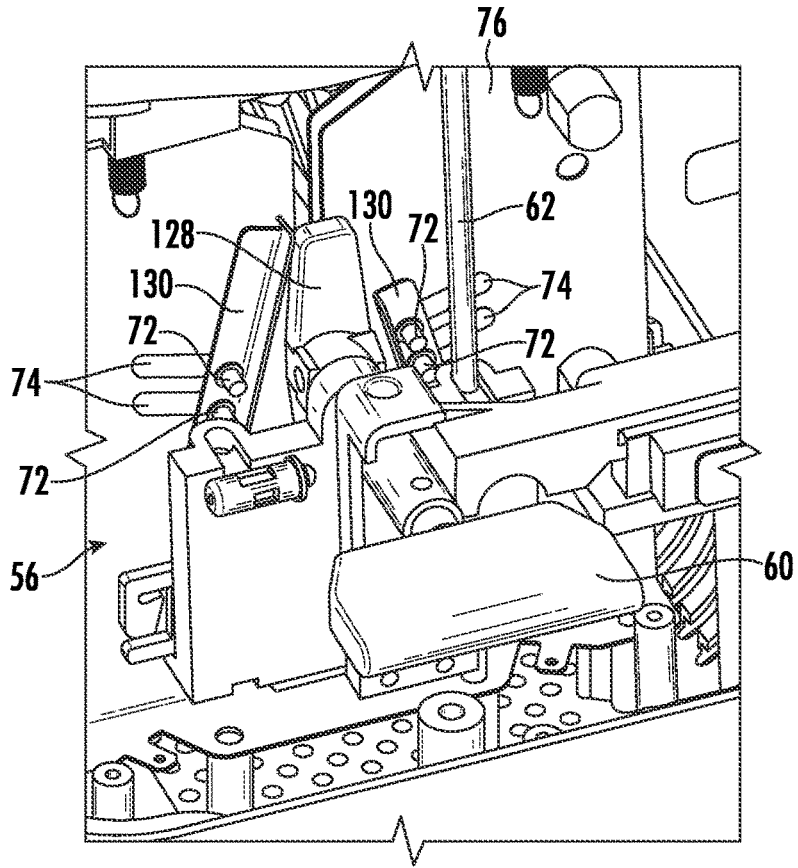
FIG. 26B is a perspective view of a movement mechanism of the cooking system of FIG. 26A according to an embodiment.
Figure 27A:
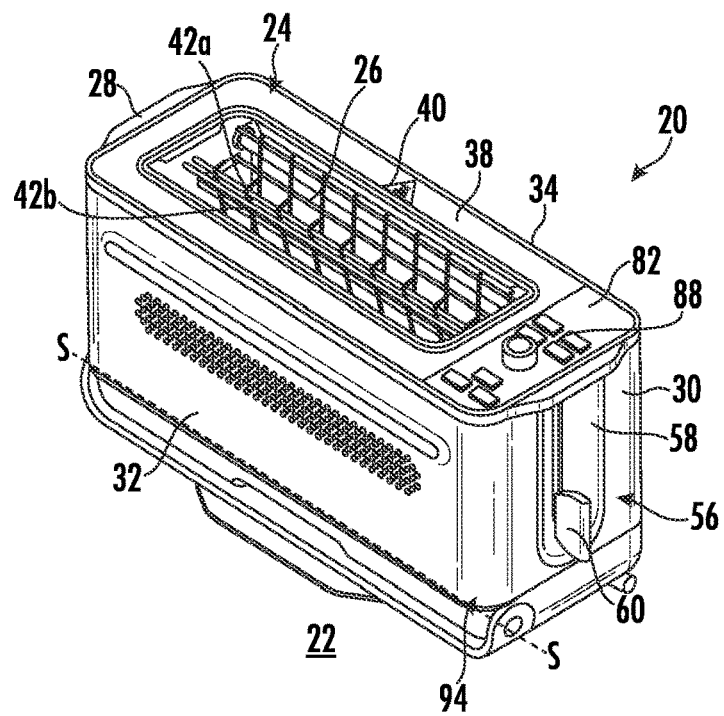
FIG. 27A is a perspective view of a cooking system is in the first cooking orientation according to an embodiment.
Figure 27B:
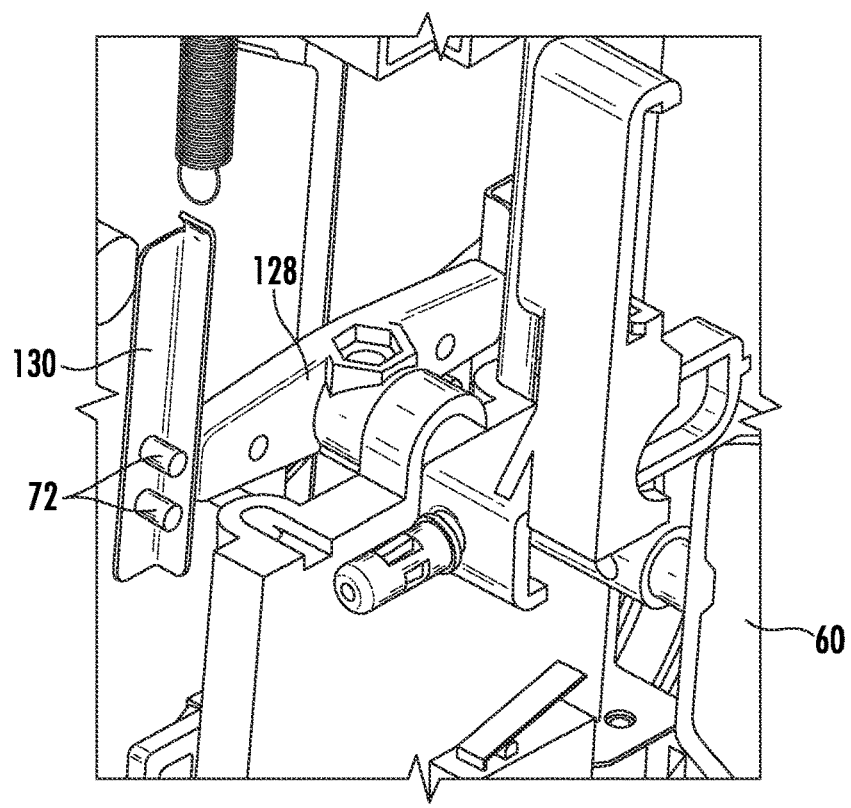
FIG. 27B is a perspective view of a movement mechanism of the cooking system of FIG. 27A according to an embodiment.

In the embodiment of the mechanism 110 illustrated in FIGS. 25a and 25b, the mechanism 110 includes a cam plate 120 instead of a support wedge 114. The cam plate 120 additionally includes a plurality of slots 122 formed therein, and at least a portion of the posts 72, such as the lower posts for example, extend through both the openings 74 and the slots 122. As shown, the slots 122 of the cam plate 120 have a different configuration than the adjacent openings 74, such as an angled configuration corresponding to a wedging surface 126 of the cam plate 120. Similar to the support wedge 114, when the cam plate 120 is in the first position, the food support elements 42a, 42b are able to transform between the positions associated with the support member 52 in the inactive and active positions. In an embodiment, one or more protrusions 124 extending from the cam plate 120 define a stop position of the food support elements 42a, 42b in a direction opposite the bias of the biasing mechanism 57 when the support member 52 is in the inactive position.

As the housing 24 of the cooking system 20 is rotated about the pivot axis S from the first orientation to the second orientation, the mount 116 remains stationary. As a result, the connecting member 118 coupling the mount 116 to the support wedge 114 or cam plate 120 applies a force to the support wedge 114 or cam plate 120, causing the support wedge 114 or cam plate 120 to translate laterally along the axis defined by the support rod 112. In an embodiment, the support wedge 114 or cam plate 120 is configured to translate approximately 20 mm in response to rotation of the housing 24 of the cooking system 20 about the pivot axis S.

Figure 23:
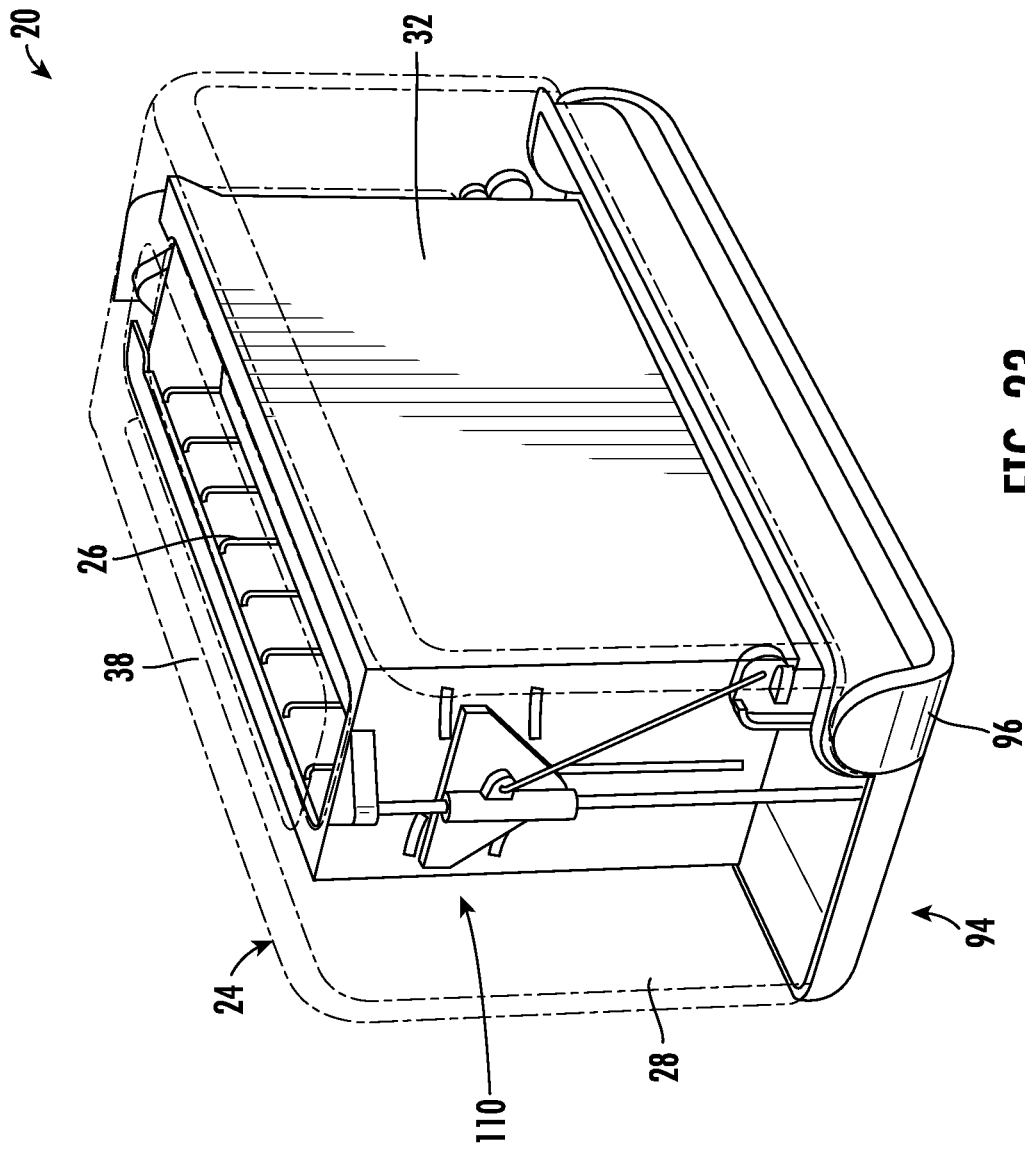
FIG. 23 is a perspective view of a cooking system in a first cooking orientation according to an embodiment.

With respect to embodiments of the mechanism 110 including the support wedge 114 (FIGS. 23-24b), engagement between at least one wedging surface 126 of the support wedge 114 and the posts 72 exerts an outward force on the posts 72. In response to this force, the posts 72 move within the pathway defined by the respective openings 74, causing the food support elements 42a, 42b to transform to the retracted position. In the embodiments of the mechanism 110 including the cam plate 120 (FIGS. 25a and 25b), as the cam plate 120 translates, a wedging surface 126 thereof is configured to exert an outward force on the upper posts 72. As a result of the configuration of the slots 122, each lower post 72 is configured to translate outwardly.

Upon rotating the housing 24 back to the first orientation, the one or more wedging surfaces 126 will move out of engagement with the posts 72. Upon removing the force from the posts 72, the food support elements 42a, 42b may be configured to return to the extended position within the cooking compartment 26 via gravity. However, in other embodiments, a biasing mechanism (not shown) may facilitate movement of the food support elements 42a, 42b back to the extended position.

In another embodiment, the movement mechanism 56 associated with the support member 52 is also operable to move the at least one food support element 42 between the extended position and the retracted position. In such embodiments, the movement mechanism 56 may be configured to move the at least one food support element 42 prior to rotating the cooking system 20. In such embodiments, the movement mechanism 56 is a manually operable mechanism, such as a lever as previously described. With reference to FIGS. 26a-27b, during operation in a first cooking mode, the portion of the lever arranged adjacent the exterior of the housing 24, such as the paddle 60, has a first configuration.

In the illustrated, non-limiting embodiment, an opening cam 128 is connected to the lever 56, such as at a position within the housing 24, external to the cooking compartment 26. In addition, at least one slide plate 130 is mounted to the posts 72 extending from the food support elements 42a, 42b, generally adjacent the opening cam 128. The slide plates 130 are configured to move with the posts 72 relative to the at least one slot or opening 74.

Prior to transformation of the housing 24 to the second configuration, the paddle 60 or portion of the lever 56 that is accessible by a user is configured to rotate about an axis. In an embodiment, the paddle 60 is configured to rotate about 90 degrees between a generally horizontal orientation associated with an extended position of the food support elements 42a, 42b, and a vertical orientation associated with a retracted position of the food support elements 42a, 42b. In an embodiment, when the paddle 60 is in a generally horizontal configuration, the opening cam 128 has a generally vertical orientation and is not in contact with the one or more slide plates 130, and when the paddle 60 is in a generally vertical orientation, the opening cam 128 has a generally horizontal orientation. As the paddle 60 is rotated about its axis, the opening cam 128 rotates into contact with the one or more slide plates 130. The force applied to the slide plates 130 by the opening cam 128 causes the slide plates 130, and therefore the posts 72 and the food support elements 42a, 42b connected thereto, to transition from the extended position to the retracted position.

Figure 28:
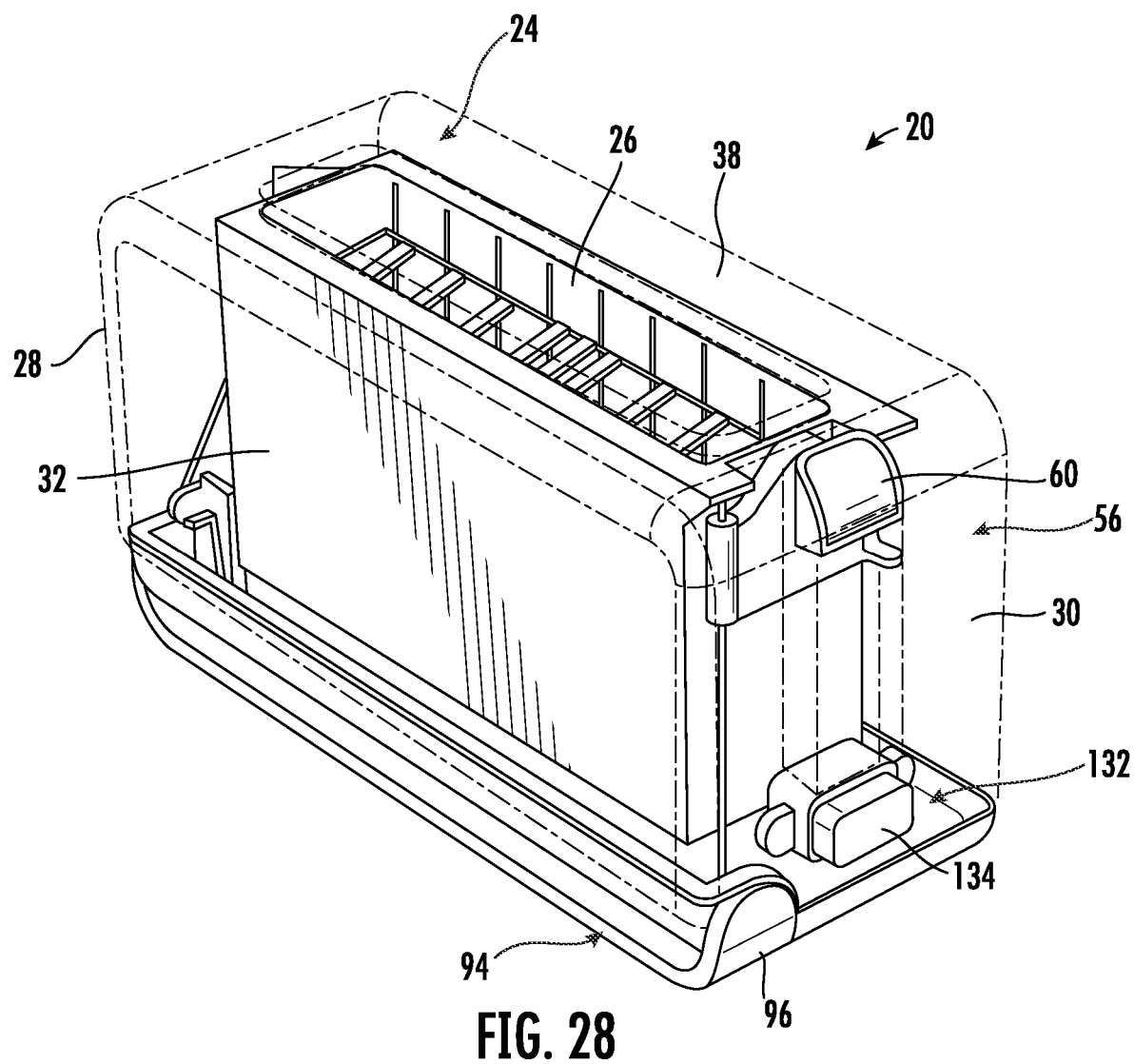
FIG. 28 is a perspective view of a locking mechanism of the cooking system when the cooking system is in the first cooking orientation according to an embodiment.
Figure 29A:
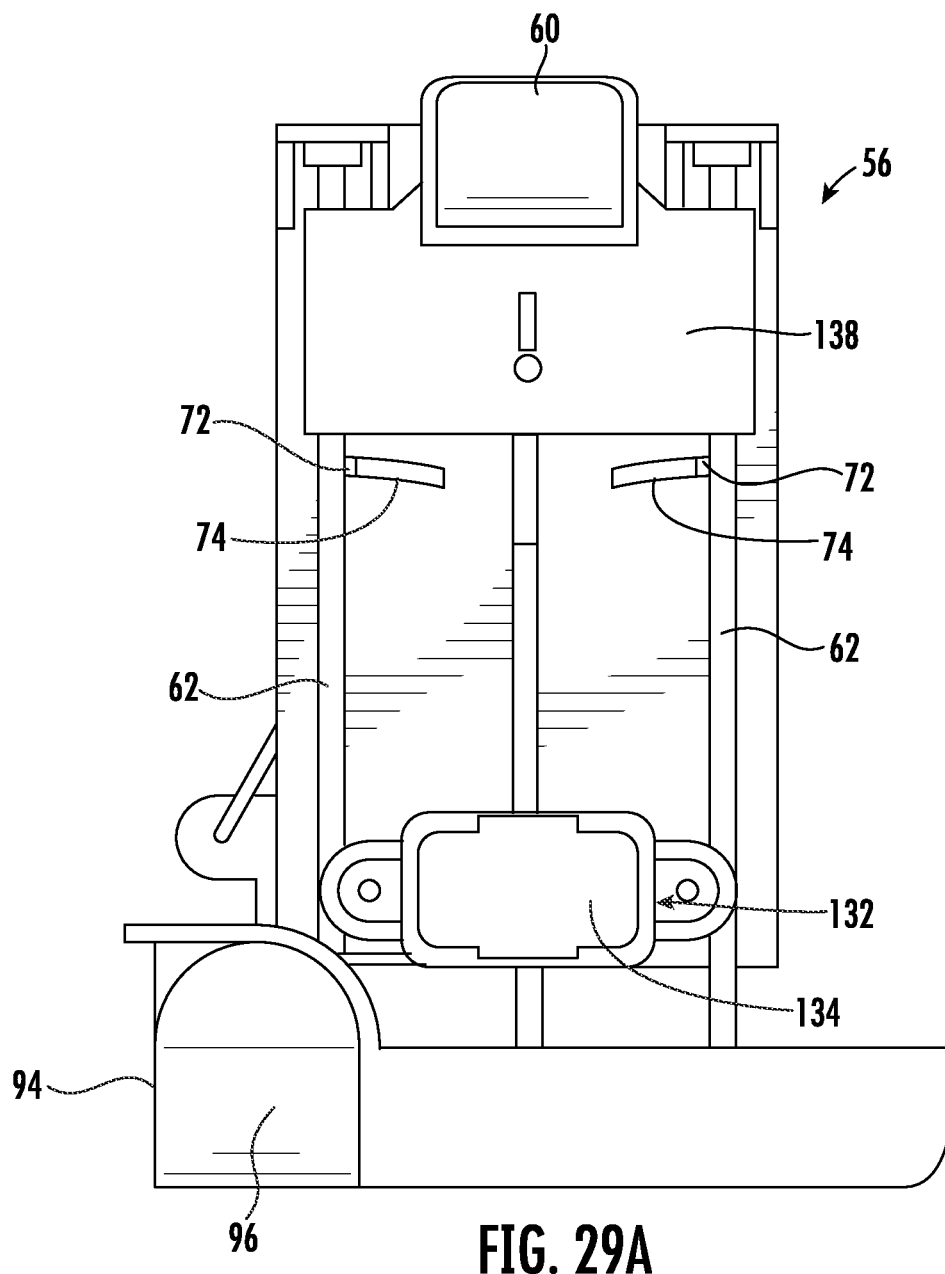
FIG. 29A is an end view of a locking mechanism of the cooking system when the cooking system is in the first cooking orientation according to an embodiment.
Figure 29B:
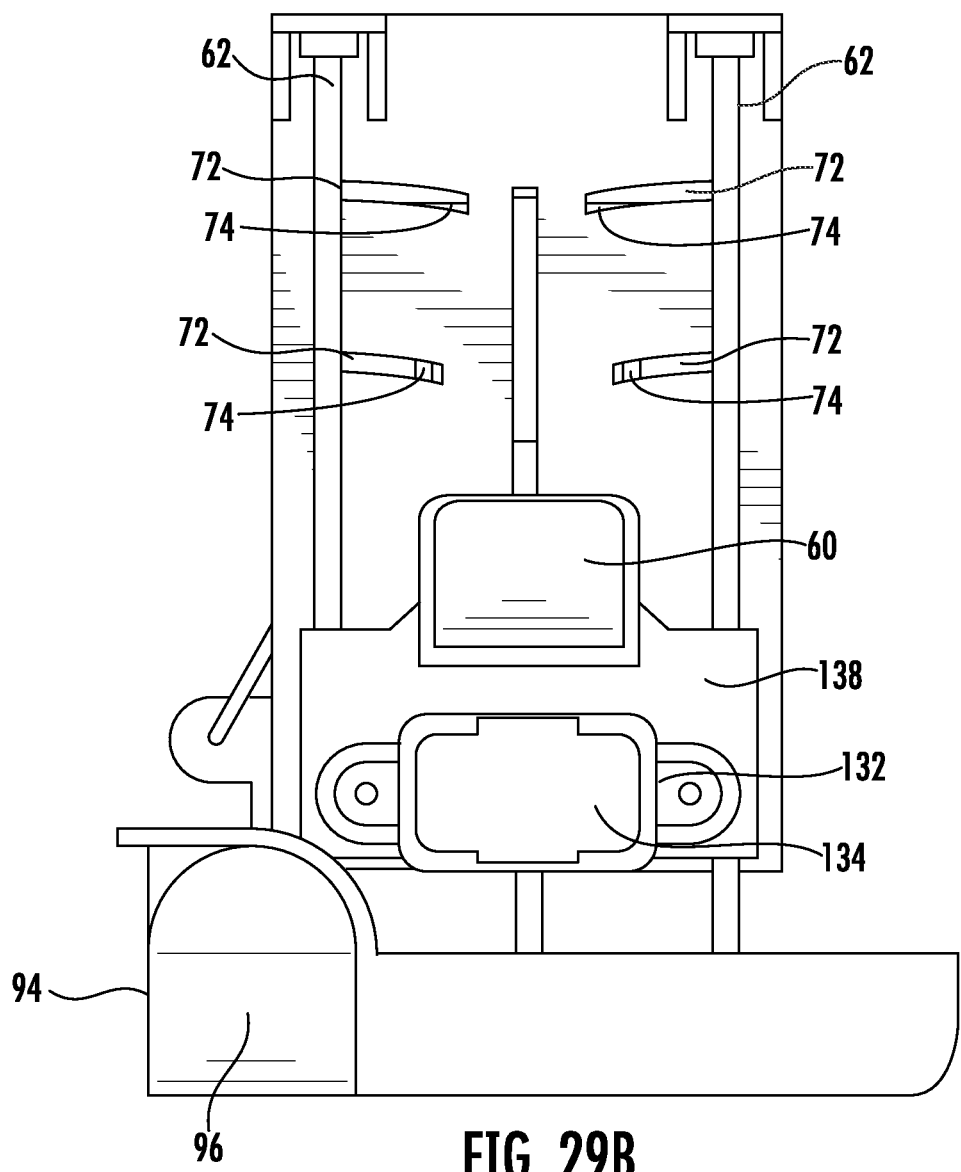
FIG. 29B is an end view of the locking mechanism of FIG. 29A when the cooking system is in the second cooking orientation according to an embodiment.
Figure 30:
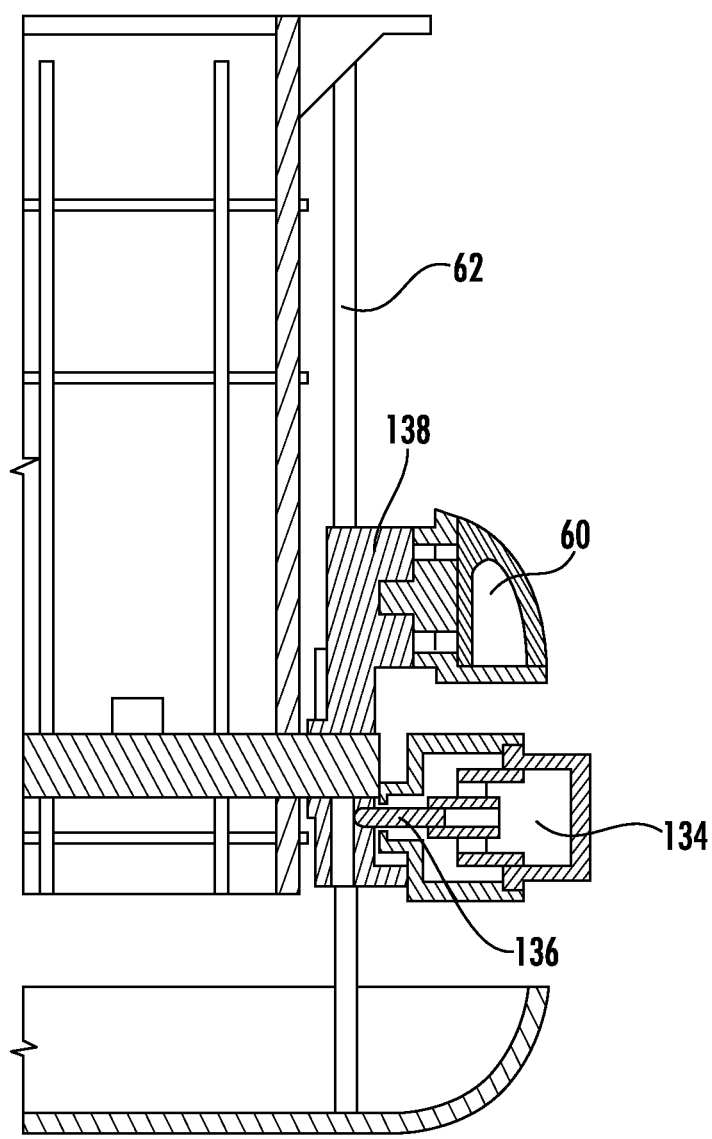
FIG. 30 is a side view of a locking mechanism of FIG. 29A when the cooking system is in the first cooking orientation according to an embodiment.
Figure 31:
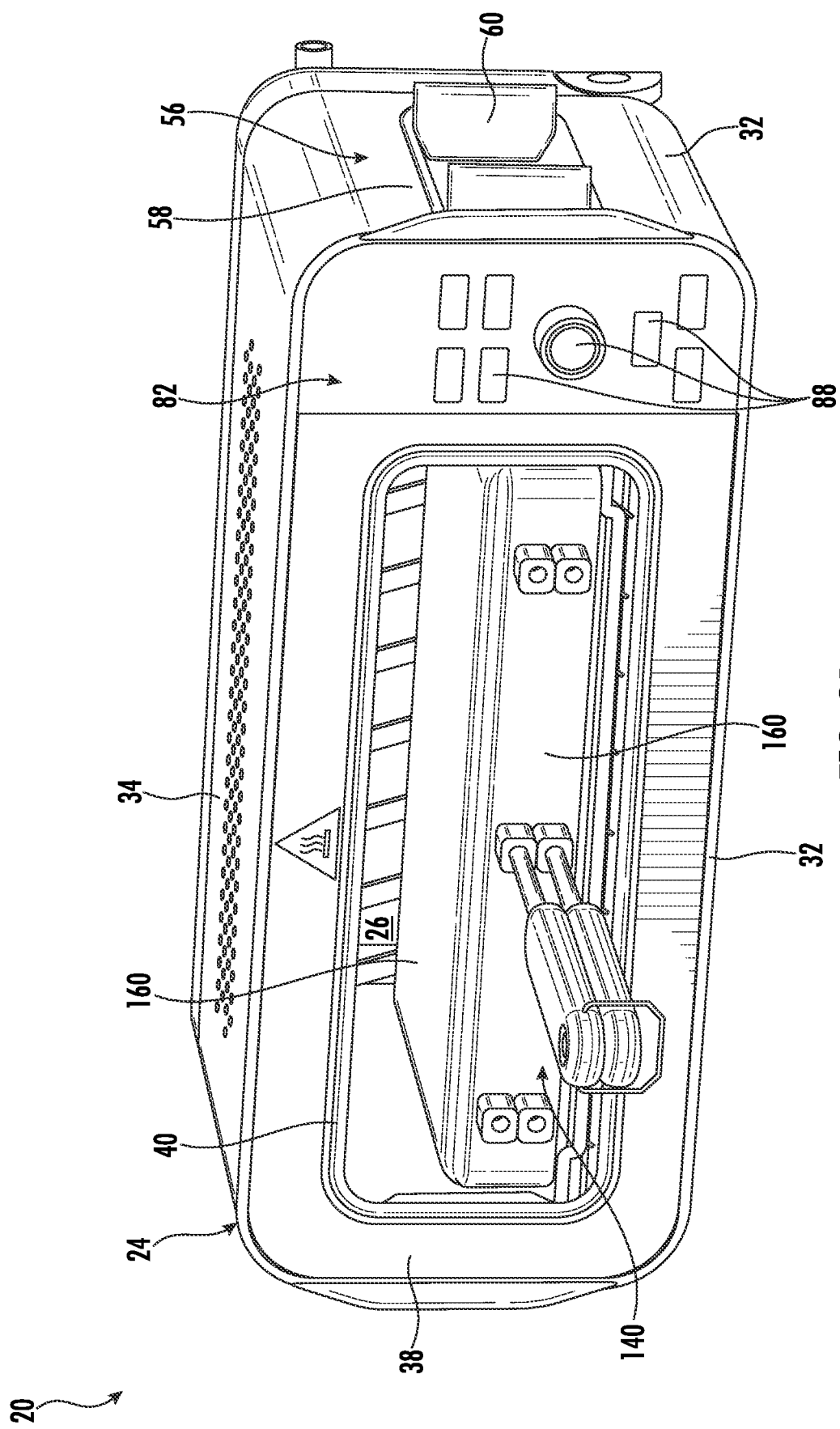
FIG. 31 is a perspective view a cooking system in a second cooking orientation according to an embodiment.

The cooking system 20 may include a locking mechanism 132 configured to lock the support member 52 in the active position when the cooking system 20 is transformed to the second orientation. By positioning the support member 52 near the back of the cooking compartment 26 when the cooking system 20 is in the second orientation, the area within the cooking compartment 26 configured to receive food is maximized. With reference now to the embodiment illustrated in FIGS. 28-30, the locking mechanism 132 includes an actuator 134 that can selectively couple to a portion of the lever 56. Although the actuator 134 is illustrated as being arranged adjacent the lever 56 when in the lowered position, an actuator 134 arranged at any location about the housing 24 is within the scope of the disclosure. In an embodiment, the actuator 134 is a push-push button operable to selectively extend a shaft 136 via application of a force to the actuator 134 in a first direction and to retract the shaft 136 via application of another force to the actuator 134 in the same first direction.

A slider 138 or other component may be connected to and/or extend from the lever 56. Accordingly, the slider 138 is configured to translate with the lever 56 relative to the slot 58. When the lever 56 is in the lowered position, application of a force to the actuator 134 of the locking mechanism 132 causes the shaft 136 to extend into an opening formed in the slider 138. The engagement between the shaft 136 and the slider 138 restricts movement of the lever 56 from the lowered position. Once engaged, the housing 24 may be transformed from the first orientation to the second orientation. In addition, in an embodiment, when the locking mechanism 132 is active, for example when the shaft 136 is engaged with the slider 138, the locking mechanism 132 prevents engagement of a switch associated with the lever 56, even though the lever 56 is in the lowered position. This prevents power from being delivered to the heating elements 78, 80 before a cooking operation is initiated by a user. Once the housing 24 is transformed to the second orientation, a second switch (not shown) is engaged, thereby allowing power to be delivered to the heating elements 78, 80 to perform a second cooking operation. Further, the locking mechanism 132 may be designed to limit operation of the actuator 134. For example, in an embodiment, the actuator 134 may only be operated when the cooking system 20 is in the first orientation to prevent unintentional decoupling of the slider 138 and the actuator 134.

Figure 42A:
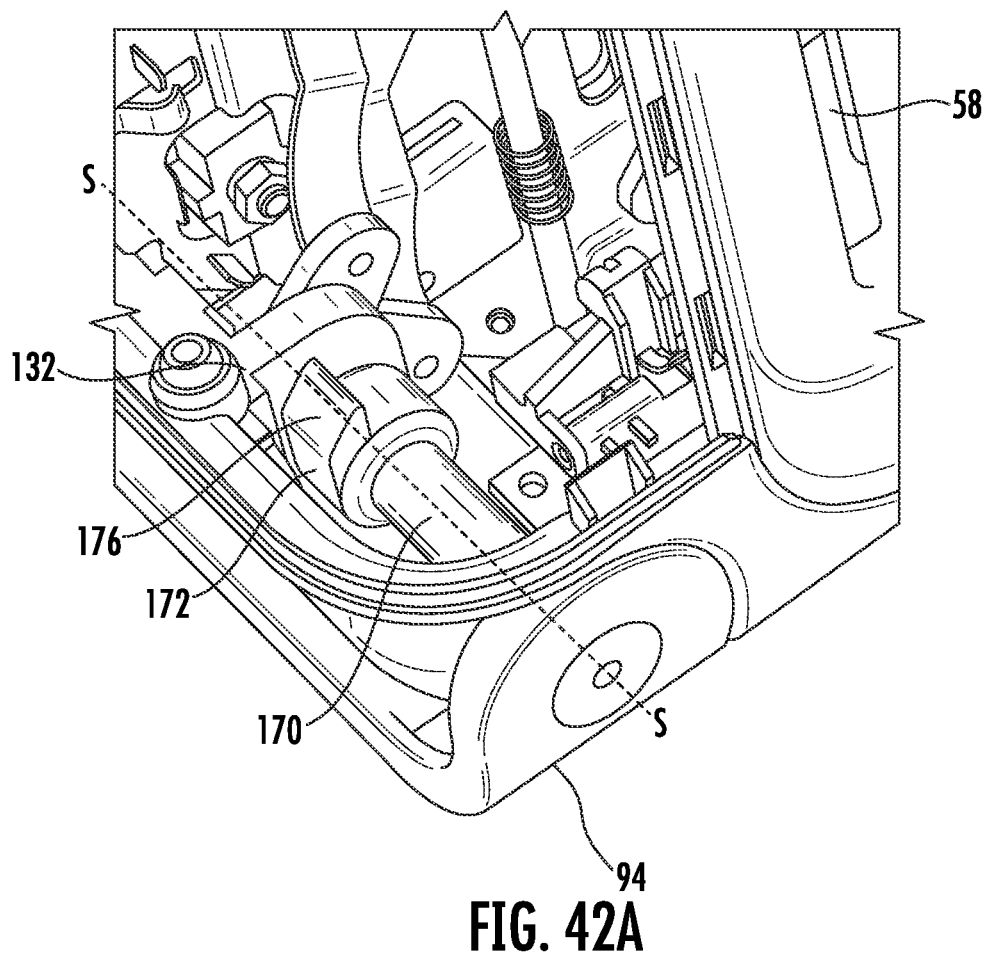
FIG. 42A is a perspective view of a locking mechanism when the cooking system is in a first cooking orientation according to an embodiment.
Figure 42B:
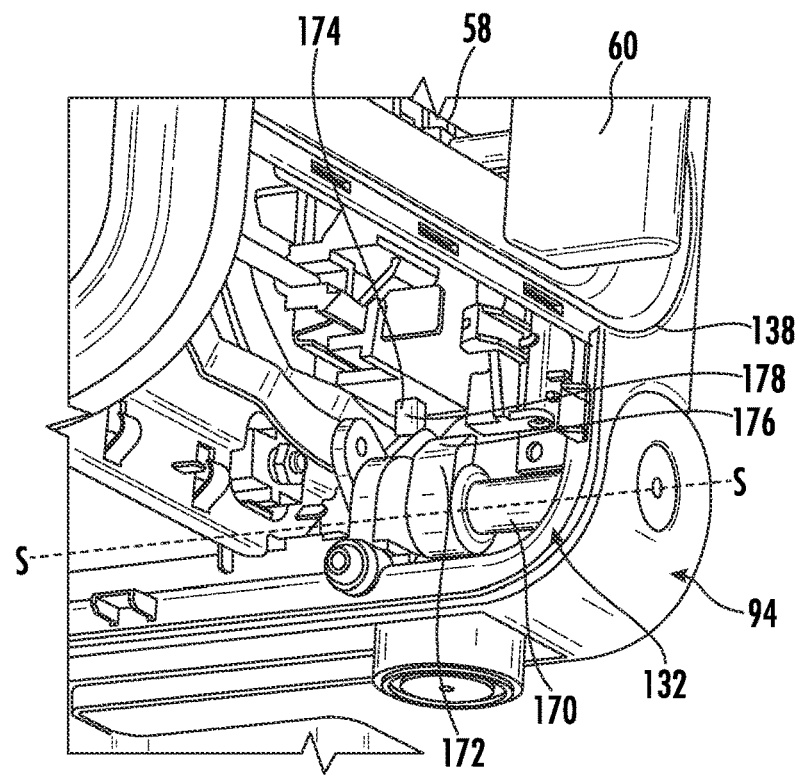
FIG. 42B is a perspective view of the locking mechanism of FIG. 42A when the cooking system is transforming between a first cooking orientation and a second cooking orientation according to an embodiment.
Figure 42C:
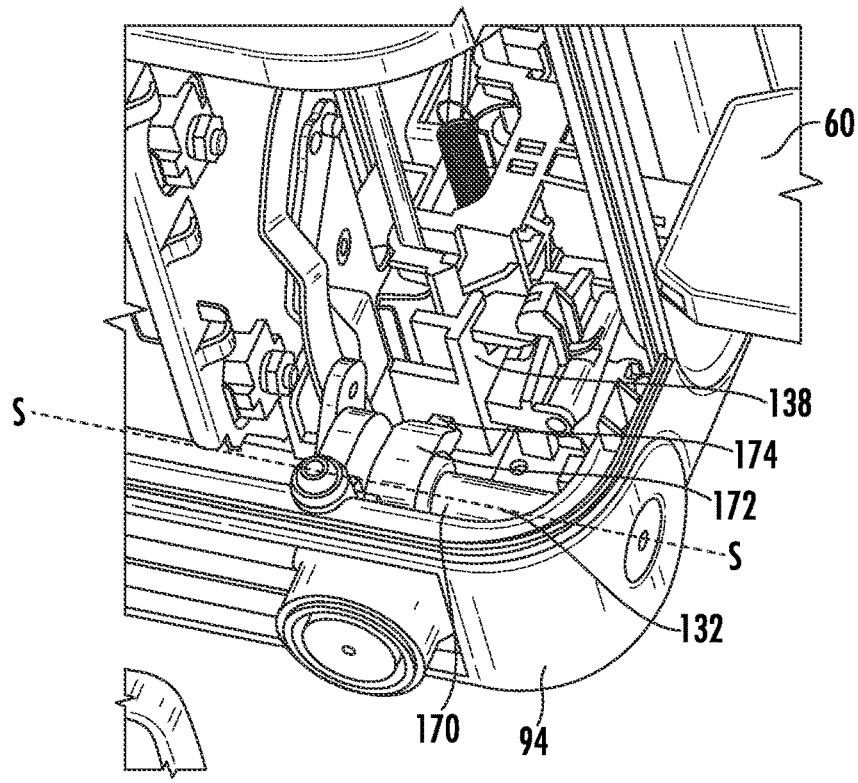
FIG. 42C is a perspective view of the locking mechanism of FIG. 42A when the cooking system is in a second cooking orientation according to an embodiment.

Another example of a locking mechanism 132 of the cooking system is illustrated in FIGS. 42a-42c. As shown, the locking mechanism 132 includes a locking component 170 mounted to a portion of the pivot structure 94, such as within the housing 24 for example. The locking component 170 includes a locking feature 172, such as a protrusion for example, extending outwardly therefrom. In the illustrated, non-limiting embodiment, the locking feature 172 extends upwardly, generally parallel to the movement of the lever 56 when the housing 24 is in the first orientation. Similar to the embodiment of FIGS. 28-30, a slider 138 or other component may be connected to and/or extend from the lever 56. Accordingly, the slider 138 is configured to translate with the lever 56 relative to the slot 58 and the one or more rods 62. As best shown in FIG. 42b, an engagement feature 174, such as a spring biased post for example, extends from the slider 138 in the direction of the locking component 170. Although the engagement feature 174 is illustrated as extending generally perpendicular to the translational axis of the slider 38, embodiments where the engagement feature 174 has another orientation are also contemplated herein.

The locking feature 172 is axially aligned with the engagement feature 174 of the slider 138. Further, a surface 176 of the locking feature 172 may have a first configuration and a surface 178 of the engagement feature 174 may have a second configuration complementary to the first configuration. In the illustrated, non-limiting embodiment, the surfaces 176, 178 of the locking feature 172 and engagement feature 174 are arranged at corresponding angles.

In operation, a relative rotation between the housing 24 and the pivot structure 94 occurs. As a result, the locking component 170 is rotated relative to the lever 56. In the rotated position, the locking component 170 extends towards the slider 138. As the lever 56 is moved downwardly toward the active position of the support member 52, the engagement feature 174 extending from the slider 138 contacts the locking feature 172. As shown, the angled surface 178 of the engagement feature 174 abuts the similarly angled surface 176 of the locking feature 172. As the slider 138 continues to move downwardly, the engagement over the angled surfaces 176, 178 applies a force to the engagement feature 174 in a direction opposite the biasing force of a biasing mechanism (not shown) connected thereto. This force causes the engagement feature 174 to retract inwardly toward the slider 138, thereby allowing the slider 138 to move to a position beyond, for example vertically below, the locking feature 172. Once the engagement feature 174 is out of contact with the locking feature 172, the biasing force will cause the engagement feature 174 to return to an extended position. Engagement between another surface of the locking feature 172, and another surface of the engagement feature 174 retains the slider 138, and therefore the lever 56 and the support member 52, in the active position. To release the slider 138, the pivot structure 94 is rotated about the pivot axis S in a second, opposite direction, thereby moving the locking feature 172 out of the path of the engagement feature 174.

When the cooking system 20 is in the second orientation, one or more cooking accessories or inserts 140 configured to support a food item may be installed within the cooking compartment 26. In an embodiment, best shown in FIGS. 1-3 and 15-18, one or more of the cooking accessories 140, such as a tray for example, may be stowed within a cavity or pocket 142 formed in or in conjunction with one of the sides of the housing 24, such as the back 34 of the housing 24 for example. When positioned within the cavity 142, a portion of the accessory 140 may, but need not be, flush with an exterior surface of the housing 24. Each of the one or more cooking accessories 140 suitable for use with the cooking system 20 may be supported within the cooking compartment 26 directly or indirectly by the second food support element 42b.

Figure 32:
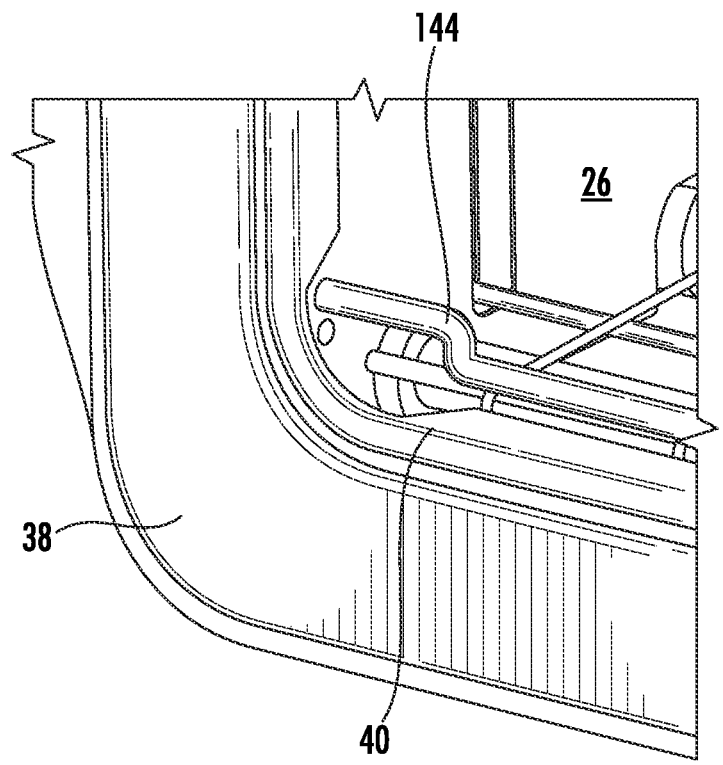
FIG. 32 is a detailed perspective view of a portion of the cooking system of FIG. 31 according to an embodiment.
Figure 33:
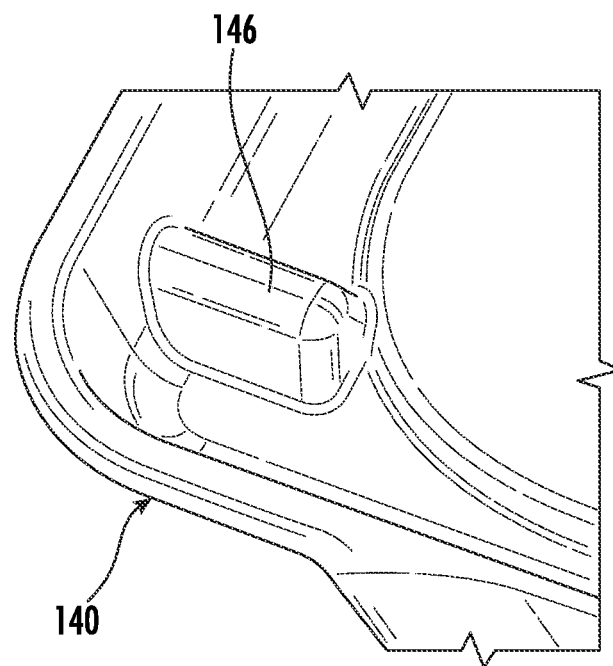
FIG. 33 is a perspective view a cooking system in a second cooking orientation according to an embodiment.

With reference to FIGS. 31-37b, the cooking system 20 may additionally include an engaging mechanism configured to limit movement of the accessory 140 in at least one direction within the cooking compartment 26 and indicate to a user when the accessory is at the end of its path of movement. The engaging mechanism, may but need not be located within the internal cooking compartment 26. With reference now to FIGS. 32 and 33, in an embodiment, the engaging mechanism is a support feature 144, for example located near the bottom of the cooking compartment 26 adjacent the second food support element 42b when the cooking system 20 is in the second horizontal configuration. In such embodiments, the support feature 144 may be integrally formed with the second food support element 42a, 42b, or alternatively, may be located between the opening 40 and an end of the second food support element 42b.

A configuration of the support feature 144 may be configured to cooperate with a corresponding support feature 146 formed in an accessory 140 insertable into the cooking compartment 26 to properly position the accessory 140 within the cooking compartment 26. For example, in the illustrated, non-limiting embodiment, the support feature 144 is a rod having a non-linear configuration and an accessory 140 mountable within the cooking compartment 26 has a complementary groove 146 formed therein. When the accessory 140 is inserted into the cooking compartment 26, a raised portion of the rod is received within the groove 146. Any of the accessories 140 illustrated and described herein may a support feature configured to cooperate with a support feature of the cooking system. Further, it should be understood that the configuration of the support features 144, 146 illustrated and described herein are intended as an example only.

Figure 34A:
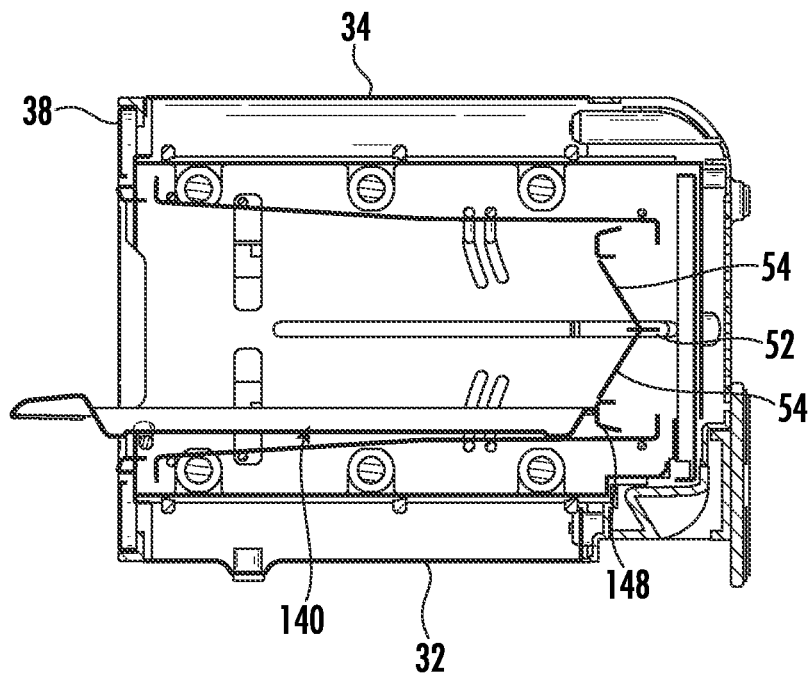
FIG. 34A is a side view a portion of a cooking system in a second cooking orientation according to an embodiment.
Figure 34B:
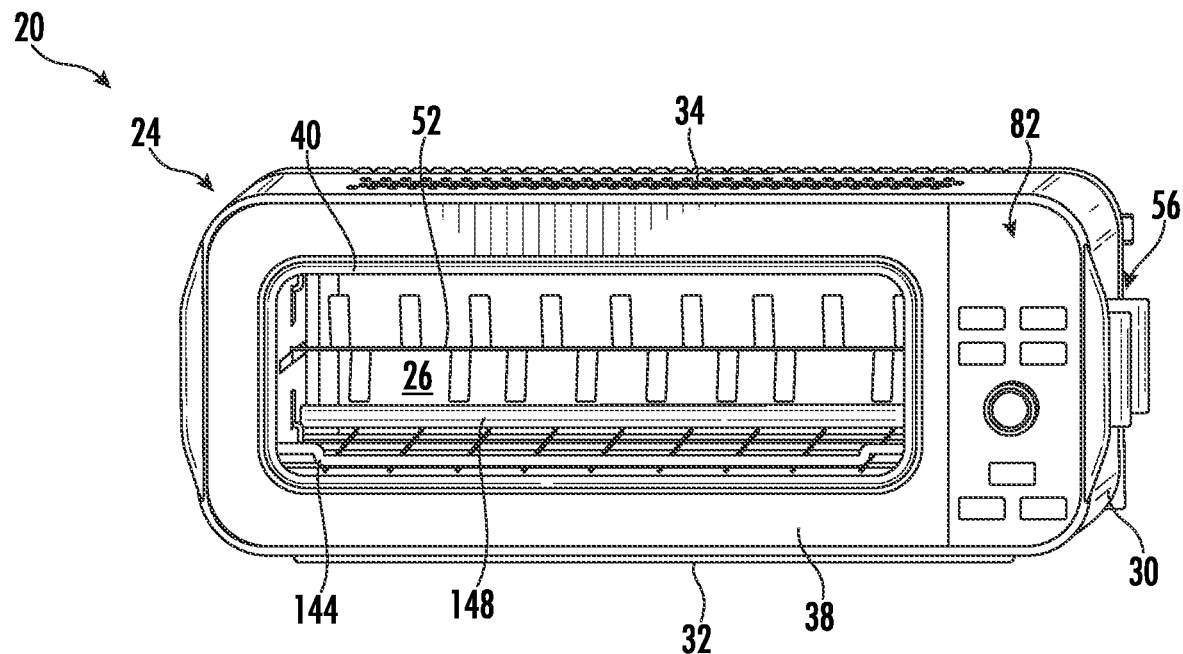
FIG. 34B is a perspective view the cooking system of FIG. 34A according to an embodiment.

Alternatively, or in addition, a stop bar 148 (see FIGS. 34a and 34b) may be positioned within the cooking compartment 26, such as adjacent a rear of the cooking compartment 26. The stop bar 148 is an engaging mechanism configured to define an end point or to prevent over travel of an accessory 140 inserted into the cooking compartment 26. Engagement between the accessory and the stop bar 148 will indicate to a user that the accessory cannot be moved further in at least one direction. In an embodiment, best shown in FIG. 34A, the stop bar 148 is arranged generally adjacent the teeth 54 of the support member 52 when the support member 52 is in the active position. However, embodiments where the stop bar 148 is arranged at another location relative to the support member 52 are also contemplated herein. In addition, the geometry of the stop bar 148 may be selected to limit movement of an accessory 140 without interfering with the operation or functionality of the accessory 140. In some embodiments, as shown in FIGS. 34a and 34b, the stop bar 148 is fixedly mounted within the cooking compartment 26.

Figure 35A:
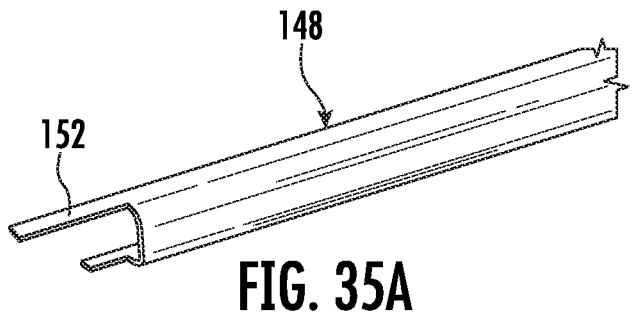
FIG. 35A is a perspective view an engaging mechanism of the cooking system according to an embodiment.
Figure 35B:
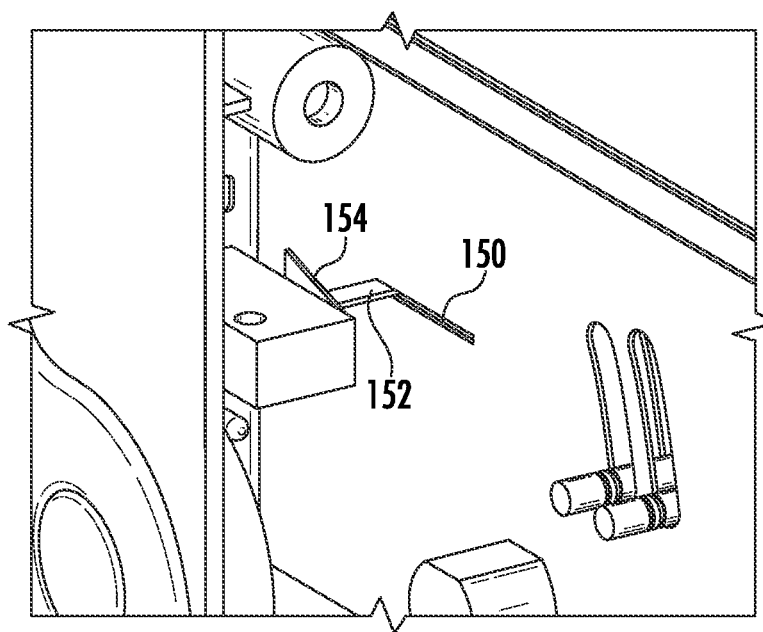
FIG. 35B is a perspective side view of the engaging mechanism of FIG. 35A according to an embodiment.
Figure 36A:
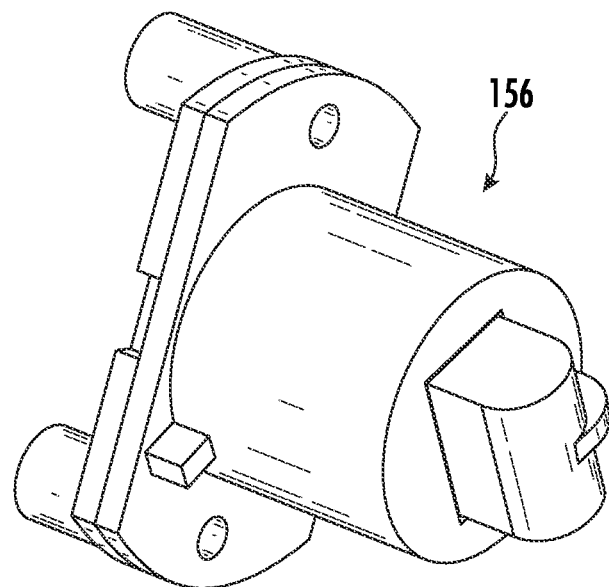
FIG. 36A is a perspective view an engaging mechanism of the cooking system according to another embodiment.
Figure 36B:
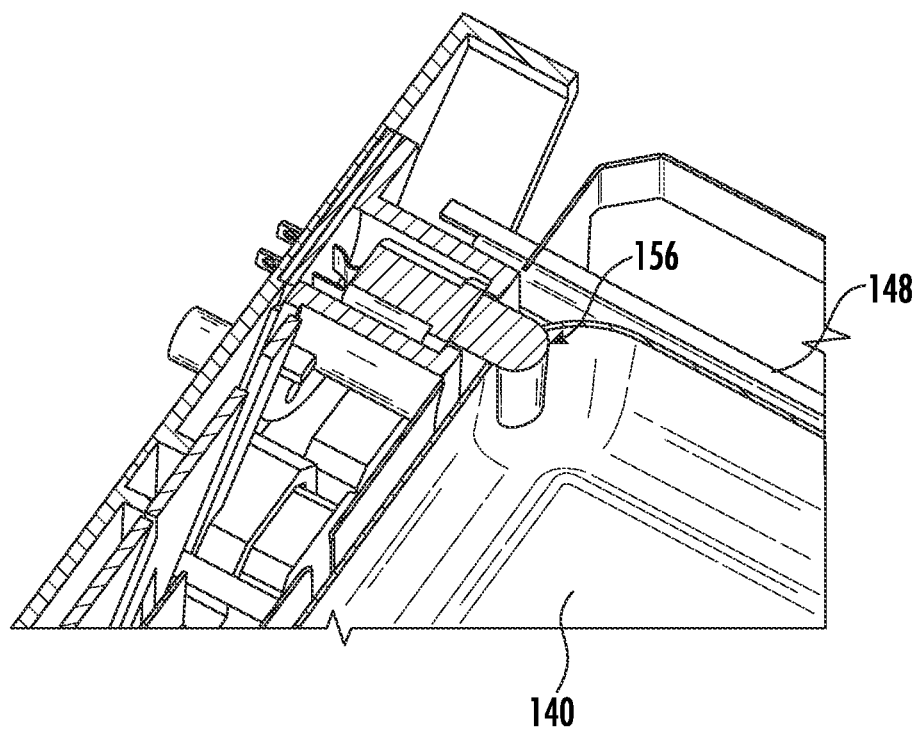
FIG. 36B is a perspective side view of the engaging mechanism of FIG. 36A according to an embodiment.

The cooking system 20 may not be operable in the second orientation unless an accessory 140 is properly positioned within the cooking compartment 26. In an embodiment, in addition to defining an end of a path of movement of an accessory 140, the stop bar 148 may be used to indicate to the cooking system 20 when an accessory 140 is properly positioned within the cooking compartment 26. With reference to FIGS. 35a and 35b, the stop bar 148 may be configured to move in response to installation of an accessory 140 within the cooking compartment 26. In the illustrated, non-limiting embodiment, a slot 150 is formed in a radiation shield 76 at one or more sides of the cooking compartment 26. The stop bar 148 includes an elongated tab or protrusion 152 that extends through the slot 150. A biasing mechanism (not shown), such as a spring for example, may be coupled to the stop bar 148 and configured to bias the stop bar 148 to an unloaded position where the protrusion 152 is arranged adjacent a first end of the slot 150.

In the illustrated, non-limiting embodiment, as an accessory 140 is inserted into the cooking compartment 26, a portion of the accessory 140 engages and applies a force to the stop bar 148. This force opposes the bias of the biasing mechanism, causing the stop bar 148 to translate within the cooking compartment 26 along a path defined by the slot 150. Further movement of the stop bar 148, and therefore the accessory 140, will be prohibited once the protrusion 152 of the stop bar 148 reaches the second end of the slot 150. When located at the second end of the slot 150, the protrusion 152 may engage an adjacent switch 154, thereby indicating that the accessory 140 is at a position within the cooking compartment 26 suitable for performing a second cooking operation. When the switch 154 is engaged by the stop bar 148, a circuit for delivering power to one or more components of the cooking system 20. Once the accessory 140 is moved out of engagement with the stop bar 148, the biasing force of the biasing member will cause the stop bar 148 to translate back to a position adjacent the first end of the slot 150.

Figure 37A:
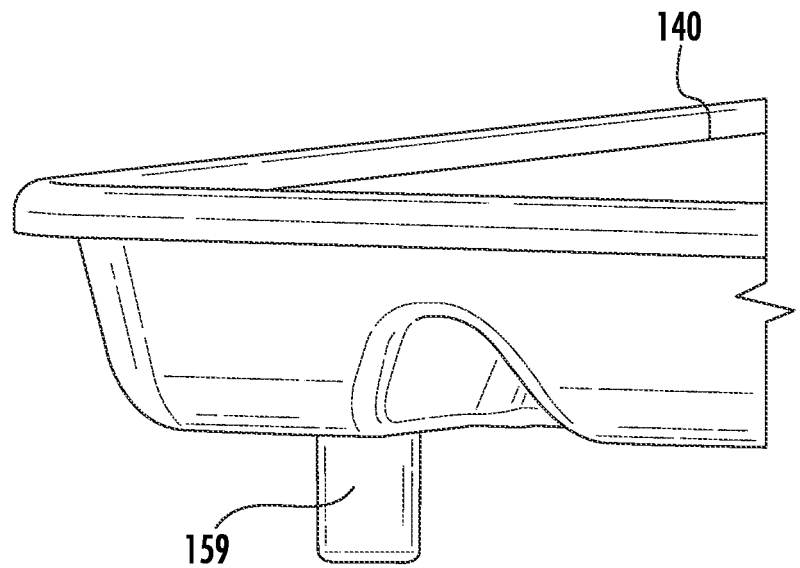
FIG. 37A is a perspective view an accessory configured for use with the cooking system according to another embodiment.
Figure 37B:
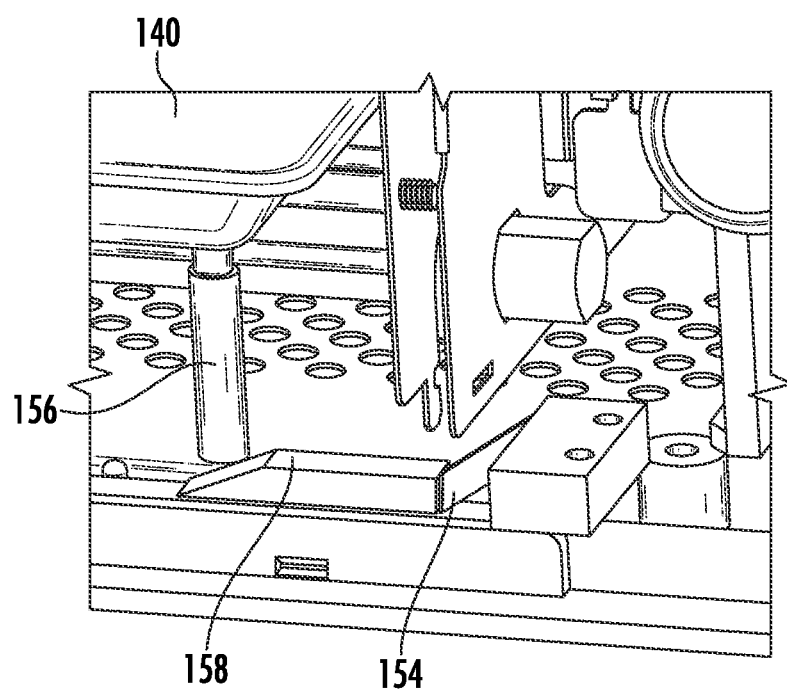
FIG. 37B is a perspective side view of the accessory and an engaging mechanism according to an embodiment.

Other types of sensors are also contemplated herein to determine when an accessory 140 is located within the cooking compartment 26 at a position suitable for performing a cooking operation. With reference to FIGS. 36a-37b, in the illustrated, non-limiting embodiment, the sensor includes a depressible plunger 156. Although the sensor is illustrated as being located within the cooking compartment 26, embodiments where the sensor is mounted about the housing 24 at a position external to the cooking compartment 26 are also within the scope of the disclosure. When an accessory 140 reaches the proper position during insertion into the cooking compartment 26, a portion of the accessory 140 engages and applies a force to the plunger 156. In embodiments where the plunger 156 has a bias, the force applied by the accessory 140 opposes the bias of a spring associated therewith. This movement of the plunger 156 may directly (FIGS. 36a and 36b) or indirectly engage a corresponding switch 154, thereby completing a circuit associated with operation of the cooking system 20. In an embodiment where the plunger 156 indirectly operates a switch 154, such as shown in FIGS. 37a and 37b, movement of the plunger 156 in a first direction, such as vertically for example, is configured to drive movement of an adjacent component 158 in a second direction, such as horizontally for example, into engagement with the switch 154. In such embodiments, the adjacent component 158 may have a bias rather than the plunger 156. In the illustrated, non-limiting embodiment of FIGS. 37a and 37b, a protrusion 159 extending from a bottom of an accessory 140 is configured to engage and move the plunger 156 to operate the switch 154.

As previously noted, various cooking accessories or inserts 140 may be suitable for use with the cooking system 20. In an embodiment, one of the accessories 140 (see FIG. 31) is a foldable grill or press. Examples of such an accessory 140 include, but are not limited to a panini grill, a flat griddle, a waffle press, and a toastie press. Each of these foldable grill or press accessories may include two portions 160 pivotally coupled to one another between a first position and a second position. In the illustrated, non-limiting embodiment, the housing portions are substantially identical and are movable about an axis to "fold" into a closed position where a cavity is formed between the housing portions. Such a foldable grill or press accessory is receivable within the cooking compartment 26 when in the closed position. However, embodiments where only a portion of a foldable press accessory 140, such as a single housing portion 160 for example, is used as an accessory 140 are also within the scope of the disclosure. Further, other accessories having two or move portions that are pivotally or rotatable coupled to one another or movement between two or more positions are contemplated herein.

Figure 38A:
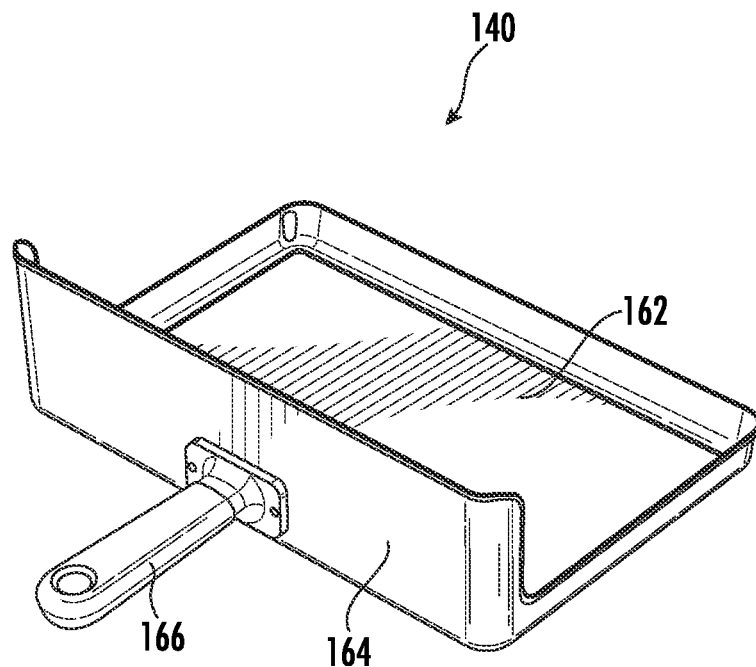
FIG. 38A is a perspective view an accessory configured for use with the cooking system according to another embodiment.
Figure 38B:
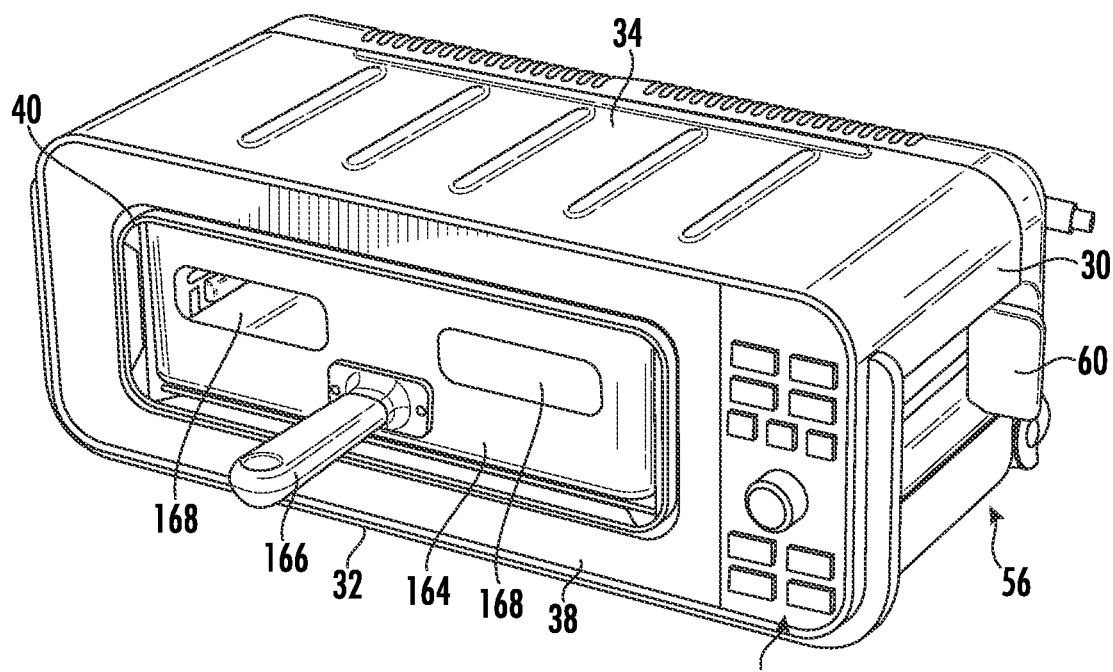
FIG. 38B is a perspective side view of the accessory installed within the cooking system according to an embodiment.

With reference to FIGS. 38a and 38b, an example of another cooking accessory 140 suitable for use with the cooking system 20 is illustrated. As shown, the cooking accessory 140 is a tray, such as formed from a thin layer of sheet metal. In the illustrated, non-limiting embodiment, the tray includes a base 162 and a lip 164 extending at an angle, such as generally perpendicular for example, to the base 162. In such embodiments, the lip 164 may, but need not define a grip point for a user to grasp and manipulate the tray. Alternatively, the tray 140 may include a handle 166, distinct from the lip 164. It should be understood that a tray having any suitable configuration, such as a tray including only a generally flat base and no lip is also within the scope of the disclosure.

The cooking compartment 26 is in fluid communication with the ambient atmosphere surrounding the cooking system 20 via the opening 40. Accordingly when the cooking system 20 in the second horizontal configuration, the cooking compartment 26 may be unevenly heated as a result of heat escaping through the opening 40. To minimize this heat loss through the opening 40, a shield may be configured to close or cover at least a portion of the opening. The shield may be a component separate from and connectable to the accessory 140 or the housing 24 to close or cover at least a portion of the opening 40. In another embodiment, the shield may be formed as part of the accessory and is configured to close all or a majority of the opening 40 when the accessory 140 is positioned within the cooking compartment 26. Accordingly, the shield may be formed from the same material as an accessory or may be formed from a different material as the accessory. In an embodiment, at least a portion of the shield is formed from a transparent material, such as glass. In the illustrated, non-limiting embodiment of FIG. 38b, the accessory 140 is a tray, and the shield is formed by a lip 164 having an extended height. In such embodiments, the lip 164 may be substantially solid, or alternatively, may include one or more openings or view ports 168 to allow a user to see the interior of the cooking compartment 26. In embodiments where the shield 168 of the accessory 140 includes view ports 168, the view ports 168 may simply be exposed openings, or alternatively, may include a secondary, generally transparent material (not shown) used to seal or close the openings 168 without affecting the visibility into the cooking compartment 26.

Figure 39:
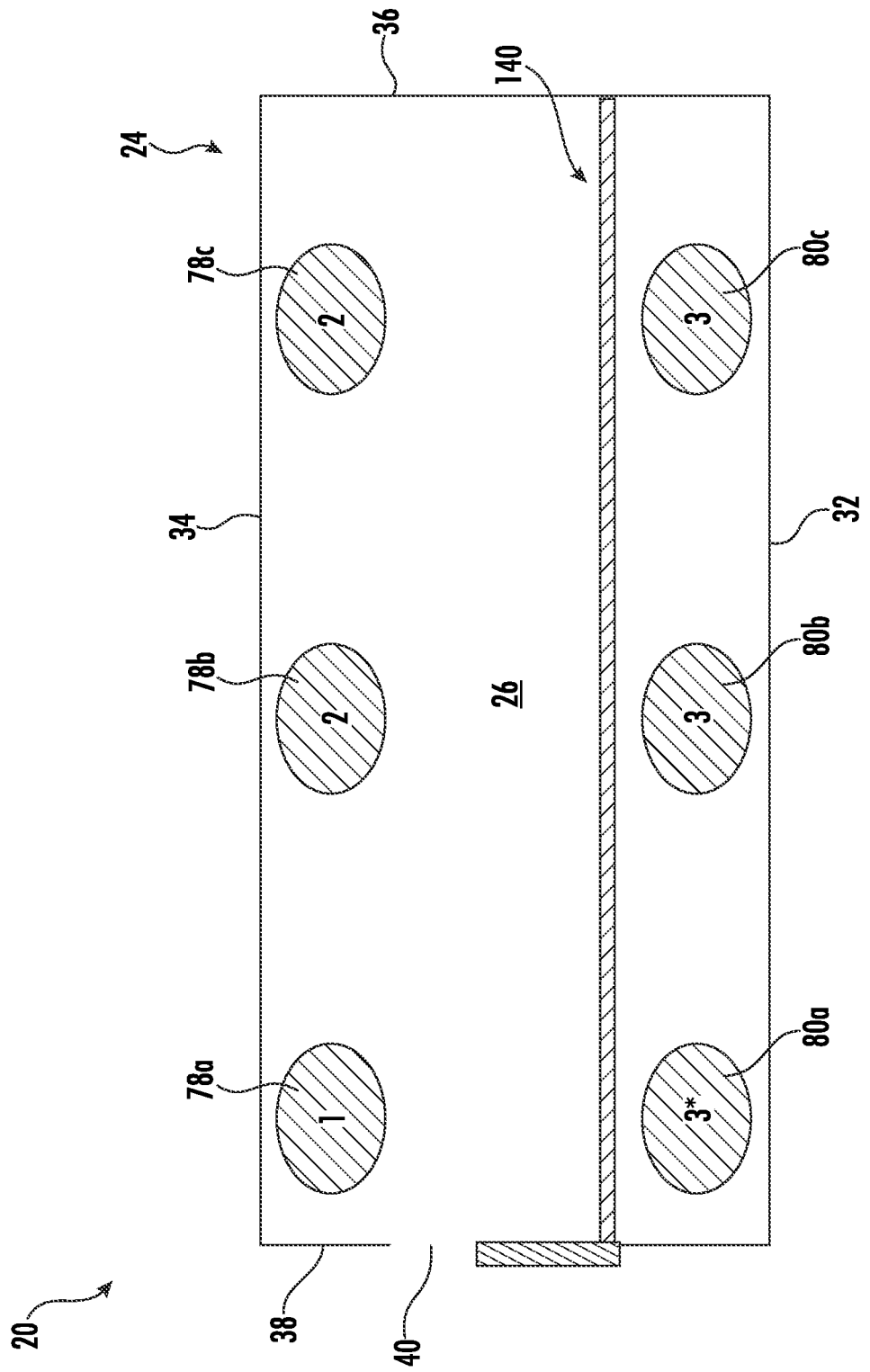
FIG. 39 is a schematic diagram of the interior of the cooking system in a second cooking orientation according to an embodiment.

Alternatively, or in addition, operation of the first and/or second heating elements 78, 80 may be controlled to achieve even heating within the cooking compartment 26 when the internal cooking compartment 26 is at least partially exposed to an ambient environment via the opening 40 and fluid transfer between said ambient environment and said internal cooking compartment can occur. As previously noted, one or more of the plurality of heating elements 78, 80 may be independently controlled. With reference now to FIG. 39, in an embodiment, the first heating element 78 arranged closest to the opening 40 (illustrated as 78a in the FIG.) is operable independently from the other first heating elements 78 (illustrated as 78b and 78c in the FIG.), which may be controlled as a group. The plurality of second heating elements 80 may be controlled as a group, or alternatively, the second heating element 80 arranged closest to the opening 40 (illustrated as 80a in the FIG.) may be operated independently from the other second heating elements 80 (illustrated as 80b and 80c in the FIG.). In such embodiments, the first and second heating element 78a, 80a positioned closest to the opening 40 may be controlled collectively, or alternatively, the first and second heating elements 78a, 80a positioned closest to the opening 40 may be controlled independently of one another and the other first and second heating elements 78b 78c, 80b, 80c.

To compensate for the heat loss adjacent the opening 40, the heat output from the heating elements may be variable across said internal cooking compartment 26 during operation of the system in some cooking modes. In an embodiment, the heat output by the first and/or second heating elements 78a, 80a located adjacent the opening 40 may be greater than the heat output individually or collectively by the remainder of the heating elements 78b 78c, 80b, 80c. However, the heat output by the first and/or second heating elements 78a, 80a may be substantially identical to the heat output individually or collectively from the remainder of the heating element 78b 78c, 80b, 80c. As described herein, the parameters associated with independent control and the resulting variation in heat output from the heating elements 78, 80 may include operation of the heating elements 78, 80 for different lengths of time, continuous operation versus pulsed operation, and/or operation at different heat outputs, among other parameters. Further, although control of a plurality of heating elements 78, 80 is described herein to provide a desired variation in the heat within the cooking compartment 26, it should be understood that a cooking system 20 having only a single heating element may be configured and/or controlled to achieve the same variation.

Figure 40:
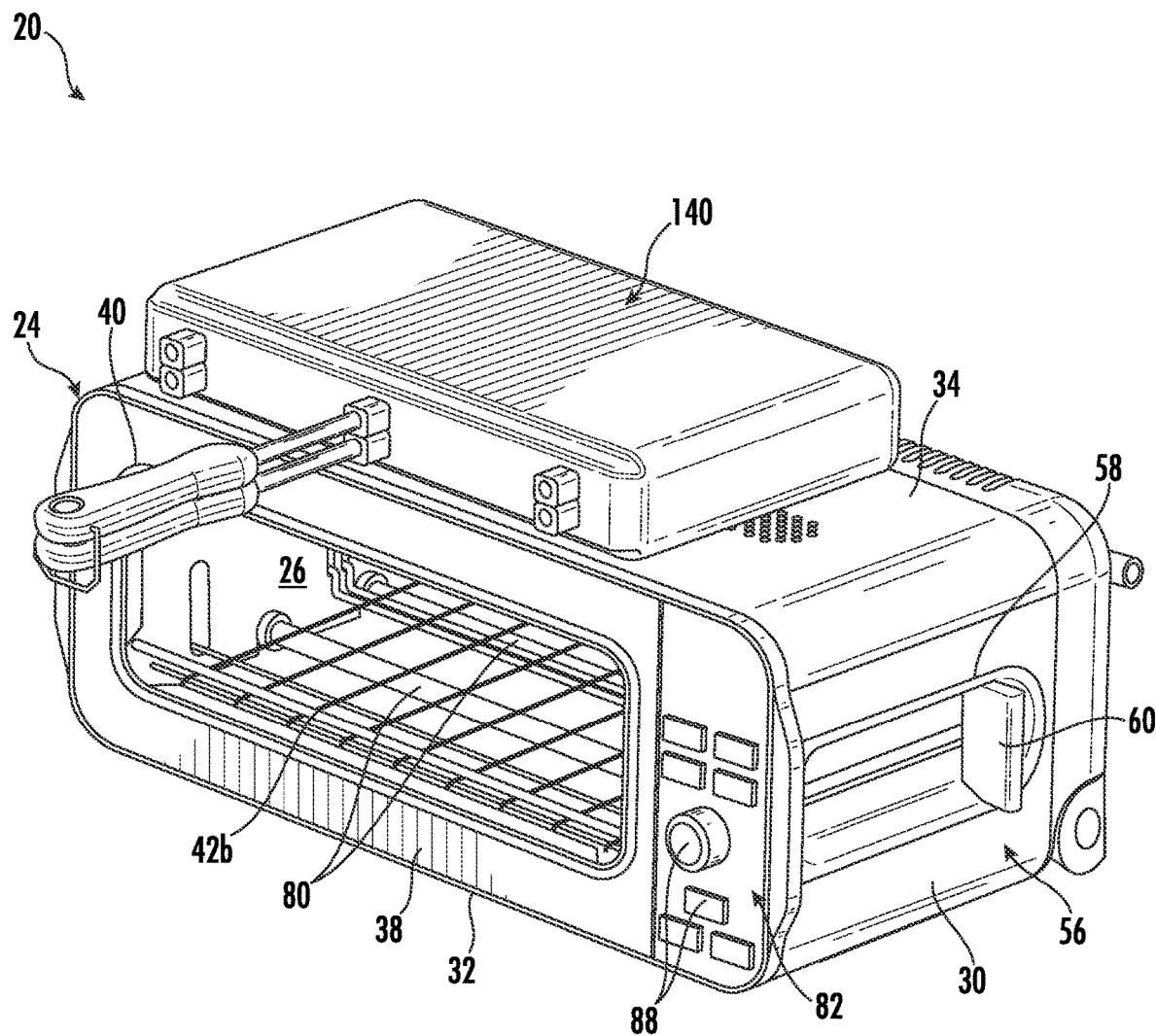
FIG. 40 is a perspective view a cooking system in a second cooking orientation according to an embodiment.

With reference now to FIG. 40, when the cooking system 20 is in the second horizontal configuration, the cooking system 20 may be able to perform a warming operation. The cooking system 20 may be capable of performing this warming operation simultaneously with a second cooking operation. However, the warming operation need not be performed at the same time as a second cooking operation.

In the illustrated, non-limiting embodiment, a portion of the housing 24, such as the exterior surface of the rear wall 34 of the housing 24, which is oriented parallel to the support surface 22 when in the second cooking configuration, is selectively operable as a warming area and is therefore heated during a warming operation. This portion of the housing 24 may have a generally planar configuration, or alternatively, may have one or more raised features. The raised features are configured to support a food support item, such as an accessory 140 or a dish for example, at a position slightly offset from the adjacent planar surface of the housing 24. A configuration of the raised features may also be selected to prevent unintended movement of a food support item positioned thereon. In an embodiment, the raised features are ribs spaces over the surface of the rear wall, and the offset between the surface of the housing 24 and an upper surface of the raised features is about 2 mm. Such a configuration may be used to limit the heat transfer to the item located on the portion of the housing 24.

One or more of the first heating elements 78 may be used to heat the portion of the housing 24 during a warming operation. However, in other embodiments, at least one third heating element (not shown), distinct from the first and second heating elements 78, 80 previously described herein may be used to heat the portion of the housing 24. In such embodiments, the at least one third heating element is mounted within the housing 24, external to the cooking compartment 26. In such embodiments, the at least one third heating element may be controlled independently from the first and second heating elements 78,80, and may be operable simultaneously with at least one of the first and second heating elements 78,80.

The cooking system 20 illustrated and described herein provides an enhanced user experience by transforming between a first orientation and a second orientation based on a desired cooking operation to be performed. Additionally, by designing the cooking system 20 to transition between a first and second orientation, the cooking system 20 can be positioned to minimize the total amount of counter space occupied by the cooking system when the cooking system is not in use.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A cooking system, comprising:
   a housing having an internal cooking compartment and an opening in the housing for accessing the internal cooking compartment, the housing having a first orientation and a second orientation;
   a heating element positioned within the internal cooking compartment; and
   a first food support element and a second food support element positioned within the internal cooking compartment, the first and second food support elements being movable when the housing is in the first orientation for a first cooking mode, and being fixed when the housing is in the second orientation for a second cooking mode, wherein an activation of the first cooking mode and the second cooking mode is dependent on an orientation of the housing, wherein a gap between the first and second food support elements is smaller in the first orientation than the second orientation.

2. The cooking system of claim 1, wherein a gap between the first and second food support elements is configured to increase when transitioning from the first orientation to the second orientation.

3. The cooking system of claim 1, wherein a support member is positioned between the first and second food support elements and is configured to translate laterally within the housing.

4. The cooking system of claim 3, wherein the support member is stationary in the second orientation.

5. The cooking system of claim 1, wherein the first and second food support elements extend non-parallel to one another during a cooking operation in the first orientation.

6. The cooking system of claim 1, wherein the first and second food support elements extend parallel to one another during a cooking operation in the second orientation.

7. A cooking system, comprising:
   a housing having an internal cooking compartment and an opening in the housing for accessing the internal cooking compartment, the housing having first and second orientations;
   a heating element positioned within the internal cooking compartment; and
   a first food support element and a second food support element positioned within the internal cooking compartment, the first and second food support elements extending non-parallel to one another during a first cooking mode in the first orientation, and extending parallel to one another during a second cooking mode in the second orientation, wherein an activation of the first cooking mode and the second cooking mode is dependent on an orientation of the housing.

8. The cooking system of claim 7, wherein a gap between the first and second food support elements is smaller in the first orientation than the second orientation.

9. The cooking system of claim 7, wherein a gap between the first and second food support elements is configured to increase when transitioning from the first orientation to the second orientation.

10. The cooking system of claim 7, wherein the first and second food support elements are stationary in the second orientation.

11. The cooking system of claim 7, wherein the opening in the housing extends parallel to a support surface that the housing is positioned on when the housing is positioned in the first orientation.

12. The cooking system of claim 7, wherein the opening in the housing extends perpendicular to a support surface that the housing is positioned on when the housing is positioned in the second orientation.

13. The cooking system of claim 7, wherein the first and second food support elements are configured to translate and pivot within the internal cooking compartment in the first orientation.

14. The cooking system of claim 7, wherein the first and second food support elements are connected to a cam plate configured to translate laterally within the housing to control a position of the first and second food support elements relative to each other.

15. The cooking system of claim 14, wherein the cam plate is configured to translate laterally within the housing when transitioning from the first orientation to the second orientation.

16. A cooking system, comprising:
   a housing having an internal cooking compartment and an opening in the housing for accessing the internal cooking compartment;
   a heating element positioned within the internal cooking compartment;
   a first food support element and a second food support element movably positioned within the internal cooking compartment;
   a lever coupled to the housing and configured to move the first and second food support elements between a first parallel orientation in a first cooking mode and a non-parallel orientation in a second cooking mode; and
   a pivot structure coupled to the housing and configured to move the first and second food support elements between the first parallel orientation and a second parallel orientation, wherein an activation of the first cooking mode and the second cooking mode is dependent on an orientation of the housing.

17. The cooking system of claim 16, wherein a first gap between the first and second food support elements in the first parallel orientation is smaller than a second gap between the first and second food support elements in the second parallel orientation.

18. The cooking system of claim 16, wherein, when the housing is in the first orientation, the housing is positioned on a support surface with the first and second food support elements in the first parallel orientation, and the opening in the housing extends parallel to the support surface, and wherein, when the housing is in the second orientation, the housing is positioned on the support surface with the first and second food support elements in the second parallel orientation, and the opening in the housing extends perpendicular to the support surface.

* * * * *